United States Patent
Kim et al.

(10) Patent No.: US 7,146,557 B2
(45) Date of Patent: Dec. 5, 2006

(54) ENCODING/DECODING APPARATUS AND METHOD IN A CDMA MOBILE COMMUNICATION SYSTEM

(75) Inventors: Youn-Sun Kim, Seoul (KR); Jae-Sung Jang, Kwachon-shi (KR); Ho-Kyu Choi, Songnam-shi (KR); Jae-Yoel Kim, Kunpo-shi (KR); Hwan-Joon Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 953 days.

(21) Appl. No.: 10/142,809

(22) Filed: May 9, 2002

(65) Prior Publication Data

US 2003/0043888 A1    Mar. 6, 2003

(30) Foreign Application Priority Data

May 9, 2001    (KR)    ............................... 2001-25306

(51) Int. Cl.
*H03M 13/03* (2006.01)
(52) U.S. Cl. .................................. 714/790; 714/758
(58) Field of Classification Search ................ 714/790, 714/758
See application file for complete search history.

(56) References Cited

U.S. PATENT DOCUMENTS 5,497,395 A *  3/1996 Jou ............................ 370/209
6,101,176 A *  8/2000 Honkasalo et al. ......... 370/335
6,351,460 B1 * 2/2002 Tiedemann et al. ......... 370/332
6,714,512 B1 * 3/2004 Tiedemann et al. ......... 370/209
6,714,599 B1 * 3/2004 Schlegel et al. ............ 375/302
6,810,030 B1 * 10/2004 Kuo .......................... 370/335

FOREIGN PATENT DOCUMENTS

| EP | 1 195 934 A2 | 4/2002 |
|---|---|---|
| EP | 1 244 237 A2 | 9/2002 |
| JP | 2000-032561 | 1/2000 |
| JP | 2001-024578 | 1/2001 |
| WO | WO 97/45976 A1 | 12/1997 |
| WO | WO 01/03366 A1 | 1/2001 |

OTHER PUBLICATIONS

Combined Search and Examination Report dated Nov. 27, 2002, issued in a counterpart application, namely Appln. No. GB0210491.7.

(Continued)

*Primary Examiner*—Guy Lamarre
*Assistant Examiner*—Mujtaba K. Chaudry
(74) *Attorney, Agent, or Firm*—Dilworth & Barrese, LLP

(57) ABSTRACT

Disclosed is an apparatus and method for transmitting R-RICH (Reverse Rate Indicator Channel) in a CDMA (Code Division Multiple Access) mobile communication system. There is provided an encoding/decoding apparatus and method for generating optimal codewords for optimal (24,1) encoding to optimal (24,7) encoding, and supporting all of an optimal (24,1) encoder to an optimal (24,7) encoder.

58 Claims, 15 Drawing Sheets

OTHER PUBLICATIONS

F. J. Macwilliams, N.J.A. Slone, North-Holland, "The Theory of Error-Correcting Codes", Linear Codes, Ch. 1. §§2-3. pp. 6-15.

A. E. Brouwer and Tom Verhoeff, "An Updated Table of Minimum-Distance Bounds for Binary Linear Codes", IEEE Transactions on Information Theory, vol. 39, No. 2, Mar. 1993, pp. 662-677.

European Search Report dated Oct. 21, 2003 issued in a counterpart application, namely, Appln. No. 02010614.2.

TSG-RAN Working Group 1, Meeting #17, Samsung: "Dynamic Split Mode For TFCI", 3GPP, Online! Nov. 21-24, 2000.

TSG-RAN Working Group 1, Meeting #7, Samsung: "New Optimal Coding For Extended TFCI With Almost No Complexity Increase (rev2)", 3GPP, Online!, Aug. 30, 1999.

* cited by examiner

ENCODING/DECODING APPARATUS AND METHOD IN A CDMA MOBILE COMMUNICATION SYSTEM

PRIORITY

This application claims priority to an application entitled "Encoding/Decoding Apparatus and Method in a CDMA Mobile Communication System" filed in the Korean Industrial Property Office on May 9, 2001 and assigned Serial No. 2001-25306, the contents of which are hereby incorporated by reference.

BACKGROUND OF THE INVENTION

1. Field of the Invention

The present invention relates generally to an encoding/decoding apparatus and method in a CDMA (Code Division Multiple Access) mobile communication system, and in particular, to an apparatus and method for transmitting a reverse rate indicator channel (R-RICH) used in a synchronous mobile communication system.

2. Description of the Related Art

In general, a reverse supplemental channel (R-SCH) fundamentally supports a variable rate transmission scheme. In the "variable rate transmission scheme", a mobile station varies its transmission rate arbitrarily. Generally, a change in a data rate causes a change in a code rate of error correcting codes used in constructing a frame, a symbol repetition frequency, and a length and type of Walsh codes for spreading. Therefore, the mobile station should inform a base station of a data rate of the currently transmitted reverse supplemental channel, so that a base station receiver can correctly receive the reverse supplemental channel. A channel defined for this use is called a reverse rate indicator channel (R-RICH).

The number of kinds of data rates that can be transmitted by the mobile station over the reverse supplemental channel depends upon the number of reverse supplemental channels that can be simultaneously used by the mobile station. The number of the reverse supplemental channels is determined by the base station considering an amount of data to be transmitted over a reverse link during call setup, and then reported to the mobile station. Therefore, the number of information bits transmitted over the reverse rate indictor channel varies depending on the number of the reverse supplemental channels. That is, when the number of the reverse supplemental channels is 1, the mobile station informs a reverse data rate using 4 bits. Further, when the number of the reverse supplemental channels is 2, the mobile station informs the reverse data rate using 7 bits. Since the number of the reverse supplemental channels that can be simultaneously used by the mobile station cannot be changed until a separate command is received from the base station, the mobile station transmits either 4-bit information or 7-bit information over the reverse rate indicator channel. That is, the mobile station will never transmit both the 4-bit information and the 7-bit information at the same time. Conventionally, a (24,4) or (24,7) code is defined as an error correcting code to be used in the reverse rate indicator channel.

A disadvantage of the reverse rate indicator channel (R-RICH) lies in that the number of bits transmitted for transmission of the reverse rates depends upon only the number of the reverse supplemental channels. That is, the number of different data rates that can be transmitted by the mobile station over the reverse supplemental channel is not considered in determining the number of bits transmitted over the reverse supplemental channel. When the number of the transmission bits is determined regardless of the number of different data rates that can be transmitted by the mobile station over the reverse supplemental channel, the mobile station may transmit more bits than actually required bits. For example, when the number of reverse supplemental channels is 1 and the number of different (or "kinds of") data rates that can be transmitted by the mobile station over the reverse supplemental channel is 4, the minimum number of bits needed for transmitting the data rates is 2. However, in the prior art, when the number of the reverse supplemental channels is 1, the minimum number of the bits required for transmitting the data rates is 4.

In the conventional method in which the number of bits to be transmitted over the reverse rate indicator channel depends upon the number of the reverse supplemental channels, the number of the bits transmitted over the reverse rate indicator channel is larger than needed. Transmitting unnecessarily large number of the bits over the reverse rate indicator channel causes an increase in a code rate of an encoder, making it difficult to apply an optimal encoding method.

FIG. 1 illustrates a structure of an R-RICH transmitter. Referring to FIG. 1, an encoder 100 encodes a 4-bit or 7-bit input rate indicator and outputs 24 coded symbols. A symbol repeater 110 repeats 16 times the 24 coded symbols provided from the encoder 100. A signal mapper 120 performs signal mapping on the coded symbols output from the symbol repeater 110 by mapping 0 to 1 and 1 to −1. A spreader 130 spreads the signal-mapped symbols.

As illustrated in FIG. 1, the rate indicator has 4 bits or 7 bits, and encoded into 24 coded symbols before transmission. When errors occur during transmission of the rate indicator encoded into the coded symbols, the rate indicator may incorrectly indicate the code rate of the corresponding reverse supplemental channel, the symbol repetition frequency, and the length and type of the spread Walsh code. As a result, the receiver cannot correctly analyze the reverse supplemental channel. Therefore, the rate indicator should be encoded by a (24,4) or (24,7) encoder having good performance. In addition, the rate indicator should be decoded as fast as possible in order to analyze the corresponding supplemental channel.

SUMMARY OF THE INVENTION

It is, therefore, an object of the present invention to provide a rate indicator encoding apparatus and method having optimal performance.

It is another object of the present invention to provide a rate indicator encoding apparatus and method having a minimum complexity.

It is further another object of the present invention to provide an apparatus and method for minimizing hardware complexity by using a method of puncturing an extended first order Reed-Muller code so that an inverse fast Hadamard transform is performed in a decoding process.

It is yet another object of the present invention to provide an apparatus and method for using an optimal codeword by using a method of puncturing an extended first order Reed-Muller code so that an inverse fast Hadamard transform is performed in a decoding process.

It is still another object of the present invention to provide an apparatus and method for minimizing hardware complexity by minimizing a length of an orthogonal code before puncturing.

It is still another object of the present invention to provide an apparatus and method for not only minimizing hardware complexity by puncturing an extended orthogonal code, but also generating an optimal code in terms of error correcting performance.

It is still another object of the present invention to provide an apparatus and method for minimizing hardware complexity and performing all of (24,1) encoding to (24,7) encoding to generate an optimal code in terms of error correcting performance.

In accordance with one aspect of the present invention, there is provided an encoding method in a mobile communication system, for receiving 1 to 7 input information bits and outputting a coded symbol stream having 24 coded symbols depending on a predetermined number of the input information bits. The encoding method comprises (a) encoding the input information bits with Walsh codes W1, W2, W4, W8 and W16, and masks M1 and M2, all having a predetermined length, and outputting a coded symbol stream having a predetermined number of coded symbols; (b) previously determining a plurality of sets of puncturing positions corresponding to each of possible numbers of the input information bits, and determining puncturing positions corresponding to the number of the input information bits among the previously determined sets of the puncturing positions; and (c) puncturing coded symbols in the determined puncturing positions from the coded symbol stream having the predetermined number of coded symbols, and outputting the coded symbol stream having 24 coded symbols.

In accordance with another aspect of the present invention, there is provided an encoding apparatus in a mobile communication system, for receiving 1 to 7 input information bits and outputting a coded symbol stream having 24 coded symbols depending on a predetermined number of input information bits. The encoding apparatus comprises a Walsh code generator for generating 5 different Walsh codes W1, W2, W4, W8 and W16 having a predetermined length; a mask generator for generating 2 different masks M1 and M2; a plurality of multipliers for multiplying the input information bits by the Walsh codes W1, W2, W4, W8 and W16 and the masks M1 and M2 on a one-to-one basis and outputting a predetermined number of coded symbol streams; an XOR operator for XORing the coded symbol streams from the multipliers and outputting one coded symbol stream; and a puncturer for determining puncturing positions corresponding to the number of the input information bits among a plurality of sets of puncturing positions corresponding to each of possible numbers of the input information bits, puncturing coded symbols in the determined puncturing positions from the coded symbol stream from the XOR operator, and outputting the coded symbol stream having 24 coded symbols.

In accordance with further another aspect of the present invention, there is provided a decoding method in a mobile communication system, for receiving a coded symbol stream having 24 coded symbols and outputting 1 to 7 input information bits from the coded symbol stream. The decoding method comprises determining puncturing positions according to length information of the input information bits; inserting zero (0) in the determined puncturing positions for the coded symbol stream and outputting a coded symbol stream having a predetermined number of coded symbols; measuring correlation values of the zero-inserted coded symbol stream by the Walsh codes W1, W2, W4, W8 and W16 and the masks M1 and M2 having a length determined depending on the length information of the input information bits; and outputting the input information bits from the measured correlation values.

In accordance with yet another aspect of the present invention, there is provided a decoding apparatus in a mobile communication system, for receiving a coded symbol stream having 24 coded symbols and outputting 1 to 7 input information bits from the coded symbol stream. The decoding apparatus comprises a zero inserter for inserting zero (0) in different puncturing positions of the coded symbol stream depending on length information of the input information bits; a correlation measurer for measuring correlation values of the zero-inserted coded symbol stream by the Walsh codes W1, W2, W4, W8 and W16 and the masks M1 and M2 having a length determined depending on the length information of the input information bits; and a correlation comparator for outputting the input information bits from the measured correlation values.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In general, Hamming distance distribution for codewords of the error correcting codes serve as a measure indicating the performance of linear error correcting codes. The "Hamming distance" indicates the number of non-zero symbols in a codeword. That is, for a certain codeword '0111', the number of 1's included in the codeword is 3, so the Hamming distance is 3. The least value among the Hamming distance values is called a "minimum distance $d_{min}$", and an increase in the minimum distance of the codeword improves the error correcting performance of the error correcting codes. In other words, the "optimal code" means a code having the optimal error correcting performance. This is disclosed in detail in a paper, *The Theory of Error-Correcting Codes*, F. J. Macwilliams, N. J. A. Sloane, North-Holland. In addition, a paper, *An Updated Table of Minimum-Distance Bounds for Binary Linear Codes* (A. E. Brouwer and Tom Verhoeff, IEEE Transactions on information Theory, VOL 39, NO. 2, MARCH 1993), discloses an intercede minimum distance, which depends on the input and output values of the binary linear codes for the optimal code.

Figure 10:
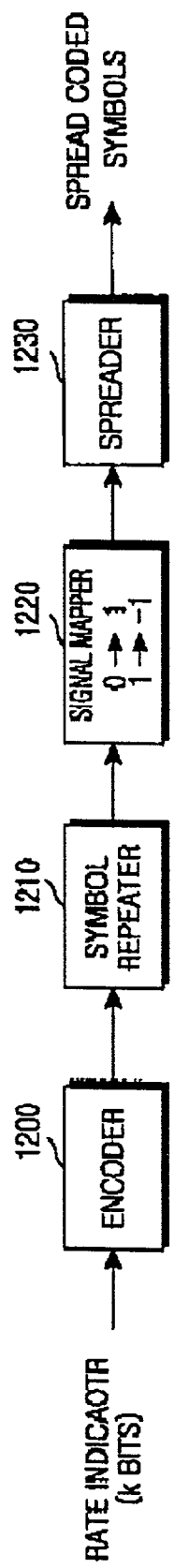
FIG. 10 illustrates a structure of an R-RICH transmitter for minimizing the number of bits assigned to a rate indicator according to an embodiment of the present invention.

FIG. 10 illustrates a structure of an R-RICH transmitter for minimizing the number of bits assigned to a rate indicator according to an embodiment of the present invention. Referring to FIG. 10, an encoder 1200 encodes a k-bit rate indicator and outputs a coded symbol stream comprised of 24 coded symbols. The number k of the bits assigned to the rate indicator is determined depending on the number of kinds of the data rates that can be transmitted by the mobile station over the reverse supplemental channel. The encoder 1200 serves as one of (24,1) encoder, (24,2) encoder, (24,3) encoder, (24,4) encoder, (24,5) encoder, (24,6) encoder and (24,7) encoder depending on the number k of input bits. A symbol repeater 1210 repeats 16 times the 24 coded symbols provided from the encoder 1200. A signal mapper 1220 performs signal mapping on the coded symbols output from the symbol repeater 1210 by mapping 0 to 1 and 1 to −1. A spreader 1230 spreads the signal-mapped symbols.

As stated above, minimizing the number of bits assigned to the rate indicator causes a decrease in a code rate of the encoder, thereby improving performance of the rate indicator channel.

The encoder for encoding the rate indicator channel includes (24,1) encoder, (24,2) encoder, (24,3) encoder, (24,4) encoder, (24,5) encoder, (24,6) encoder and (24,7) encoder. According to the above-stated paper, an optimal (24,1) linear encoder with 1 input bit and 24 output bits has a maximum distance 24; an optimal (24,2) linear encoder with 2 input bits and 24 output bits has a maximum distance 16; an optimal (24,3) linear encoder with 3 input bits and 24 output bits has a maximum distance 13; an optimal (24,4) linear encoder with 4 input bits and 24 output bits has a maximum distance 12; an optimal (24,5) linear encoder with 5 input bits and 24 output bits has a maximum distance 12; an optimal (24,6) linear encoder with 6 input bits and 24 output bits has a maximum distance 10; and an optimal (24,7) linear encoder with 7 input bits and 24 output bits has a maximum distance 10.

The (24,1) encoder to the (24,7) encoder for encoding the rate indicator will be described in turn.

1. (24,1) Encoder

The (24,1) encoder provided by the invention is constructed to generate an optimal (24,1) code by repeating a (2,1) Reed-Muller code 32 times and then puncturing 40 symbols from the repeated code. Although there are many ways to create the (24,1) code, it is possible not only to minimize hardware complexity but also to create an optimal codeword in terms of error correcting performance by utilizing a method of puncturing a first order Reed-Muller code according to an embodiment of the present invention. It will be assumed that the embodiment of the present invention generates the error correcting codes using the Reed-Muller code. Also, it is possible to minimize the hardware complexity by minimizing a length of the Reed-Muller code before puncturing.

The (24,1) encoder outputs coded symbols of length 24 by repeating 32 times 2 coded symbols output from a (2,1) Reed-Muller code generator and then puncturing 40 symbols from the repeated coded symbols. A change in the puncturing positions where the 40 symbols are punctured from the repeated coded symbols of length 64 causes a change in the minimum distance $d_{min}$ of the codeword. Therefore, in order to make a (24,1) encoder with excellent error correcting performance in the coded symbols of length 64, it is important to calculate the puncturing positions where the largest minimum distance can be obtained.

The simplest puncturing pattern for the 40 puncturing positions needed to generate an optimal (24,1) linear code is {even-numbered puncturing positions and positions 1, 3, 5, 7, 9, 11, 13, 15}. In this case, a transmitter and a receiver of the mobile communication system transmitting the 1 information bit using the encoding/decoding method according to the present invention previously exchange or otherwise pre-store the 40 puncturing positions. The puncturing positions are generally defined in a communication protocol. Alternatively, the transmitter may previously provide information on the puncturing positions.

Figure 11:
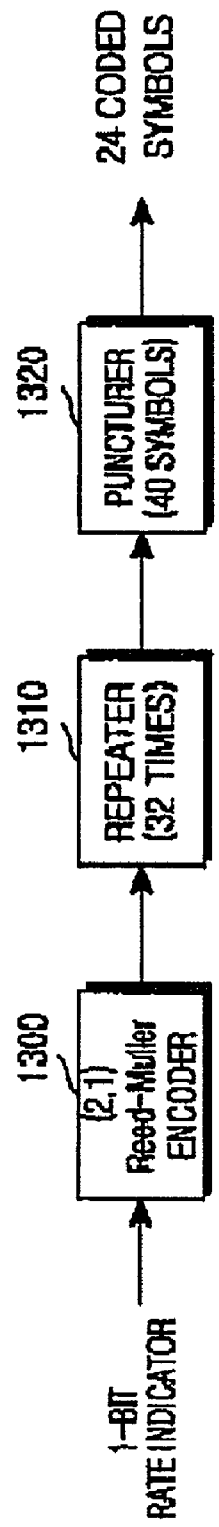
FIG. 11 illustrates a structure of a (24,1) encoder included in a transmitter according to an embodiment of the present invention.

With reference to FIG. 11, a method for encoding an optimal (24,1) code according to an embodiment of the present invention will be described. FIG. 11 illustrates a structure of an encoder included in a transmitter according to an embodiment of the present invention. Referring to FIG. 11, one input information bit a0 is applied to a (2,1) Reed-Muller encoder 1300. Here, the input information bit a0 constitutes a rate indicator. The Reed-Muller encoder 1300 encodes the input information bit a0 and outputs coded symbols of length 2 (or a coded symbol stream). The coded symbols constitute a Reed-Muller code. The 2 coded symbols are provided to a repeater 1310. The repeater 1310 outputs 64 coded symbols by repeating the received 2 coded symbols 32 times. Upon receiving the 64 coded symbols, a puncturer 1320 punctures coded symbols in the 40 optimal puncturing positions from the received 64 coded symbols, and outputs coded symbols of length 24. The puncturer 1320 punctures the even-numbered symbols and the $1^{st}$, $3^{rd}$, $5^{th}$, $7^{th}$, $9^{th}$, $11^{th}$, $13^{th}$ and $15^{th}$ symbols in the above-stated 40 optimal puncturing positions from the received 64 coded symbols, and then outputs 24 coded symbols.

A general code theory defines a generating matrix in order to show a mapping relation between the input information and the coded symbols. When the symbol repetition and puncturing are included, a generating matrix for a final (24,1) encoder is represented by $$M=[1111\ 1111\ 1111\ 1111\ 1111\ 1111] \quad \text{Equation 1}$$

The generating matrix of Equation 1 selects 24 symbols in a first row if the 1-bit input signal is 1, and selects no symbol if the 1-bit input signal is 0. When no symbol is selected, the symbol stream is comprised of 24 0's.

Figure 12:
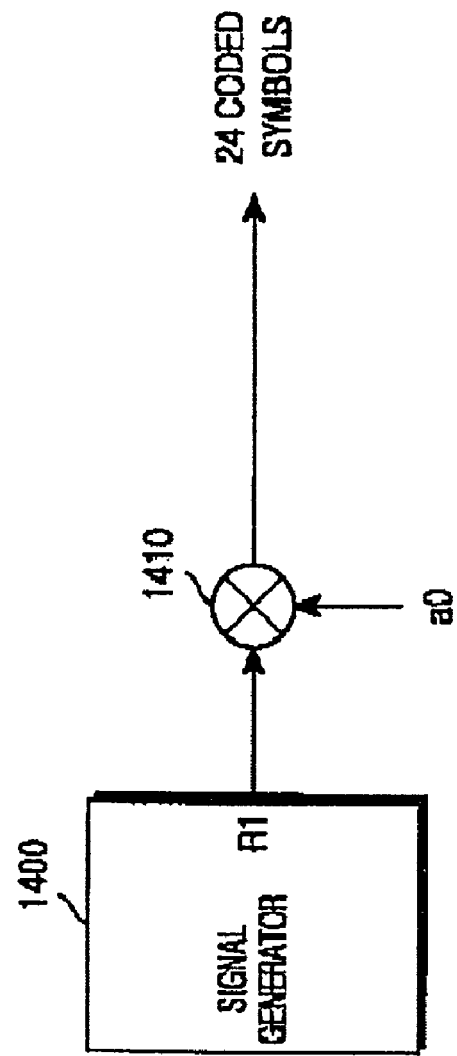
FIG. 12 illustrates a (24,1) encoder based on the generating matrix in FIG. 11.

FIG. 12 illustrates a (24,1) encoder based on the above generating matrix. Referring to FIG. 12, an input information bit a0 having a value of 0 or 1 is applied to a multiplier 1410. At the same time, a signal generator 1400 outputs one symbol stream constituting the generating matrix, stored in a memory. That is, the signal generator 1400 stores a symbol stream R1=1111 1111 1111 1111 1111 1111 of length 24 corresponding to the generating matrix in the memory, and provides the stored symbol stream R1 to the multiplier 1410. The multiplier 1410 then multiplies the symbols of the symbol stream R1 by the input information bit a0, and outputs a coded symbol stream of length 24.

2. (24,2) Encoder

The (24,2) encoder provided by the invention is constructed to generate an optimal (24,2) code by repeating a (4,2) Reed-Muller code 8 times and then puncturing 8 symbols from the repeated code. Although there are many ways to create the (24,2) code, it is possible not only to minimize hardware complexity but also to create an optimal codeword in terms of error correcting performance by utilizing a method of puncturing a first order Reed-Muller code according to an embodiment of the present invention. It will be assumed that the embodiment of the present invention generates the error correcting codes using the Reed-Muller code. Also, it is possible to minimize the hardware complexity by minimizing a length of the Reed-Muller code before puncturing.

The (24,2) encoder outputs coded symbols of length 24 by repeating 8 times 4 coded symbols output from a (4,2) Reed-Muller code generator and then puncturing 8 symbols from the repeated coded symbols. A change in the puncturing positions where the 8 symbols are punctured from the repeated coded symbols of length 32 causes a change in the minimum distance $d_{min}$ of the codeword. Therefore, in order to make a (24,2) encoder with excellent error correcting performance in the coded symbols of length 32, it is important to calculate the puncturing positions where the largest minimum distance can be obtained.

The simplest puncturing pattern for the 8 puncturing positions needed to generate an optimal (24,2) linear code is {0, 4, 8, 12, 16, 20, 24, 28}. In this case, a transmitter and a receiver of the mobile communication system transmitting 2 information bits using the encoding/decoding method according to the present invention previously exchange or otherwise pre-store the 8 puncturing positions. The puncturing positions are generally defined in a communication protocol. Alternatively, the transmitter may previously provide information on the puncturing positions.

Figure 13:
FIG. 13 illustrates a structure of a (24,2) encoder included in a transmitter according to an embodiment of the present invention.

With reference to FIG. 13, a method for encoding an optimal (24,2) code according to an embodiment of the present invention will be described. FIG. 13 illustrates a structure of an encoder included in a transmitter according to an embodiment of the present invention. Referring to FIG. 13, 2 input information bits a0 and a1 are applied to a (4,2) Reed-Muller encoder 1500. Here, the input information bits a0 and a1 constitute a rate indicator. The Reed-Muller encoder 1500 encodes the input information bits a0 and a1, and outputs coded symbols of length 4 (or a coded symbol stream). The coded symbols constitute a Reed-Muller code. The 4 coded symbols are provided to a repeater 1510. The repeater 1510 outputs 32 coded symbols by repeating 8 times the received coded symbols of length 4. Upon receiving the 32 coded symbols, a puncturer 1520 punctures $0^{th}$, $4^{th}$, $8^{th}$, $12^{th}$, $16^{th}$, $20^{th}$, $24^{th}$ and $28^{th}$ symbols in the 8 optimal puncturing positions from the 32 coded symbols, and thus outputs 24 coded symbols.

A general code theory defines a generating matrix in order to show a mapping relation between the input information and the coded symbols. When the symbol repetition and puncturing are included, a generating matrix for a final (24,2) encoder is represented by $$M = \begin{bmatrix} 101101101101101101101101 \\ 011011011011011011011011 \end{bmatrix} \quad \text{Equation 2}$$

The generating matrix of Equation 2 selects 24 symbols in a first row if the first input information bit of the 2 input information bits is 1, and selects no symbol if the first input information bit is 0. The generating matrix selects 24 symbols in a second row if the second input information bit of the 2 input information bits is 1, and selects no symbols if the second input information bit is 0. A coded symbol stream for the input information bits is generated by XORing all the selected streams in a symbol unit.

Figure 14:
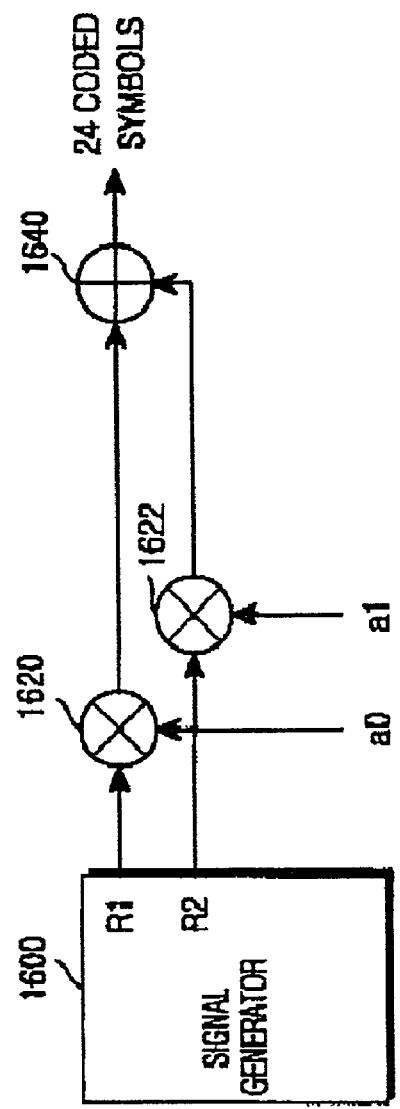
FIG. 14 illustrates a (24,2) encoder based on the generating matrix in FIG. 13.

FIG. 14 illustrates a (24,2) encoder based on the above generating matrix. Referring to FIG. 14, of the input information bits a0 and a1 having a value of 0 or 1, the input information bit a0 is applied to a multiplier 1620, and the input information bit a1 is applied to a multiplier 1622, respectively. At the same time, a signal generator 1600 provides two symbol streams constituting the generating matrix, stored in a memory, to the associated multipliers. That is, the signal generator 1600 stores a symbol stream R1=101 101 101 101 101 101 101 101 of length 24 corresponding to the first row of the generating matrix in the memory, and provides the stored symbol stream R1 to the multiplier 1620. Further, the signal generator 1600 stores a symbol stream R2=011 011 011 011 011 011 011 011 of length 24 corresponding to the second row of the generating matrix in the memory, and provides the stored symbol stream R2 to the multiplier 1622. The multiplier 1620 then multiplies the symbols of the symbol stream R1 by the input information bit a0, and outputs a symbol stream of length 24 to an XOR operator 1640. Further, the multiplier 1622 multiplies the symbols of the symbol stream R2 by the input information bit a1, and outputs a symbol stream of length 24 to the XOR operator 1640. The XOR operator 1640 then XORs the received 2 symbol streams of length 24 in a symbol unit, and outputs a coded symbol stream of length 24.

3. (24,3) Encoder

The (24,3) encoder provided by the invention is constructed to generate an optimal (24,3) code by repeating a (8,3) Reed-Muller code 4 times and then puncturing 8 symbols from the repeated code. Although there are many ways to create the (24,3) code, it is possible not only to minimize hardware complexity but also to create an optimal codeword in terms of error correcting performance by utilizing a method of puncturing a first order Reed-Muller code according to an embodiment of the present invention. It will be assumed that the embodiment of the present invention generates the error correcting codes using the Reed-Muller code. Also, it is possible to minimize the hardware complexity by minimizing a length of the Reed-Muller code before puncturing.

The (24,3) encoder outputs coded symbols of length 24 by repeating 4 times 8 coded symbols output from a (8,3) Reed-Muller code generator and then puncturing 8 symbols from the repeated coded symbols. A change in the puncturing positions where the 8 symbols are punctured from the coded symbols of length 32 causes a change in the minimum distance $d_{min}$ of the codeword. Therefore, in order to make a (24,3) encoder with excellent error correcting performance in the coded symbols of length 32, it is important to calculate the puncturing positions where the largest minimum distance can be obtained.

The simplest puncturing pattern for the 8 puncturing positions needed to generate an optimal (24,3) linear code is {0, 3, 5, 6, 7, 8, 16, 24}. In this case, a transmitter and a receiver of the mobile communication system transmitting 3 information bits using the encoding/decoding method according to the present invention previously exhange or otherwise pre-store the 8 puncturing positions. The puncturing positions are generally defined in a communication protocol. Alternatively, the transmitter may previously provide information on the puncturing positions.

Figure 15:
FIG. 15 illustrates a structure of a (24,3) encoder included in a transmitter according to an embodiment of the present invention.

With reference to FIG. 15, a method for encoding an optimal (24,3) code according to an embodiment of the present invention will be described. FIG. 15 illustrates a structure of an encoder included in a transmitter according to an embodiment of the present invention. Referring to FIG. 15, 3 input information bits a0, a1 and a2 are applied to a (8,3) Reed-Muller encoder 1700. Here, the input information bits a0, a1 and a2 constitute a rate indicator. The Reed-Muller encoder 1700 encodes the input information bits a0, a1, and a2, and outputs coded symbols of length 8 (or a coded symbol stream). The coded symbols constitute a Reed-Muller code. The 8 coded symbols are provided to a repeater 1710. The repeater 1710 outputs 32 coded symbols by repeating 4 times the received coded symbols of length 8. Upon receiving the 32 coded symbols, a puncturer 1720 punctures $0^{th}$, $3^{rd}$, $5^{th}$, $6^{th}$, $7^{th}$, $8^{th}$, $16^{th}$ and $24^{th}$ symbols in the 8 optimal puncturing positions from the 32 coded symbols, and outputs 24 coded symbols.

A general code theory defines a generating matrix in order to show a mapping relation between the input information and the coded symbols. When the symbol repetition and puncturing are included, a generating matrix for a final (24,3) encoder is represented by $$M = \begin{bmatrix} 100101010110101011010101 \\ 010011001101100110110011 \\ 001000111100011110001111 \end{bmatrix} \quad \text{Equation 3}$$

The generating matrix of Equation 3 selects 24 symbols in a first row if the first input information bit among the 3 input information bits is 1, and selects no symbol if the first input information bit is 0. The generating matrix selects 24 symbols in a second row if the second input information bit among the 3 input information bits is 1, and selects no symbols if the second input information bit is 0. Further, the generating matrix selects 24 symbols in a third row if the third input information bit among the 3 input information bits is 1, and selects no symbols if the third input information bit is 0. A coded symbol stream for the input information bits is generated by XORing all the selected streams in a symbol unit.

Figure 16:
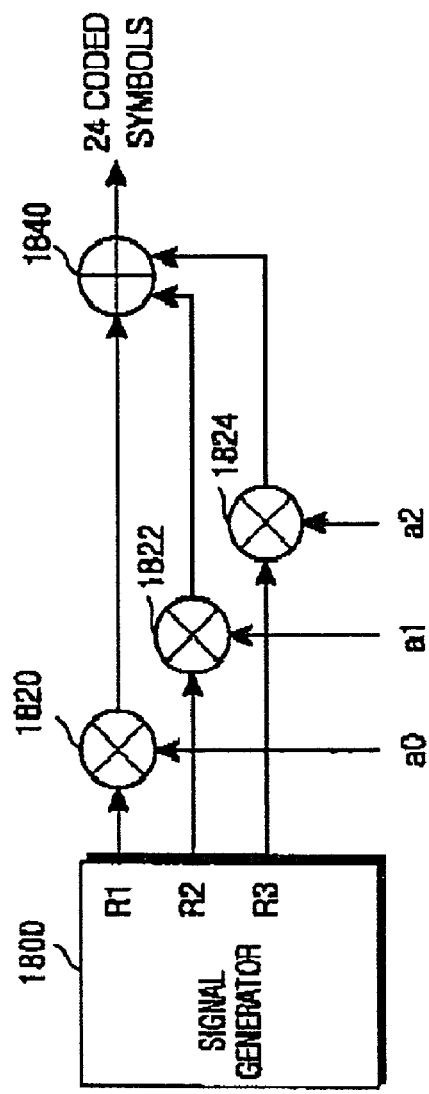
FIG. 16 illustrates a (24,3) encoder based on the generating matrix in FIG. 15.

FIG. 16 illustrates a (24,3) encoder based on the above generating matrix. Referring to FIG. 16, of the input information bits a0, a1, and a2 having a value of 0 or 1, the input information bit a0 is applied to a multiplier 1820, the input information bit a1 is applied to a multiplier 1822, and the input information bit a2 is applied to a multiplier 1824, respectively. At the same time, a signal generator 1800 provides three symbol streams constituting the generating matrix, stored in a memory, to the associated multipliers. That is, the signal generator 1800 stores a symbol stream R1=100 101 0101 101 0101 101 0101 of length 24 corresponding to the first row of the generating matrix in the memory, and provides the stored symbol stream R1 to the multiplier 1820. The signal generator 1800 stores a symbol stream R2=010 011 0011 011 0011 011 0011 of length 24 corresponding to the second row of the generating matrix in the memory, and provides the stored symbol stream R2 to the multiplier 1822. Further, the signal generator 1800 stores a symbol stream R3=001 000 1111 000 1111 000 1111 of length 24 corresponding to the third row of the generating matrix in the memory, and provides the stored symbol stream R3 to the multiplier 1824. The multiplier 1820 then multiplies the symbols of the symbol stream R1 by the input information bit a0, and outputs a symbol stream of length 24 to an XOR operator 1840. The multiplier 1822 multiplies the symbols of the symbol stream R2 by the input information bit a1, and outputs a symbol stream of length 24 to the XOR operator 1840. Further, the multiplier 1824 multiplies the symbols of the symbol stream R3 by the input information bit a2, and outputs a symbol stream of length 24 to the XOR operator 1840. The XOR operator 1840 then XORs the received 3 symbol streams of length 24 in a symbol unit, and outputs a coded symbol stream of length 24.

4. (24,4) Encoder

The (24,4) encoder provided by the invention is constructed to generate an optimal (24,4) code by repeating a (16,4) Reed-Muller code 4 times and then puncturing 8 symbols from the repeated code. Although there are many ways to create the (24,4) code, it is possible not only to minimize hardware complexity but also to create an optimal codeword in terms of error correcting performance by utilizing a method of puncturing a first order Reed-Muller code according to an embodiment of the present invention. Also, it is possible to minimize the hardware complexity by minimizing a length of the Reed-Muller code before puncturing. It will be assumed that the embodiment of the present invention generates the error correcting codes using the Reed-Muller code.

The (24,4) encoder outputs coded symbols of length 24 by repeating twice 16 coded symbols output from a (16,4) Reed-Muller code generator and then puncturing 8 symbols from the repeated coded symbols. A change in the puncturing positions where the 8 symbols are punctured from the coded symbols of length 32 causes a change in the minimum distance $d_{min}$ of the codeword. Therefore, in order to make a (24,4) encoder with excellent error correcting performance in the coded symbols of length 32, it is important to calculate the puncturing positions where the largest minimum distance can be obtained.

The simplest puncturing pattern for the 8 puncturing positions needed to generate an optimal (24,4) linear code is {0, 1, 2, 3, 4, 5, 6, 16}. In this case, a transmitter and a receiver of the mobile communication system transmitting 4 information bits using the encoding/decoding method according to the present invention should previously agree on the 8 puncturing positions. The puncturing positions are generally defined in a communication protocol. Alternatively, the transmitter may previously provide information on the puncturing positions.

Figure 1:
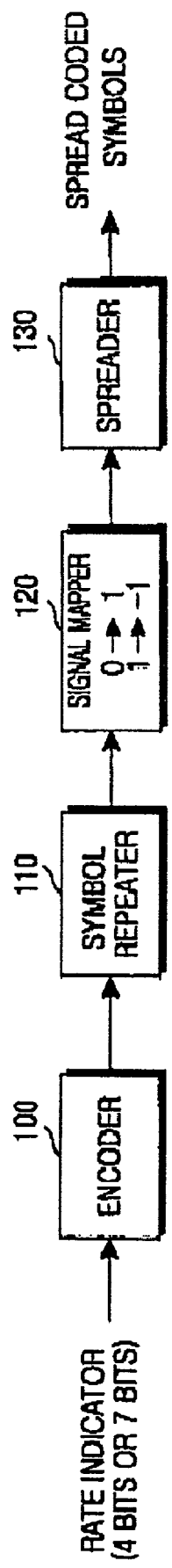
FIG. 1 illustrates a structure of an R-RICH (Reverse Rate Indicator Channel) transmitter in a general CDMA mobile communication system.
Figure 2:
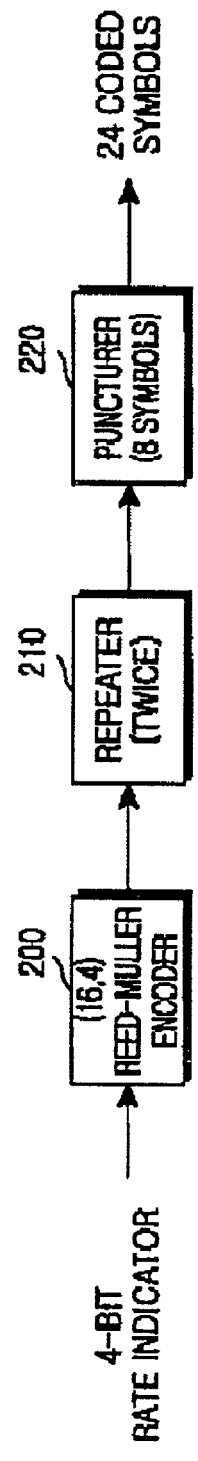
FIG. 2 illustrates a structure of an optimal (24,4) encoder in a CDMA mobile communication system according to an embodiment of the present invention.

With reference to FIG. 2, a method for encoding an optimal (24,4) code according to an embodiment of the present invention will be described. FIG. 2 illustrates a structure of an encoder included in a transmitter according to an embodiment of the present invention. Referring to FIG. 2, 4 input information bits a0, a1, a2 and a3 are applied to a (16,4) Reed-Muller encoder 200. Here, the input information bits a0, a1, a2 and a3 constitute a rate indicator. The Reed-Muller encoder 200 encodes the input information bits a0, a1, a2 and a3, and outputs coded symbols of length 16 (or a coded symbol stream). The coded symbols constitute a Reed-Muller code. The 16 coded symbols are provided to a repeater 210. The repeater 210 outputs 32 coded symbols by repeating twice the received coded symbols of length 16. Upon receiving the 32 coded symbols, a puncturer 220 punctures $0^{th}$, $1^{st}$, $2^{nd}$, $3^{rd}$, $4^{th}$, $5^{th}$, $6^{th}$ and $16^{th}$ symbols in the 8 optimal puncturing positions from the 32 coded symbols, and outputs 24 coded symbols.

A general code theory defines a generating matrix in order to show a mapping relation between the input information and the coded symbols. When the symbol repetition and puncturing are included, a generating matrix for a final (24,4) encoder is represented by $$M = \begin{bmatrix} 101010101101010101010101 \\ 100110011011001100110011 \\ 100001111000111100001111 \\ 011111111000000011111111 \end{bmatrix} \quad \text{Equation 4}$$

The generating matrix of Equation 4 selects 24 symbols in a first row if the first input information bit among the 4 input information bits is 1, and selects no symbol if the first input information bit is 0. The generating matrix selects 24 symbols in a second row if the second input information bit among the 4 input information bits is 1, and selects no symbols if the second input information bit is 0. The generating matrix selects 24 symbols in a third row if the third input information bit among the 4 input information bits is 1, and selects no symbols if the third input information bit is 0. Further, the generating matrix selects 24 symbols in a fourth row if the fourth input information bit among the 4 input information bits is 1, and selects no symbols if the fourth input information bit is 0. A coded symbol stream for the input information bits is generated by XORing all the selected streams in a symbol unit.

Figure 7:
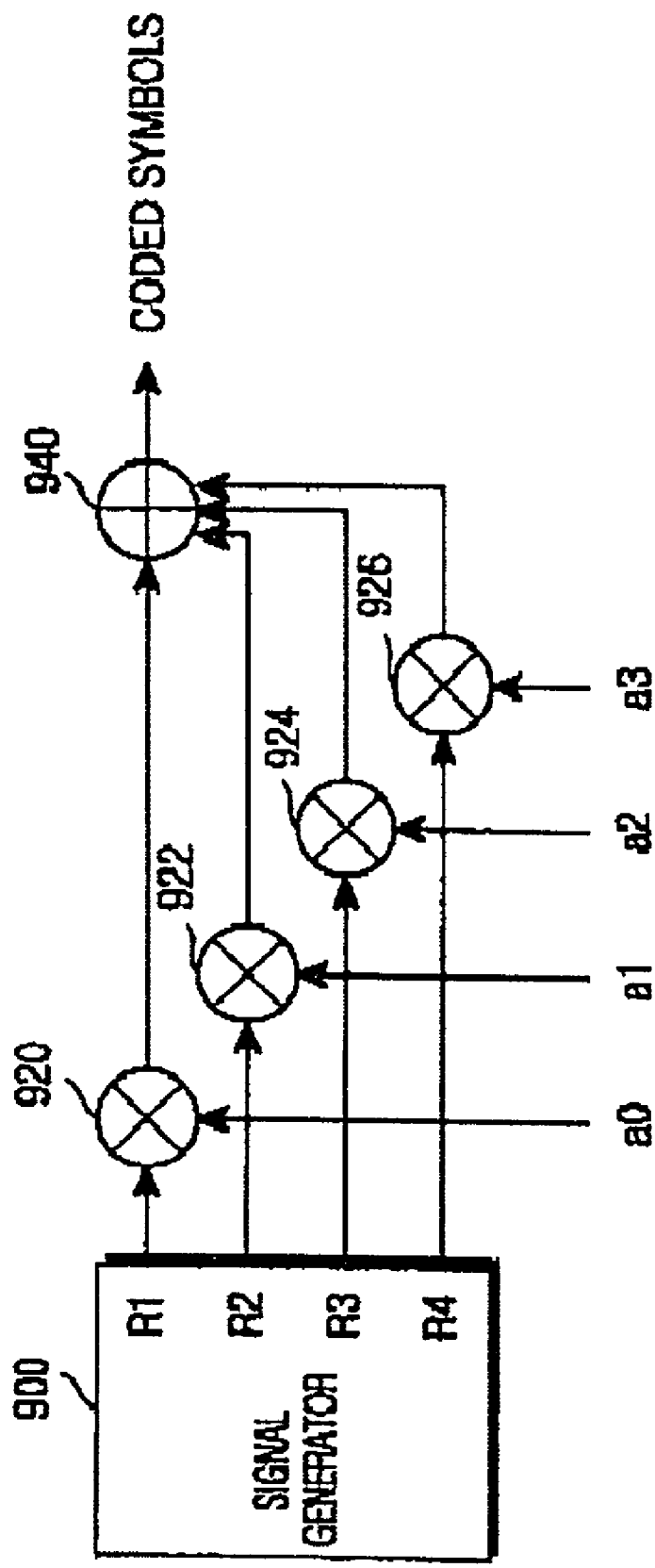
FIG. 7 illustrates a structure of a (24,4) encoder based on a generating matrix according to an embodiment of the present invention.

FIG. 7 illustrates a (24,4) encoder based on the above generating matrix. Referring to FIG. 7, of the input information bits a0–a3 having a value of 0 or 1, the input information bit a0 is applied to a multiplier 920, the input information bit a1 is applied to a multiplier 922, the input information bit a2 is applied to a multiplier 924, and the input information bit a3 is applied to a multiplier 926, respectively. At the same time, a signal generator 900 provides 4 symbol streams R1–R4 constituting the generating matrix, stored in a memory, to the multipliers 920–926, respectively. To be specific, the signal generator 900 reads a symbol stream R1=1010 1010 1101 0101 0101 0101 of length 24 corresponding to the first row of the generating matrix, stored in the memory, and provides the read symbol stream R1 to the multiplier 920. The signal generator 900 reads a length-24 symbol stream R2=1001 1001 1011 0011 0011 0011 corresponding to the second row of the generating matrix, stored in the memory, and provides the read symbol stream R2 to the multiplier 922. The signal generator 900 reads a length-24 symbol stream R3=1000 0111 1000 1111 0000 1111 corresponding to the third row of the generating matrix, stored in the memory, and provides the read symbol stream R3 to the multiplier 924. Finally, the signal generator 900 reads a length-24 symbol stream R4=0111 1111 1000 0000 1111 1111 corresponding to the fourth row of the generating matrix, stored in the memory, and provides the read symbol stream R4 to the multiplier 926. Then, the multiplier 920 multiplies the symbols of the symbol stream R1 by the input information bit a0, and outputs a symbol stream of length 24 to an XOR operator 940. The multiplier 922 multiplies the symbols of the symbol stream R2 by the input information bit a1, and outputs a symbol stream of length 24 to the XOR operator 940. The multiplier 924 multiplies the symbols of the symbol stream R3 by the input information bit a2, and outputs a symbol stream of length 24 to the XOR operator 940. The multiplier 926 multiplies the symbols of the symbol stream R4 by the input information bit a3, and outputs a symbol stream of length 24 to the XOR operator 940. The XOR operator 940 then XORs the 4 symbol streams of length 24 in a symbol unit, and outputs a coded symbol stream of length 24.

5. (24,5) Encoder

The (24,5) encoder provided by the invention is constructed to generate an optimal (24,5) code by puncturing 8 symbols from a (32,5) first order Reed-Muller code. Although there are many ways to create the (24,5) code, it is possible not only to minimize hardware complexity but also to create an optimal codeword in terms of error correcting performance by utilizing a method of puncturing a first order Reed-Muller code according to an embodiment of the present invention. It will be assumed that the embodiment of the present invention generates the error correcting codes using the Reed-Muller code. Also, it is possible to minimize the hardware complexity by minimizing a length of the Reed-Muller code before puncturing.

The (24,5) encoder outputs coded symbols of length 24 by outputting 32 coded symbols generated by a (32,5) Reed-Muller code generator and then puncturing 8 symbols from the 32 coded symbols. A change in the puncturing positions where the 8 symbols are punctured from the coded symbols of length 32 causes a change in the minimum distance $d_{min}$ of the codeword. Therefore, in order to make a (24,5)

encoder with excellent error correcting performance in the (32,5) first order Reed-Muller code, it is important to calculate the puncturing positions where the largest minimum distance can be obtained.

The simplest puncturing pattern for the 8 puncturing positions needed to generate an optimal (24,5) linear code is {0, 1, 2, 3, 4, 5, 6, 7}. In this case, a transmitter and a receiver of the mobile communication system transmitting 5 information bits using the encoding/decoding method according to the present invention previously exchange or otherwise pre-store the 8 puncturing positions. The puncturing positions are generally defined in a communication protocol. Alternatively, the transmitter may previously provide information on the puncturing positions.

Figure 17:
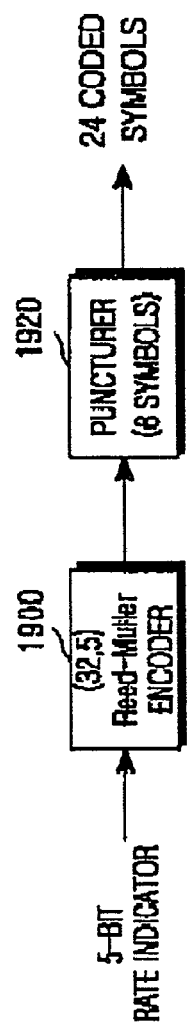
FIG. 17 illustrates a structure of a (24,5) encoder included in a transmitter according to an embodiment of the present invention.

With reference to FIG. 17, a method for encoding an optimal (24,5) code according to an embodiment of the present invention will be described. FIG. 17 illustrates a structure of an encoder included in a transmitter according to an embodiment of the present invention. Referring to FIG. 17, 5 input information bits a0, a1, a2, a3 and a4 are applied to a (32,5) Reed-Muller encoder 1900. Here, the input information bits a0, a1, a2, a3 and a4 constitute a rate indicator. The Reed-Muller encoder 1900 encodes the input information bits a0, a1, a2, a3 and a4, and outputs coded symbols of length 32 (or a coded symbol stream). Upon receiving the 32 coded symbols, a puncturer 1920 punctures $0^{th}$, $1^{st}$, $2^{nd}$ $3^{rd}$, $4^{th}$, $5^{th}$, $6^{th}$ and $7^{th}$ symbols in the 8 optimal puncturing positions from the 32 coded symbols, and outputs 24 coded symbols.

A general code theory defines a generating matrix in order to show a mapping relation between the input information and the coded symbols. When the symbol repetition and puncturing are included, a generating matrix for a final (24,5) encoder is represented by $$M = \begin{bmatrix} 0101010101010101010101 \\ 0011001100110011001100 11 \\ 0000111100001111 00001111 \\ 1111111100000000 11111111 \\ 0000000011111111 11111111 \end{bmatrix}$$ Equation 5

The generating matrix of Equation 5 selects 24 symbols in a first row if the first input information bit among the 5 input information bits is 1, and selects no symbol if the first input information bit is 0. The generating matrix selects 24 symbols in a second row if the second input information bit among the 5 input information bits is 1, and selects no symbols if the second input information bit is 0. The generating matrix selects 24 symbols in a third row if the third input information bit among the 5 input information bits is 1, and selects no symbols if the third input information bit is 0. The generating matrix selects 24 symbols in a fourth row if the fourth input information bit among the 5 input information bits is 1, and selects no symbols if the fourth input information bit is 0. Further, the generating matrix selects 24 symbols in a fifth row if the fifth input information bit among the 5 input information bits is 1, and selects no symbols if the fifth input information bit is 0. A coded symbol stream for the input information bits is generated by XORing all the selected streams in a symbol unit.

Figure 18:
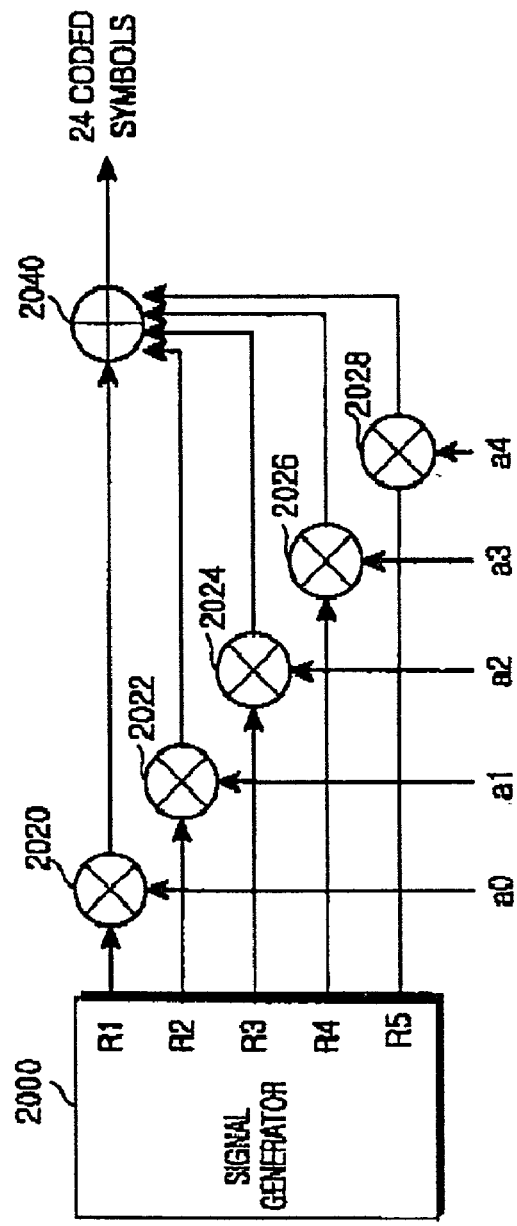
FIG. 18 illustrates a (24,5) encoder based on the generating matrix in FIG. 17.

FIG. 18 illustrates a (24,5) encoder based on the above generating matrix. Referring to FIG. 18, of the input information bits a0–a4 having a value of 0 or 1, the input information bit a0 is applied to a multiplier 2020, the input information bit a1 is applied to a multiplier 2022, the input information bit a2 is applied to a multiplier 2024, the input information bit a3 is applied to a multiplier 2026 and the input information bit a4 is applied to a multiplier 2028, respectively. At the same time, a signal generator 2000 provides 5 symbol streams R1–R5 constituting the generating matrix, stored in a memory, to the multipliers 2020–2026, respectively. To be specific, the signal generator 2000 reads a symbol stream R1=0101 0101 0101 0101 0101 0101 of length 24 corresponding to the first row of the generating matrix, stored in the memory, and provides the read symbol stream R1 to the multiplier 2020. The signal generator 2000 reads a length-24 symbol stream R2=0011 0011 0011 0011 0011 0011 corresponding to the second row of the generating matrix, stored in the memory, and provides the read symbol stream R2 to the multiplier 2022. The signal generator 2000 reads a length-24 symbol stream R3=0000 1111 0000 1111 0000 1111 corresponding to the third row of the generating matrix, stored in the memory, and provides the read symbol stream R3 to the multiplier 2024. The signal generator 2000 reads a length-24 symbol stream R4=1111 1111 0000 0000 1111 1111 corresponding to the fourth row of the generating matrix, stored in the memory, and provides the read symbol stream R4 to the multiplier 2026. Finally, the signal generator 2000 reads a length-24 symbol stream R5=0000 0000 1111 1111 1111 1111 corresponding to the fifth row of the generating matrix, stored in the memory, and provides the read symbol stream R5 to the multiplier 2028. Then, the multiplier 200 multiplies the symbols of the symbol stream R1 by the input information bit a0, and outputs a symbol stream of length 24 to an XOR operator 2040. The multiplier 2022 multiplies the symbols of the symbol stream R2 by the input information bit a1, and outputs a symbol stream of length 24 to the XOR operator 2040. The multiplier 2024 multiplies the symbols of the symbol stream R3 by the input information bit a2, and outputs a symbol stream of length 24 to the XOR operator 2040. The multiplier 2026 multiplies the symbols of the symbol stream R4 by the input information bit a3, and outputs a symbol stream of length 24 to the XOR operator 2040. The multiplier 2028 multiplies the symbols of the symbol stream R5 by the input information bit a4, and outputs a symbol stream of length 24 to the XOR operator 2040. The XOR operator 2040 then XORs the 5 symbol streams of length 24 in a symbol unit, and outputs a coded symbol stream of length 24.

6. (24,6) Encoder

The (24,6) encoder provided by the invention is constructed to generate an optimal (24,6) code by puncturing 8 symbols from an extended orthogonal code obtained by extending a codeword using one mask function for a (32,5) orthogonal code (or first order Reed-Muller code).

Figure 3:
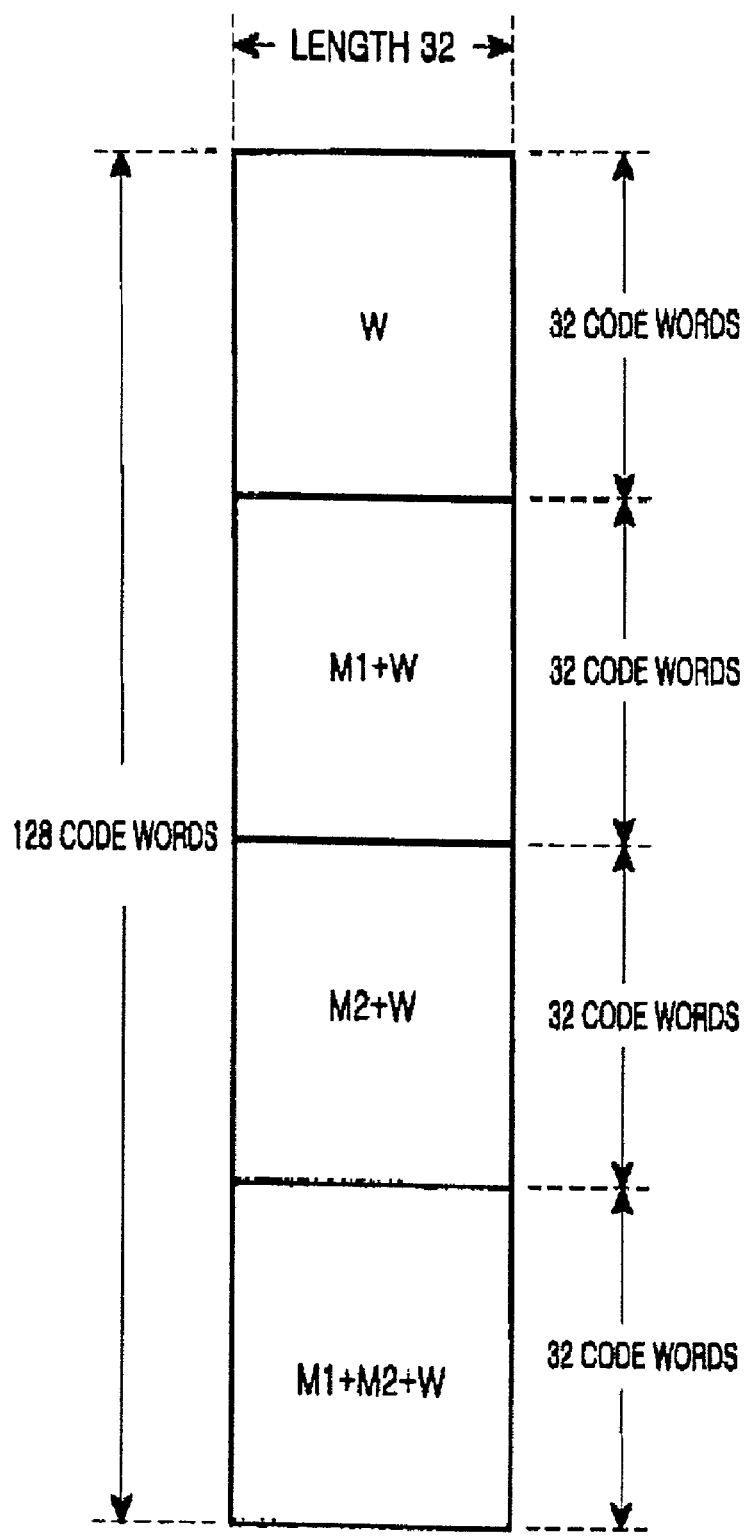
FIG. 3 illustrates a structure of a codeword according to an embodiment of the present invention.
Figure 19:
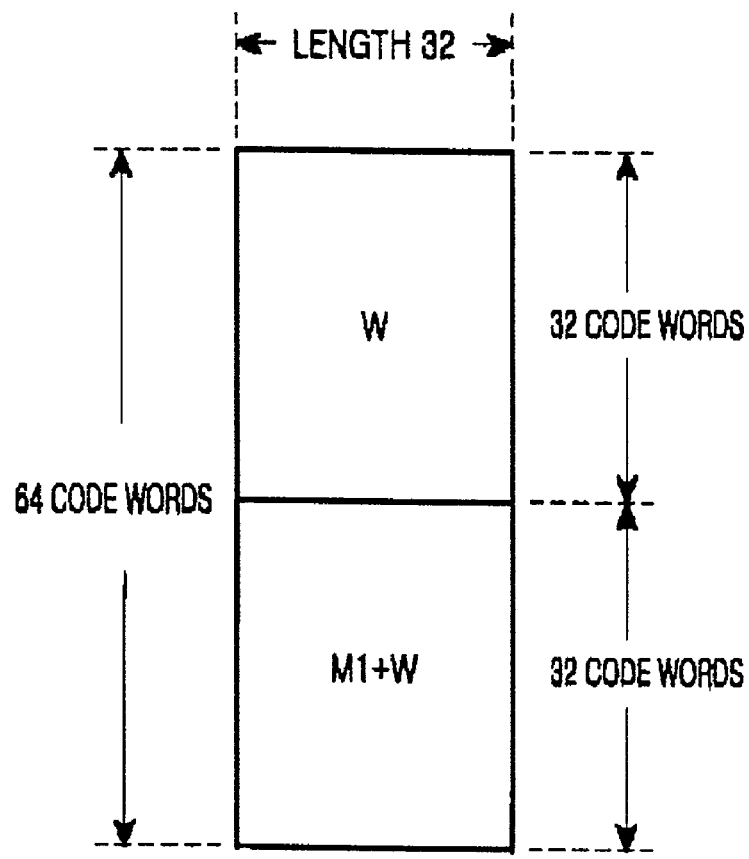
FIG. 19 illustrates a structure of an extended orthogonal code according to an embodiment of the present invention.

FIG. 19 illustrates a structure of the extended orthogonal code. Referring to FIG. 3, when M1 is the mask function in use, 32 orthogonal codewords W of length 32 are used for the upper 32 codewords, and 32 codewords (M1+W) determined by XORing the mask function M1 and the 32 orthogonal codewords W are used for the next 32 codewords. Therefore, a total of $2^6$=64 codewords are used as the extended orthogonal codes. The mask function for optimizing a (24,6) code is determined experimentally.

For example, the mask function M1 is as follows.
M1=0000 0000 1110 1000 1101 1000 1100 0000

Although there are many ways to create the (24,6) linear code, it is possible not only to minimize hardware complexity but also to generate an optimal codeword in terms of error correcting performance by utilizing a method of puncturing an extended first order Reed-Muller code according to an embodiment of the present invention so that an inverse fast Hadamard transform is performed in a decoding process. The embodiment of the present invention generates an error correcting code using the extended orthogonal code. Further, it is possible to minimize the hardware complexity by minimizing a length of the orthogonal code before puncturing.

The (24,6) codeword is generated by puncturing 8 symbols from the 32 coded symbols output from a (32,6) extended code generator. Here, a change in the puncturing positions where the 8 symbols are punctured from the 32 extended coded symbols causes a change in the minimum distance $d_{min}$ of the codeword. Therefore, in order to make a (24,6) encoder with excellent error correcting performance in the (32,6) extended orthogonal code, it is important to calculate the puncturing positions where the largest minimum distance can be obtained.

The 8 puncturing positions needed for generating an optimal (24,6) linear code are calculated through experimentation. The simplest puncturing pattern is {0, 1, 2, 3, 4, 5, 6, 7}. In this case, a transmitter and a receiver of the mobile communication system transmitting the 6 information bits using the encoding/decoding method according to the present invention previously exchange or otherwise pre-store the 8 puncturing positions. The puncturing positions are generally defined in a communication protocol. Alternatively, the transmitter may previously provide information on the puncturing positions.

Figure 20:
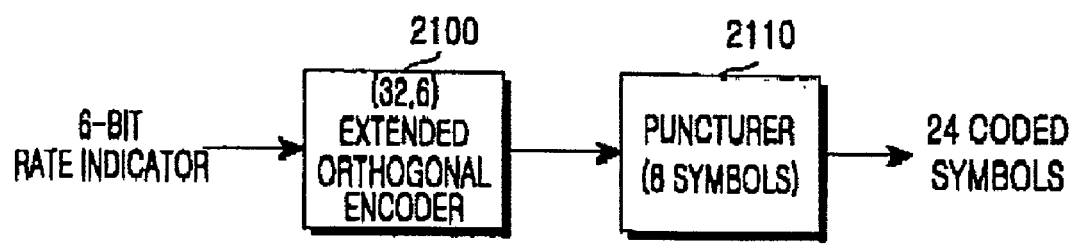
FIG. 20 illustrates a structure of a (24,6) encoder included in a transmitter according to an embodiment of the present invention.

FIG. 20 illustrates a structure of an optimal (24,6) encoder included in the transmitter according to an embodiment of the present invention. Referring to FIG. 20, 6 input information bits a0, a1, a2, a3, a4 and a5 are applied to a (32,6) extended orthogonal encoder 2100. Here, the 6 input information bits a0, a1, a2, a3, a4 and a5 constitute a rate indicator. The extended orthogonal encoder 2100 encodes the 6 input information bits a0, a1, a2, a3, a4 and a5, and outputs coded symbols of length 32 (or a coded symbol stream). The 32 coded symbols output from the extended orthogonal encoder 2100 are provided to a puncturer 2110. The puncturer 2110 punctures $0^{th}$, $1^{st}$, $2^{nd}$, $3^{rd}$, $4^{th}$, $5^{th}$, $6^{th}$ and $7^{th}$ symbols in the 8 optimal puncturing positions from the 32 coded symbols, and outputs 24 coded symbols.

A general code theory defines a generating matrix to show a mapping relation between the input information and the coded symbols. When the symbol puncturing is included, a generating matrix for a final (24,6) encoder is represented by $$M = \begin{bmatrix} 0101010101010101010101 \\ 001100110011001100110011 \\ 000011110000111100001111 \\ 111111110000000011111111 \\ 000000001111111111111111 \\ 111010001101100011000000 \end{bmatrix} \quad \text{Equation 6}$$

The generating matrix of Equation 6 selects 24 symbols in a first row if the first input information bit among the 6 input information bits is 1, and selects no symbol if the first input information bit is 0. The generating matrix selects 24 symbols in a second row if the second input information bit among the 6 input information bits is 1, and selects no symbol if the second input information bit is 0. The generating matrix selects 24 symbols in a third row if the third input information bit among the 6 input information bits is 1, and selects no symbol if the third input information bit is 0. The generating matrix selects 24 symbols in a fourth row if the fourth input information bit among the 6 input information bits is 1, and selects no symbol if the fourth input information bit is 0. The generating matrix selects 24 symbols in a fifth row if the fifth input information bit among the 6 input information bits is 1, and selects no symbol if the fifth input information bit is 0. Finally, the generating matrix selects 24 symbols in a sixth row if the sixth input information bit among the 6 input information bits is 1, and selects no symbol if the sixth input information bit is 0. A coded symbol stream for the input information bits is generated by XORing all the selected streams in a symbol unit.

Figure 21:
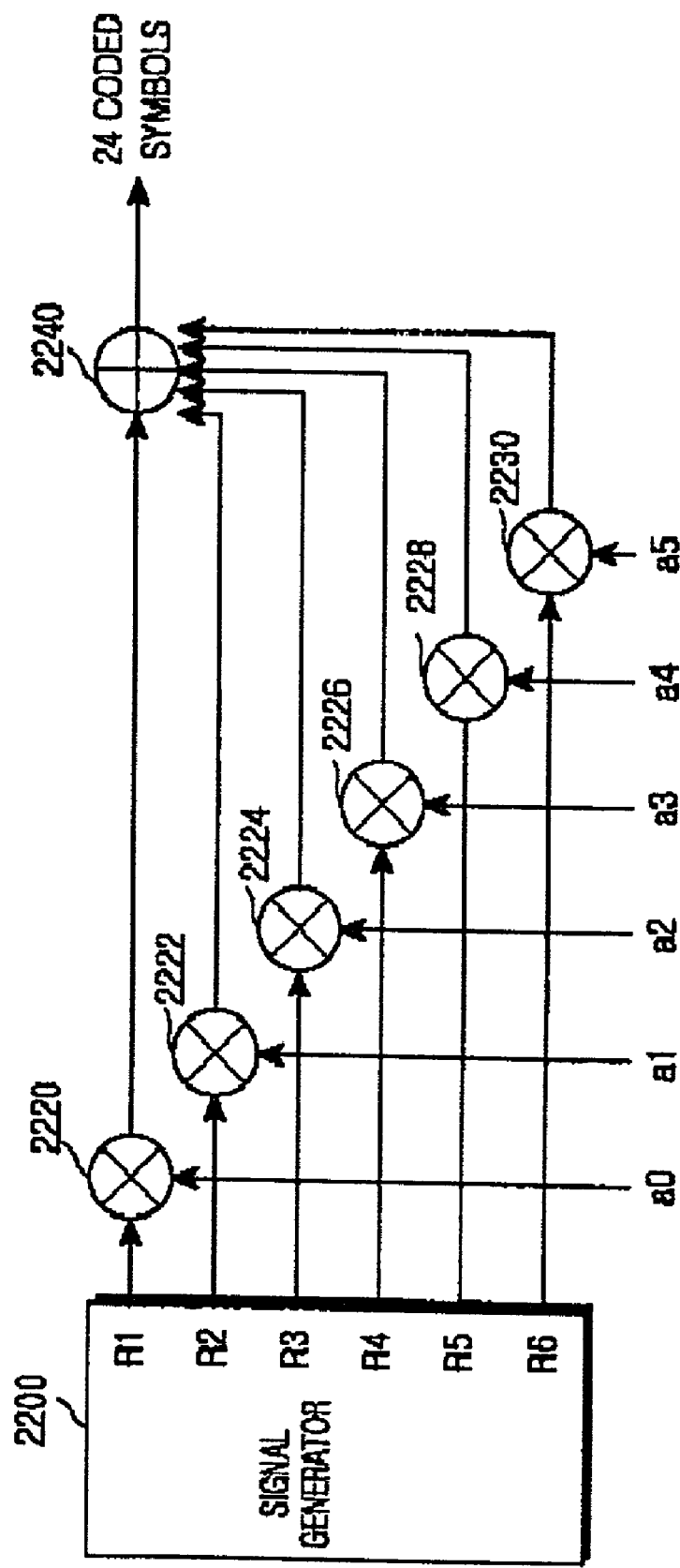
FIG. 21 illustrates a (24,6) encoder based on the generating matrix in FIG. 20.

FIG. 21 illustrates a (24,6) encoder based on the above generating matrix. Referring to FIG. 21, of the input information bits a0–a5 having a value of 0 or 1, an input information bit a0 is applied to a multiplier 2220, an input information bit a1 is applied to a multiplier 2222, an input information bit a2 is applied to a multiplier 2224, an input information bit a3 is applied to a multiplier 2226, an input information bit a4 is applied to a multiplier 2228, and an input information bit a5 is applied to a multiplier 2230, respectively. At the same time, a signal generator 2200 provides 6 symbol streams R1–R6 constituting the generating matrix, stored in a memory, to the multipliers 2220–2230, respectively. To be specific, the signal generator 2200 reads a length-24 symbol stream R1=0101 0101 0101 0101 0101 0101 corresponding to the first row of the generating matrix, stored in the memory, and provides the read symbol stream R1 to the multiplier 2220. The signal generator 2200 reads a length-24 symbol stream R2=0011 0011 0011 0011 0011 0011 corresponding to the second row of the generating matrix, stored in the memory, and provides the read symbol stream R2 to the multiplier 2222. The signal generator 2200 reads a length-24 symbol stream R3=0000 1111 0000 1111 0000 1111 corresponding to the third row of the generating matrix, stored in the memory, and provides the read symbol stream R3 to the multiplier 2224. The signal generator 2200 reads a length-24 symbol stream R4=1111 1111 0000 0000 1111 1111 corresponding to the fourth row of the generating matrix, stored in the memory, and provides the read symbol stream R4 to the multiplier 2226. The signal generator 2200 reads a length-24 symbol stream R5=0000 0000 1111 1111 1111 1111 corresponding to the fifth row of the generating matrix, stored in the memory, and provides the read symbol stream R5 to the multiplier 2228. The signal generator 2200 reads a length-24 symbol stream R6=1110 1000 1101 1000 1100 0000 corresponding to the sixth row of the generating matrix, stored in the memory, and provides the read symbol stream R6 to the multiplier 2230. Then, the multiplier 2220 multiplies the symbols of the received symbol stream R1 by the input information bit a0, and outputs a symbol stream of length 24 to an XOR operator 2240. The multiplier 2222 multiplies the symbols of the received symbol stream R2 by the input information bit a1, and outputs a symbol stream of length 24 to the XOR operator 2240. The multiplier 2224 multiplies the symbols of the received symbol stream R3 by the input information bit a2, and outputs a symbol stream of length 24 to the XOR operator 2240. The multiplier 2226 multiplies the symbols of the received symbol stream R4 by the input information bit a3, and outputs a symbol stream of length 24 to the XOR operator 2240. The multiplier 2228 multiplies the symbols of the received symbol stream R5 by the input information bit a4, and outputs a symbol stream of length 24 to the XOR operator 2240. The multiplier 2230 multiplies the symbols of the received symbol stream R6 by the input information bit a5, and outputs a symbol stream of length 24 to the XOR operator 2240. The XOR operator 2240 then XORs the 6 symbol streams of length 24 in a symbol unit, and outputs a coded symbol stream of length 24.

7. (24,7) Encoder

The (24,7) encoder provided by the invention is constructed to generate an optimal (24,7) code by puncturing 8 symbols from an extended orthogonal code obtained by extending a codeword using 2 mask functions for a (32,5) orthogonal code (or first order Reed-Muller code).

FIG. 3 illustrates a structure of the extended orthogonal code. Referring to FIG. 3, when M1 and M2 are the 2 mask functions stated above, 32 orthogonal codewords W of length 32 are used for the upper 32 codewords, and 32 codewords (M1+W) determined by XORing the mask function M1 and the 32 orthogonal codewords W are used for the next 32 codewords. Further, 32 codewords (M2+W) determined by XORing the mask function M2 and the 32 orthogonal codewords W are used for the next 32 codewords, and 32 codewords (M1+M2+W) determined by XORing the mask function M1 and M2 and the 32 orthogonal codewords W are used for the last 32 codewords. Therefore, a total of $2^7$=128 codewords are used as the extended orthogonal codes. The 2 mask functions for optimizing a (24,7) code are determined experimentally.

For example, the 2 mask functions M1 and M2 are as follows.

M1=0000 0000 1110 1000 1101 1000 1100 0000
M2=0000 0000 1100 0000 0111 1110 0010 1000

Although there are many ways to create the (24,7) linear code, it is possible not only to minimize hardware complexity but also to use an optimal codeword by utilizing a method of puncturing an extended first order Reed-Muller code according to an embodiment of the present invention so that an inverse fast Hadamard transform is performed in a decoding process. Further, it is possible to minimize the hardware complexity by minimizing a length of the orthogonal code before puncturing. It will be assumed that the embodiment of the present invention generates an error correcting code using the extended orthogonal code.

The (24,7) codeword is generated by puncturing 8 symbols from the 32 coded symbols output from a (32,7) extended code generator. Here, a change in the puncturing positions where the 8 symbols are punctured from the 32 extended coded symbols causes a change in the minimum distance $d_{min}$ of the codeword. Therefore, in order to make a (24,7) encoder with excellent error correcting performance in the (32,7) extended orthogonal code, it is important to calculate the puncturing positions where the largest minimum distance can be obtained.

The 8 puncturing positions needed for generating an optimal (24,7) linear code can be calculated through experimentation. The simplest puncturing pattern is {0, 4, 8, 12, 16, 20, 24, 28} or {0, 1, 2, 3, 4, 5, 6, 7}. In this case, a transmitter and a receiver of the mobile communication system transmitting the 7 information bits using the encoding/decoding method according to the present invention previously exchange or otherwise pre-store the 8 puncturing positions. The puncturing positions are generally defined in a communication protocol. Alternatively, the transmitter may previously provide information on the puncturing positions.

Figure 4:
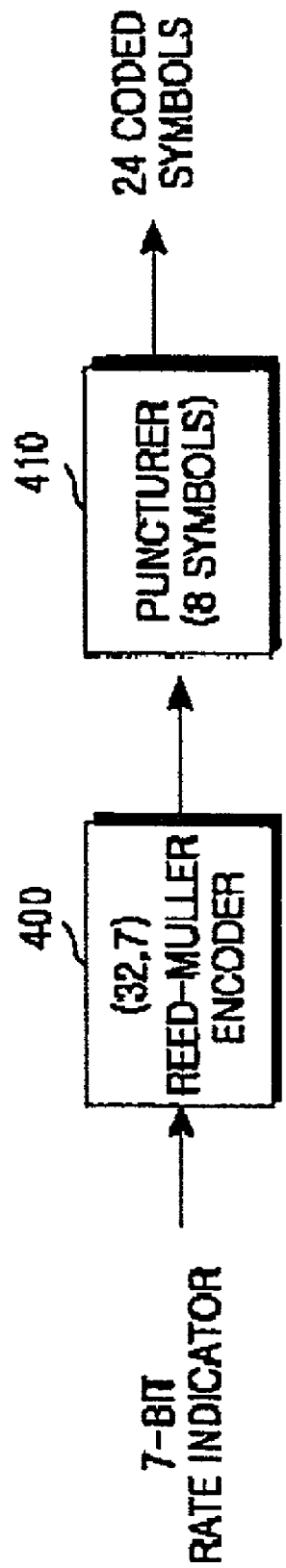
FIG. 4 illustrates a structure of an optimal (24,7) encoder in a CDMA mobile communication system according to an embodiment of the present invention.

FIG. 4 illustrates a structure of an optimal (24,7) encoder included in the transmitter according to an embodiment of the present invention. Referring to FIG. 4, 7 input information bits a0, a1, a2, a3, a4, a5 and a6 are applied to a (32,7) extended orthogonal encoder 400. Here, the 7 input information bits a0, a1, a2, a3, a4, a5 and a6 constitute a rate indicator. The extended orthogonal encoder 400 encodes the 7 input information bits a0, a1, a2, a3, a4, a5 and a6, and outputs coded symbols (or a coded symbol stream) of length 32. The 32 coded symbols output from the extended orthogonal encoder 400 are provided to a puncturer 410. The puncturer 410 punctures $0^{th}$, $4^{th}$, $8^{th}$, $12^{th}$, $16^{th}$, $20^{th}$, $24^{th}$ and $28^{th}$ symbols or $0^{th}$, $1^{st}$, $2^{nd}$, $3^{rd}$, $4^{th}$, $5^{th}$, $6^{th}$ and $7^{th}$ symbols in the 8 optimal puncturing positions from the 32 coded symbols, and outputs 24 coded symbols.

A general code theory defines a generating matrix to show a mapping relation between the input information and the coded symbols. When the symbol puncturing is included, a generating matrix for a final (24,7) encoder is represented by $$M = \begin{bmatrix} 0101010101010101010101010101 \\ 0011001100110011001100110011 \\ 0000111100001111000011110011 \\ 1111111100000000011111111 \\ 0000000011111111111111111 \\ 1110100011011000110000000 \\ 1100000000011111000101000 \end{bmatrix} \quad \text{Equation 7}$$

The generating matrix of Equation 7 selects 24 symbols in a first row if the first input information bit among the 7 input information bits is 1, and selects no symbol if the first input information bit is 0. The generating matrix selects 24 symbols in a second row if the second input information bit among the 7 input information bits is 1, and selects no symbol if the second input information bit is 0. The generating matrix selects 24 symbols in a third row if the third input information bit among the 7 input information bits is 1, and selects no symbol if the third input information bit is 0. The generating matrix selects 24 symbols in a fourth row if the fourth input information bit among the 7 input information bits is 1, and selects no symbol if the fourth input information bit is 0. The generating matrix selects 24 symbols in a fifth row if the fifth input information bit among the 7 input information bits is 1, and selects no symbol if the fifth input information bit is 0. The generating matrix selects 24 symbols in a sixth row if the sixth input information bit among the 7 input information bits is 1, and selects no symbol if the sixth input information bit is 0. The generating matrix selects 24 symbols in a seventh row if the seventh input information bit among the 7 input information bits is 1, and selects no symbol if the seventh input information bit is 0. A coded symbol stream for the input information bits is generated by XORing all of the selected rows in a symbol unit.

Figure 8:
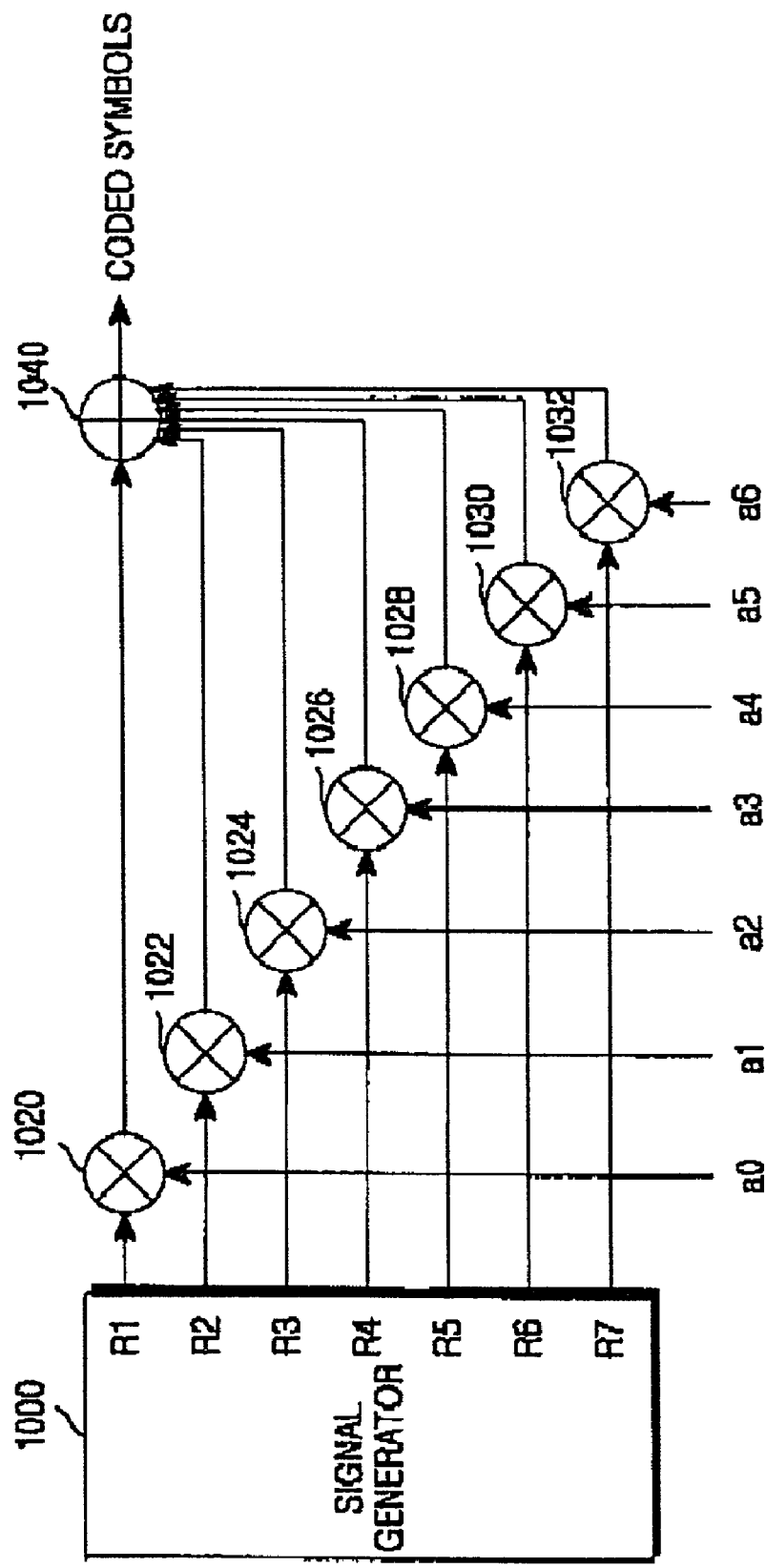
FIG. 8 illustrates a structure of a (24,7) encoder based on a generating matrix according to an embodiment of the present invention.

FIG. 8 illustrates a (24,7) encoder based on the above generating matrix. Referring to FIG. 8, of the input information bits a0–a6 having a value of 0 or 1, an input information bit a0 is applied to a multiplier 1020, an input information bit a1 is applied to a multiplier 1022, an input information bit a2 is applied to a multiplier 1024, an input information bit a3 is applied to a multiplier 1026, an input information bit a4 is applied to a multiplier 1028, an input information bit a5 is applied to a multiplier 1030, and an input information bit a6 is applied to a multiplier 1032, respectively. At the same time, a signal generator 1000 provides 7 symbol streams R1–R7 constituting the generating matrix, stored in a memory, to the multipliers 1020–1032, respectively. To be specific, the signal generator 1000 reads a length-24 symbol stream R1=0101 0101 0101 0101 0101 0101 corresponding to the first row of the generating matrix, stored in the memory, and provides the read symbol stream R1 to the multiplier 1020. The signal generator 1000 reads a length-24 symbol stream R2=0011 0011 0011 0011 0011 0011 corresponding to the second row of the generating matrix, stored in the memory, and provides the read symbol stream R2 to the multiplier 1022. The signal generator 1000 reads a length-24 symbol stream R3=0000 1111 0000 1111 0000 1111 corresponding to the third row of the generating matrix, stored in the memory, and provides the read symbol stream R3 to the multiplier 1024. The signal generator 1000 reads a length-24 symbol stream R4=1111 1111 0000 0000 1111 1111 corresponding to the fourth row of the generating matrix, stored in the memory, and provides the read symbol stream R4 to the multiplier 1026. The signal generator 1000 reads a length-24 symbol stream R5=0000 0000 1111 1111 1111 1111 corresponding to the fifth row of the generating matrix, stored in the memory, and provides the read symbol stream R5 to the multiplier 1028. The signal generator 1000 reads a length-24 symbol stream R6=1110 1000 1101 1000 1100 0000 corresponding to the sixth row of the generating matrix, stored in the memory, and provides the read symbol stream R6 to the multiplier 1030. Finally, the signal generator 1000 reads a length-24 symbol stream R7=1 100 0000 0111 1110 0010 1000 corresponding to the seventh row of the generating matrix, stored in the memory, and provides the read symbol stream R7 to the multiplier 1032. Then, the multiplier 1020 multiplies the symbols of the symbol stream R1 by the input information bit a0, and outputs a symbol stream of length 24 to an XOR operator 1040. The multiplier 1022 multiplies the symbols of the symbol stream R2 by the input information bit a1, and outputs a symbol stream of length 24 to the XOR operator 1040. The multiplier 1024 multiplies the symbols of the symbol stream R3 by the input information bit a2, and outputs a symbol stream of length 24 to the XOR operator 1040. The multiplier 1026 multiplies the symbols of the symbol stream R4 by the input information bit a3, and outputs a symbol stream of length 24 to the XOR operator 1040. The multiplier 1028 multiplies the symbols of the symbol stream R5 by the input information bit a4, and outputs a symbol stream of length 24 to the XOR operator 1040. The multiplier 1030 multiplies the symbols of the symbol stream R6 by the input information bit a5, and outputs a symbol stream of length 24 to the XOR operator 1040. The multiplier 1032 multiplies the symbols of the symbol stream R7 by the input information bit a6, and outputs a symbol stream of length 24 to the XOR operator 1040. The XOR operator 1040 then XORs the 7 symbol streams of length 24 in a symbol unit, and outputs a coded symbol stream of length 24.

The above (24,1) encoder, (24,2) encoder, (24,3) encoder, (24,4) encoder, (24,5) encoder, (24,6) encoder and (24,7) encoder have something in common with one another in that they can be analogized from the structure of the orthogonal code in the light of the structure of the encoder. That is, the (24,1) encoder uses the (2,1) orthogonal code, the (24,2) encoder uses the (4,2) orthogonal code, the (24,3) encoder uses the (8,3) orthogonal code, the (24,4) encoder uses the (16,4) orthogonal code, and the (24,5) encoder uses the (32,5) orthogonal code. The (32,6) extended orthogonal code used in the (24,6) encoder is an orthogonal code extended by the (32,5) encoder using a basis (mask function) of one additional codeword. The (32,7) extended orthogonal code used in the (24,7) encoder is an orthogonal code extended by the (32,5) encoder using bases (mask functions) of two additional codewords. Therefore, the (24,1) encoder, (24,2) encoder, (24,3) encoder, (24,4) encoder, (24,5) encoder, (24,6) encoder and (24,7) encoder have the above-stated common point. Based on this, a first embodiment of the present invention provides a single encoder capable of serving as all of the (24,1) encoder, (24,2) encoder, (24,3) encoder, (24,4) encoder, (24,5) encoder, (24,6) encoder and (24,7) encoder having different sizes.

First Embodiment (Encoder)

Figure 5:
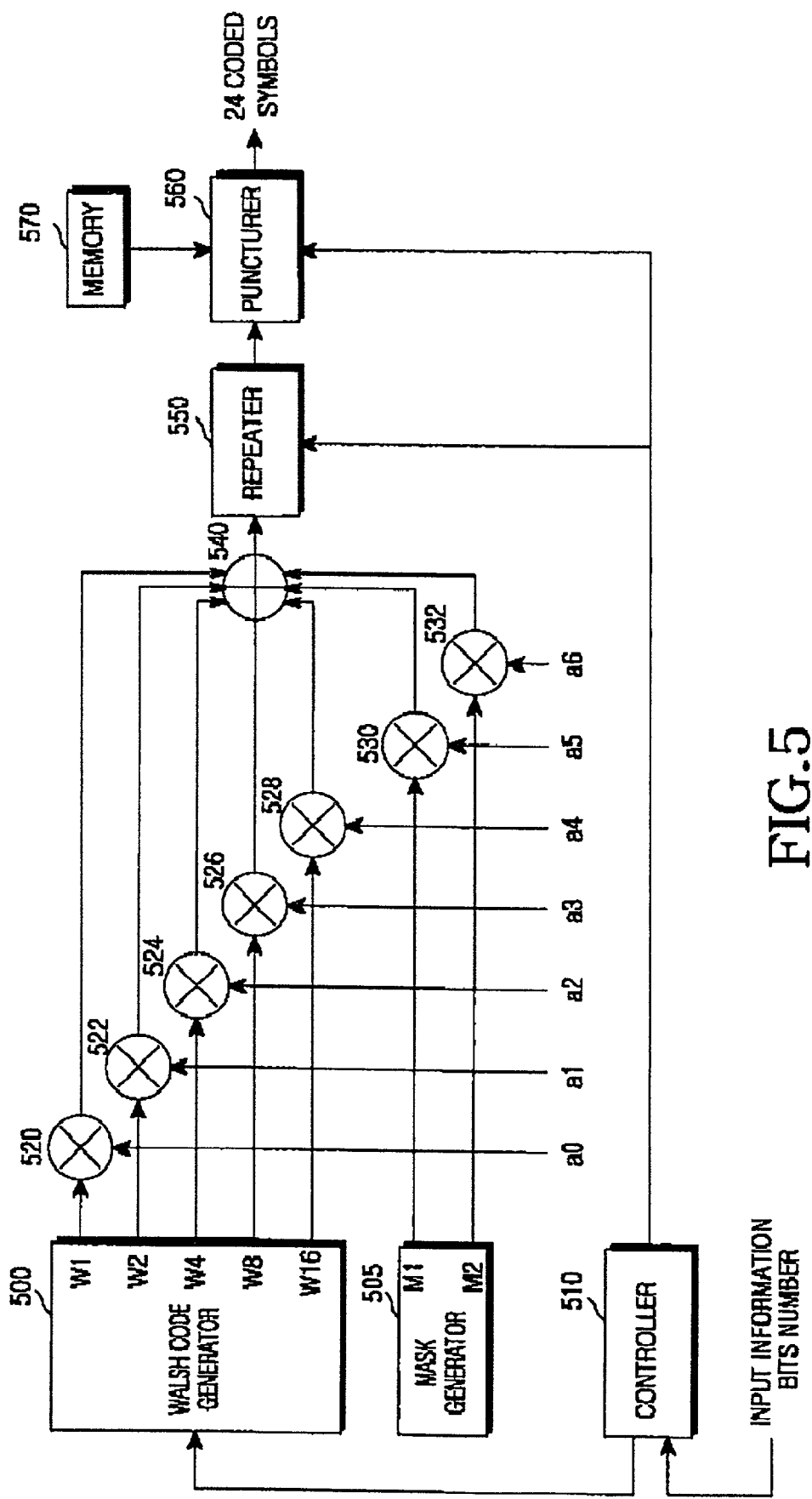
FIG. 5 illustrates a structure of an encoder serving as both the optimal (24,4) encoder and the optimal (24,7) encoder in a CDMA mobile communication system according to an embodiment of the present invention.

FIG. 5 illustrates a structure of an encoder serving as all of the (24,1) encoder, (24,2) encoder, (24,3) encoder, (24,4) encoder, (24,5) encoder, (24,6) encoder and (24,7) encoder having different lengths. That is, the encoder of FIG. 5 encodes 1 to 7 input information bits with different Walsh codes or masks having a length of 2, 4, 8, 16 or 32, and outputs a coded symbol stream having 24 coded symbols.

Referring to FIG. 5, a controller 510 controls an encoding operation by determining the number of the input information bits. That is, when the number of the input information bits is 1, the controller 510 controls a Walsh code generator 500 to generate one Walsh code having a length of 2. Further, the controller 510 sets a repetition frequency of a repeater 550 to 32, and controls a puncturer 560 to puncture symbols in the 40 puncturing positions corresponding to the one input information bit. When the number of the input information bits is 2, the controller 510 controls the Walsh code generator 500 to generate 2 different Walsh codes having a length of 4. Further, the controller 510 sets a repetition frequency of the repeater 550 to 8, and controls the puncturer 560 to puncture symbols in the 8 puncturing positions corresponding to the 2 input information bits. When the number of the input information bits is 3, the controller 510 controls the Walsh code generator 500 to generate 3 different Walsh codes having a length of 8. Further, the controller 510 sets a repetition frequency of the repeater 550 to 4, and controls the puncturer 560 to puncture symbols in the 8 puncturing positions corresponding to the 3 input information bits. When the number of the input information bits is 4, the controller 510 controls the Walsh code generator 500 to generate 4 different Walsh codes having a length of 16. Further, the controller 510 sets a repetition frequency of the repeater 550 to 2, and controls the puncturer 560 to puncture symbols in the 8 puncturing positions corresponding to the 4 input information bits. When the number of the input information bits is 5, the controller 510 controls the Walsh code generator 500 to generate 5 different Walsh codes having a length of 32. Further, the controller 510 sets a repetition frequency of the repeater 550 to 1, and controls the puncturer 560 to puncture symbols in the 8 puncturing positions corresponding to the 5 input information bits. When the number of the input information bits is 6, the controller 510 controls the Walsh code generator 500 and a mask generator 505 to generate 5 different Walsh codes and one mask, all having a length of 32, respectively. Further, the controller 510 sets a repetition frequency of the repeater 550 to 1, and controls the puncturer 560 to puncture symbols in the 8 puncturing positions corresponding to the 6 input information bits. When the number of the input information bits is 7, the controller 510 controls the Walsh code generator 500 and the mask generator 505 to generate 5 different Walsh codes and 2 different masks, all having a length of 32, respectively. Further, the controller 510 sets a repetition frequency of the repeater 550 to 1, and controls the puncturer 560 to puncture symbols in the 8 puncturing positions corresponding to the 7 input information bits.

The Walsh code generator 500, under the control of the controller 510, selectively generates different Walsh codes of length 2, 4, 8, 16 or 32. For example, upon receiving one input information bit, the Walsh code generator 500 generates one Walsh code of length 2 under the control of the controller 510. Upon receiving 2 input information bits, the Walsh code generator 500 generates 2 different Walsh codes of length 4 under the control of the controller 510. Upon receiving 3 input information bits, the Walsh code generator 500 generates 3 different Walsh codes of length 8 under the control of the controller 510. Upon receiving 4 input information bits, the Walsh code generator 500 generates 4 different Walsh codes of length 16 under the control of the controller 510. Upon receiving 5 to 7 input information bits, the Walsh code generator 500 generates 5 different Walsh codes of length 32 under the control of the controller 510.

The mask generator 505 selectively generates masks of length 32 under the control of the controller 510. For example, upon receiving 1 to 5 input information bits, the mask generator 505 generates no mask under the control of the controller 510. However, upon receiving 6 input information bits, the mask generator 505 generates one mask of length 32 under the control of the controller 510. Further, upon receiving 7 input information bits, the mask generator 505 generates two different masks of length 32 under the control of the controller 510. Alternatively, the mask generator 505 may be designed to continuously generate 2 different masks, without being controlled by the controller 510. In this case, 0's are input as the input information bits in order not to affect the output of the XOR operator 540.

Multipliers 520–532 multiply the 1 to 7 input information bits by the Walsh codes and the masks from the Walsh code generator 500 and the mask generator 505 on a one-to-one basis, and output coded symbol streams each having 2, 4, 8, 16 or 32 coded symbols. When 4 input bits are received as the input information bits, input bits having a value '0' are provided as the remaining input information bits a4, a5 and a6, so that the output values are not affected. The XOR operator 540 XORs the coded symbol streams from the multipliers 520–532, and outputs one coded symbol stream having 2, 4, 8, 16 or 32 coded symbols. The repeater 550, under the control of the controller 510, repeats the coded symbol stream from the XOR operator 540 a predetermined number of times, and outputs a coded symbol stream having 64 coded symbols. For example, when one input bit is received as the input information bit, the repeater 550 repeats 32 times the 2 coded symbols output from the XOR operator 540 under the control of the controller 510, and outputs a coded symbol stream having 64 coded symbols. However, when 2 to 7 input bits are received as the input information bits, the repeater 550 repeats 8, 4, 2 or 1 times the 4, 8, 16 or 32 coded symbols output from the XOR operator 540 under the control of the controller 510, and outputs a coded symbol stream having 32 coded symbols. A memory 570 stores 8 puncturing positions corresponding to each of the 1 to 7 input information bits. The 40 puncturing positions corresponding to the 1 input information bit, stored in the memory 570, are all the even-numbered symbol positions and $1^{st}$, $3^{rd}$, $5^{th}$, $7^{th}$, $9^{th}$, $11^{th}$, $13^{th}$ and $15^{th}$ symbol positions. The 8 puncturing positions corresponding to the 2 input information bit, stored in the memory 570, are $0^{th}$, $4^{th}$, $8^{th}$, $12^{th}$, $16^{th}$, $20^{th}$, $24^{th}$ and $28^{th}$ symbol positions. The 8 puncturing positions corresponding to the 3 input information bit, stored in the memory 570, are $0^{th}$, $3^{rd}$, $5^{th}$, $6^{th}$, $7^{th}$, $8^{th}$, $16^{th}$ and $24^{th}$ symbol positions. The 8 puncturing positions corresponding to the 4 input information bits, stored in the memory 570, are $0^{th}$, $1^{st}$, $2^{nd}$, $3^{rd}$, $4^{th}$, $5^{th}$, $6^{th}$ and $16^{th}$ symbol positions. The 8 puncturing positions corresponding to the 5 input information bits, stored in the memory 570, are $0^{th}$, $1^{st}$, $2^{nd}$, $3^{rd}$, $4^{th}$, $5^{th}$, $6^{th}$ and $7^{th}$ symbol positions. The 8 puncturing positions corresponding to the 6 input information bits, stored in the memory 570, are $0^{th}$, $1^{st}$, $2^{nd}$, $3^{rd}$, $4^{th}$, $5^{th}$, $6^{th}$ and $7^{th}$ symbol positions. The 8 puncturing positions corresponding to the 7 input information bits, stored in the memory 570, are $0^{th}$, $1^{st}$, $2^{nd}$, $3^{rd}$, $4^{th}$, $5^{th}$, $6^{th}$ and $7^{th}$ symbol positions.

Shown in Table 1 are puncturing positions associated with the number of the input information bits, stored in a memory table of the memory 550.

TABLE 1

| No of Input Info Bits | Puncturing Positions |
|---|---|
| 1 | Even-numbered symbol positions and $1^{st}$, $3^{rd}$, $5^{th}$, $7^{th}$, $9^{th}$, $11^{th}$, $13^{th}$ and $15^{th}$ symbol positions |
| 2 | $0^{th}$, $4^{th}$, $8^{th}$, $12^{th}$, $16^{th}$, $20^{th}$, $24^{th}$ and $28^{th}$ symbol positions |
| 3 | $0^{th}$, $3^{rd}$, $5^{th}$, $6^{th}$, $7^{th}$, $8^{th}$, $16^{th}$ and $24^{th}$ symbol positions |
| 4 | $0^{th}$, $1^{st}$, $2^{nd}$, $3^{rd}$, $4^{th}$, $5^{th}$, $6^{th}$ and $16^{th}$ symbol positions |
| 5 | $0^{th}$, $1^{st}$, $2^{nd}$, $3^{rd}$, $4^{th}$, $5^{th}$, $6^{th}$ and $7^{th}$ symbol positions (or $0^{th}$, $4^{th}$, $8^{th}$, $12^{th}$, $16^{th}$, $20^{th}$, $24^{th}$ and $28^{th}$ symbol positions) |
| 6 | $0^{th}$, $1^{st}$, $2^{nd}$, $3^{rd}$, $4^{th}$, $5^{th}$, $6^{th}$ and $7^{th}$ symbol positions (or $0^{th}$, $4^{th}$, $8^{th}$, $12^{th}$, $16^{th}$, $20^{th}$, $24^{th}$ and $28^{th}$ symbol positions) |
| 7 | $0^{th}$, $1^{st}$, $2^{nd}$, $3^{rd}$, $4^{th}$, $5^{th}$, $6^{th}$ and $7^{th}$ symbol positions (or $0^{th}$, $4^{th}$, $8^{th}$, $12^{th}$, $16^{th}$, $20^{th}$, $24^{th}$ and $28^{th}$ symbol positions) |

The puncturer 560 receives the coded symbol stream having 32 or 64 coded symbols from the repeater 550, punctures coded symbols in the 8 or 40 puncturing positions read from the memory 570 from the 32 or 64 coded symbols under the control of the controller 510, and outputs a coded symbol stream having 24 coded symbols. That is, if the number of the input information bits is 1, the puncturer 560 punctures the coded symbols in the 40 puncturing positions read from the memory 570 among the 64 coded symbols output from the repeater 550 under the control of the controller 510, and outputs a coded symbol stream having 24 coded symbols. However, if the number of the input information bits is 2 to 7, the puncturer 560 punctures the coded symbols in the 8 puncturing positionsread from the memory 570 among the 32 coded symbols output from the repeater 550 under the control of the controller 510, and outputs a coded symbol stream having 24 coded symbols. Specifically, if the number of the input information bits is 1, the puncturer 560 punctures all the even-numbered coded symbols and the $1^{st}$, $3^{rd}$, $5^{th}$, $7^{th}$, $9^{th}$, $11^{th}$, $13^{th}$ and $15^{th}$ coded symbols (as shown in Table 1) from the 64 coded symbols output from the repeater 550, and outputs a coded symbol stream having 24 coded symbols. If the number of the input information bits is 2, the puncturer 560 punctures the $0^{th}$, $4^{th}$, $8^{th}$, $12^{th}$, $16^{th}$, $20^{th}$, $24^{th}$ and $28^{th}$ coded symbols from the 32 coded symbols output from the repeater 550, and outputs a coded symbol stream having 24 coded symbols. If the number of the input information bits is 3, the puncturer 560 punctures the $0^{th}$, $3^{rd}$, $5^{th}$, $6^{th}$, $7^{th}$, $8^{th}$, $16^{th}$ and $24^{th}$ coded symbols from the 32 coded symbols output from the repeater 550, and outputs a coded symbol stream having 24 coded symbols. If the number of the input information bits is 4, the puncturer 560 punctures the $0^{th}$, $1^{st}$, $2^{nd}$, $3^{rd}$, $4^{th}$, $5^{th}$, $6^{th}$ and $16^{th}$ coded symbols from the 32 coded symbols output from the repeater 550, and outputs a coded symbol stream having 24 coded symbols. If the number of the input information bits is 5, the puncturer 560 punctures the $0^{th}$, $4^{th}$, $8^{th}$, $12^{th}$, $16^{th}$, $20^{th}$, $24^{th}$ and $28^{th}$ coded symbols or the $0^{th}$, $1^{st}$, $2^{nd}$, $3^{rd}$, $4^{th}$, $5^{th}$, $6^{th}$ and $7^{th}$ coded symbols from the 32 coded symbols output from the repeater 550, and outputs a coded symbol stream having 24 coded symbols. If the number of the input information bits is 6, the puncturer 560 punctures the $0^{th}$, $4^{th}$, $8^{th}$, $12^{th}$, $16^{th}$, $20^{th}$, $24^{th}$ and $28^{th}$ coded symbols or the $0^{th}$, $1^{st}$, $2^{nd}$, $3^{rd}$, $4^{th}$, $5^{th}$, $6^{th}$ and $7^{th}$ coded symbols from the 32 coded symbols output from the repeater 550, and outputs a coded symbol stream having 24 coded symbols. If the number of the input information bits is 7, the puncturer 560 punctures the $0^{th}$, $4^{th}$, $8^{th}$, $12^{th}$, $16^{th}$, $20^{th}$, $24^{th}$ and $28^{th}$ coded symbols or the $0^{th}$, $1^{st}$, $2^{nd}$, $3^{rd}$, $4^{th}$, $5^{th}$, $6^{th}$ and $7^{th}$ coded symbols from the 32 coded symbols output from the repeater 550, and outputs a coded symbol stream having 24 coded symbols.

With reference to FIG. 5, a description of the encoder will be made separately for the respective cases where the encoder serves as a (24,1) encoder to a (24,7) encoder. It will be assumed herein that the input information bits applied to the encoder constitute a rate indicator.

First, a description will be made of one case where the encoder serves as the (24,7) encoder. A 7-bit rate indicator of a0, a1, a2, a3, a4, a5 and a6 is applied to the encoder, and at the same time, bit information indicating that the 7-bit rate indicator is applied to the encoder is provided to the controller 510. The controller 510 then provides the Walsh code generator 500 with a control signal instructing it to generate Walsh codes of length 32. Upon receiving the control signal, the Walsh code generator 500 generates Walsh codes W1, W2, W4, W8 and W16 of length 32, and provides the generated Walsh codes W1, W2, W4, W8 and W16 to the associated multipliers, respectively. To be specific, the Walsh code W1 is provided to the multiplier 520, the Walsh code W2 to the multiplier 522, the Walsh code W4 to the multiplier 524, the Walsh code W8 to the multiplier 526, and the Walsh code W16 to the multiplier 528. Shown in Table 2 are the Walsh codes of length 32 generated by the Walsh code generator 500.

TABLE 2

| Walsh Number | Walsh Code |
| --- | --- |
| W1 | 0101 0101 0101 0101 0101 0101 0101 0101 |
| W2 | 0011 0011 0011 0011 0011 0011 0011 0011 |
| W4 | 0000 1111 0000 1111 0000 1111 0000 1111 |
| W8 | 0000 0000 1111 1111 0000 0000 1111 1111 |
| W16 | 0000 0000 0000 0000 1111 1111 1111 1111 |

At the same time, the mask generator 505 generates a mask M1=0111 0111 0010 0100 0110 0000 0000 0000 and a mask M2=0010 0110 0101 0100 0101 0100 0100 0000, and provides the generated masks M1 and M2 to the multipliers 530 and 532, respectively.

Meanwhile, the 7 input information bits of the rate indicator are provided to the associated multipliers, respectively. Shown in Table 3 are the relations between the 7 input information bits and the associated multipliers.

TABLE 3

| Input Information Bit | Multiplier |
| --- | --- |
| a0 | Multiplier 520 |
| a1 | Multiplier 522 |
| a2 | Multiplier 524 |
| a3 | Multiplier 526 |
| a4 | Multiplier 528 |
| a5 | Multiplier 530 |
| a6 | Multiplier 532 |

Therefore, shown in Table 4 are the input information bits and the Walsh codes or masks provided to the respective multipliers.

TABLE 4

| Multiplier | Walsh Code/Mask | Input Information Bit |
| --- | --- | --- |
| Multiplier 520 | W1 = 0101 0101 0101 0101 0101 0101 0101 0101 | a0 |
| Multiplier 522 | W2 = 0011 0011 0011 0011 0011 0011 0011 0011 | a1 |
| Multiplier 524 | W4 = 0000 1111 0000 1111 0000 1111 0000 1111 | a2 |
| Multiplier 526 | W8 = 0000 0000 1111 1111 0000 0000 1111 1111 | a3 |
| Multiplier 528 | W16 = 0000 0000 0000 0000 1111 1111 1111 1111 | a4 |
| Multiplier 530 | M1 = 0111 0111 0010 0100 0110 0000 0000 0000 | a5 |
| Multiplier 532 | M2 = 0010 0110 0101 0100 0101 0100 0100 0000 | a6 |

The multipliers multiply the input information bits by the Walsh codes or masks, provided thereto as shown in Table 4, and provide their outputs to the XOR operator 540.

Specifically, the multiplier 520 multiplies the input information bit a0 by the Walsh code W1 every symbol (i.e., in a symbol unit), and provides its output to the XOR operator 540. The multiplier 522 multiplies the input information bit a1 by the Walsh code W2 every symbol, and provides its output to the XOR operator 540. The multiplier 524 multiplies the input information bit a2 by the Walsh code W4 every symbol, and provides its output to the XOR operator 540. The multiplier 526 multiplies the input information bit a3 by the Walsh code W8 every symbol, and provides its output to the XOR operator 540. The multiplier 528 multiplies the input information bit a4 by the Walsh code W16 every symbol, and provides its output to the XOR operator 540. The multiplier 530 multiplies the input information bit a5 by the mask M1 every symbol, and provides its output to the XOR operator 540. The multiplier 532 multiplies the input information bit a6 by the mask M2 every symbol, and provides its output to the XOR operator 540.

The XOR operator 540 then XORs the symbol streams of length 32 output from the multipliers 520, 522, 524, 526, 528, 530 and 532 in a symbol unit, and provides its output to the repeater 550.

The coded symbol stream Ws of length 32, output from the XOR operator 540, can be defined as $$Ws=(W1 \times a0)+(W2 \times a1)+(W4 \times a2)+(W8 \times a3)+(W16 \times a4)+(M1 \times a5)+(M2 \times a6) \qquad \text{Equation 8}$$

At this moment, the controller 510 provides the repeater 550 with a control signal for controlling a repetition frequency over the output of the XOR operator 540. In the (24,7) encoder, as the symbol stream output from the XOR operator 540 has a length of 32, the repeater 550 does not perform repetition (herein, defined as one-time repetition). To this end, the controller 510 provides the repeater 550 with a control signal instructing it to output the intact input signal.

In response to the control signal, the repeater 550 provides the puncturer 560 with the intact symbol stream of length 32 output from the XOR operator 540.

At this point, the controller 510 provides the puncturer 560 with a control signal instructing it to puncture symbols in the puncturing positions for the (24,7) code. The controller 510 may provide the puncturer 560 with length information (7 bits) of the rate indicator as the control signal. The puncturer 560 then receives 8 puncturing positions corresponding to the 7 input information bits of the rate indicator from the memory 570, and punctures coded symbols in the 8 puncturing positions from the coded symbols of length 32 provided from the repeater 550. That is, the puncturer 560 punctures 8 symbols in the puncturing positions read from the memory 570 among the coded symbols of length 32 provided from the repeater 550. For example, when the puncturing positions from the memory 570 are $0^{th}$, $4^{th}$, $8^{th}$, $12^{th}$, $16^{th}$, $20^{th}$, $24^{th}$ and $28^{th}$ symbol positions (as shown in Table 1), the puncturer 560 punctures $0^{th}$, $4^{th}$, $8^{th}$, $12^{th}$, $16^{th}$, $20^{th}$, $24^{th}$ and $28^{th}$ coded symbols from the coded symbols of length 32, and outputs 24 coded symbols.

Until now, an operation of the (24,7) encoder has been described with reference to one case where the encoder has the puncturing pattern {0,4,8,12,16,20,24,28}. Alternatively, however, the encoder may puncture the $0^{th}$, $1^{st}$, $2^{nd}$, $3^{rd}$, $4^{th}$, $5^{th}$, $6^{th}$ and $7^{th}$ coded symbols from the coded symbol stream of length 32 in order to reduce hardware complexity. In this case, the mask generator 505 generates a mask M1=0000 0000 1110 1000 1101 1000 1100 0000 and a mask M2=0000 0000 1100 0000 0111 1110 0010 1000.

TABLE 5

| Walsh Number | Walsh Code |
|---|---|
| W1 | 0101 0101 0101 0101 0101 0101 0101 0101 |
| W2 | 0011 0011 0011 0011 0011 0011 0011 0011 |
| W4 | 0000 1111 0000 1111 0000 1111 0000 1111 |
| W8 | 0000 0000 1111 1111 0000 0000 1111 1111 |
| W16 | 0000 0000 0000 0000 1111 1111 1111 1111 |

At the same time, the mask generator 505 generates a mask M1=0111 0111 0010 0100 0110 0000 0000 0000, and provides the generated mask M1 to the multiplier 530.

Meanwhile, the 6 input information bits of the rate indicator are provided to the associated multipliers, respectively. Shown in Table 6 are the relations between the 6 input information bits and the associated multipliers.

TABLE 6

| Input Information Bit | Multiplier |
|---|---|
| A0 | Multiplier 520 |
| A1 | Multiplier 522 |
| A2 | Multiplier 524 |
| A3 | Multiplier 526 |
| A4 | Multiplier 528 |
| A5 | Multiplier 530 |

Therefore, shown in Table 7 are the input information bits and the Walsh codes or mask provided to the respective multipliers.

TABLE 7

| Multiplier | Walsh Code/Mask | Input Information Bit |
|---|---|---|
| Multiplier 520 | W1 = 0101 0101 0101 0101 0101 0101 0101 0101 | a0 |
| Multiplier 522 | W2 = 0011 0011 0011 0011 0011 0011 0011 0011 | a1 |
| Multiplier 524 | W4 = 0000 1111 0000 1111 0000 1111 0000 1111 | a2 |
| Multiplier 526 | W8 = 0000 0000 1111 1111 0000 0000 1111 1111 | a3 |
| Multiplier 528 | W16 = 0000 0000 0000 0000 1111 1111 1111 1111 | a4 |
| Multiplier 530 | M1 = 0111 0111 0010 0100 0110 0000 0000 0000 | a5 |

Second, a description will be made of one case where the encoder serves as the (24,6) encoder. A 6-bit rate indicator of a0, a1, a2, a3, a4 and a5 is applied to the encoder, and the remaining rate indicator bit a6 is initialized to 0 and applied to the encoder. At the same time, bit information indicating that the 6-bit rate indicator is applied to the encoder is provided to the controller 510. The controller 510 then provides the Walsh code generator 500 with a control signal instructing it to generate Walsh codes of length 32. Upon receiving the control signal, the Walsh code generator 500 generates Walsh codes W1, W2, W4, W8 and W16 of length 32, and provides the generated Walsh codes W1, W2, W4, W8 and W16 to the associated multipliers, respectively. To be specific, the Walsh code W1 is provided to the multiplier 520, the Walsh code W2 to the multiplier 522, the Walsh code W4 to the multiplier 524, the Walsh code W8 to the multiplier 526, and the Walsh code W16 to the multiplier 528. Shown in Table 5 are the Walsh codes of length 32 generated by the Walsh code generator 500.

The multipliers multiply the input information bits by the Walsh codes or mask, provided thereto as shown in Table 7, and provide their outputs to the XOR operator 540.

Specifically, the multiplier 520 multiplies the input information bit a0 by the Walsh code W1 every symbol (i.e., in a symbol unit), and provides its output to the XOR operator 540. The multiplier 522 multiplies the input information bit a1 by the Walsh code W2 every symbol, and provides its output to the XOR operator 540. The multiplier 524 multiplies the input information bit a2 by the Walsh code W4 every symbol, and provides its output to the XOR operator 540. The multiplier 526 multiplies the input information bit a3 by the Walsh code W8 every symbol, and provides its output to the XOR operator 540. The multiplier 528 multiplies the input information bit a4 by the Walsh code W16 every symbol, and provides its output to the XOR operator 540. The multiplier 530 multiplies the input information bit a5 by the mask M1 every symbol, and provides its output to the XOR operator 540.

Meanwhile, since the input information bit a6 applied to the multiplier 532 is initialized to 0, an output of the multiplier 532 does not affect the output of the XOR operator 540 regardless of the mask M2 from the mask generator 505. That is, the multiplier 532 outputs a symbol stream comprised of coded symbols all having a value '0' regardless of symbol values of the symbol stream from the mask generator 505. Therefore, the output of the multiplier 532 does not affect the output of the XOR operator 540. Initializing the input information bit a6 to 0 is equivalent to a switching operation for cutting off the output of the multiplier 532.

The XOR operator 540 then XORs the symbol streams of length 32 output from the multipliers 520, 522, 524, 526, 528, 530 and 532 in a symbol unit, and provides its output to the repeater 550.

The coded symbol stream Ws of length 32, output from the XOR operator 540, can be defined as $$Ws=(W1 \times a0)+(W2 \times a1)+(W4 \times a2)+(W8 \times a3)+(W16 \times a4)+(M1 \times a5) \quad \text{Equation 9}$$

At this moment, the controller 510 provides the repeater 550 with a control signal for controlling a repetition frequency over the output of the XOR operator 540. In the (24,6) encoder, as the symbol stream output from the XOR operator 540 has a length of 32, the repeater 550 has a repetition frequency of 1. Therefore, the controller 510 provides the repeater 550 with a control signal instructing it to repeat the input signal once (i.e., to output the intact input signal). In response to the control signal, the repeater 550 provides the puncturer 560 with the intact symbol stream of length 32 output from the XOR operator 540.

At this point, the controller 510 provides the puncturer 560 with a control signal instructing it to puncture symbols in the puncturing positions for the (24,6) code. The controller 510 provides the puncturer 560 with length information (6 bits) of the rate indicator as the control signal. The puncturer 560 then receives 8 puncturing positions corresponding to the 6 input information bits of the rate indicator from the memory 570, and punctures coded symbols in the 8 puncturing positions from the coded symbols of length 32 provided from the repeater 550. That is, the puncturer 560 punctures 8 symbols in the puncturing positions read from the memory 570 among the coded symbols of length 32 provided from the repeater 550. For example, when the puncturing positions from the memory 570 are $0^{th}$, $4^{th}$, $8^{th}$, $12^{th}$, $16^{th}$, $20^{th}$, $24^{th}$ and $28^{th}$ symbol positions (as shown in Table 1), the puncturer 560 punctures $0^{th}$, $4^{th}$, $8^{th}$, $12^{th}$, $16^{th}$, $20^{th}$, $24^{th}$ and $28^{th}$ coded symbols from the coded symbols of length 32, and outputs 24 coded symbols.

Alternatively, however, the encoder may puncture the $0^{th}$, $1^{st}$, $2^{nd}$, $3^{rd}$, $4^{th}$, $5^{th}$, $6^{th}$ and $7^{th}$ coded symbols from the coded symbol stream of length 32 in order to reduce hardware complexity. In this case, the mask generator 505 generates a mask M1=0000 0000 1110 1000 1101 1000 1100 0000.

Third, a description will be made of one case where the encoder serves as the (24,5) encoder. A 5-bit rate indicator of a0, a1, a2, a3 and a4 is applied to the encoder, and the remaining rate indicator bits a5 and a6 are initialized to 0 and applied to the encoder. At the same time, bit information indicating that the 5-bit rate indicator is applied to the encoder is provided to the controller 510. The controller 510 then provides the Walsh code generator 500 with a control signal instructing it to generate Walsh codes of length 32. Upon receiving the control signal, the Walsh code generator 500 generates Walsh codes W1, W2, W4, W8 and W16 of length 32, and provides the generated Walsh codes W1, W2, W4, W8 and W16 to the associated multipliers, respectively. To be specific, the Walsh code W1 is provided to the multiplier 520, the Walsh code W2 to the multiplier 522, the Walsh code W4 to the multiplier 524, the Walsh code W8 to the multiplier 526, and the Walsh code W16 to the multiplier 528. Shown in Table 8 are the Walsh codes of length 32 generated by the Walsh code generator 500.

TABLE 8

| Walsh Number | Walsh Code |
| --- | --- |
| W1 | 0101 0101 0101 0101 0101 0101 0101 0101 |
| W2 | 0011 0011 0011 0011 0011 0011 0011 0011 |
| W4 | 0000 1111 0000 1111 0000 1111 0000 1111 |
| W8 | 0000 0000 1111 1111 0000 0000 1111 1111 |
| W16 | 0000 0000 0000 0000 1111 1111 1111 1111 |

Meanwhile, the 5 input information bits of the rate indicator are provided to the associated multipliers, respectively. Shown in Table 9 are the relations between the 6 input information bits and the associated multipliers.

TABLE 9

| Input Information Bit | Multiplier |
| --- | --- |
| a0 | Multiplier 520 |
| a1 | Multiplier 522 |
| a2 | Multiplier 524 |
| a3 | Multiplier 526 |
| a4 | Multiplier 528 |

Therefore, shown in Table 10 are the input information bits and the Walsh codes provided to the respective multipliers.

TABLE 10

| Multiplier | Walsh Code/Mask | Input Information Bit |
| --- | --- | --- |
| Multiplier 520 | W1 = 0101 0101 0101 0101 0101 0101 0101 0101 | a0 |
| Multiplier 522 | W2 = 0011 0011 0011 0011 0011 0011 0011 0011 | a1 |
| Multiplier 524 | W4 = 0000 1111 0000 1111 0000 1111 0000 1111 | a2 |
| Multiplier 526 | W8 = 0000 0000 1111 1111 0000 0000 1111 1111 | a3 |
| Multiplier 528 | W16 = 0000 0000 0000 0000 1111 1111 1111 1111 | a4 |

The multipliers multiply the input information bits by the Walsh codes, provided thereto as shown in Table 10, and provide their outputs to the XOR operator 540.

Specifically, the multiplier 520 multiplies the input information bit a0 by the Walsh code W1 every symbol (i.e., in a symbol unit), and provides its output to the XOR operator 540. The multiplier 522 multiplies the input information bit a1 by the Walsh code W2 every symbol, and provides its output to the XOR operator 540. The multiplier 524 multiplies the input information bit a2 by the Walsh code W4 every symbol, and provides its output to the XOR operator 540. The multiplier 526 multiplies the input information bit a3 by the Walsh code W8 every symbol, and provides its output to the XOR operator 540. The multiplier 528 multiplies the input information bit a4 by the Walsh code W16 every symbol, and provides its output to the XOR operator 540.

Meanwhile, since the input information bits a5 and a6 applied to the multipliers 530 and 532 are initialized to 0, outputs of the multipliers 530 and 532 do not affect the output of the XOR operator 540 regardless of the masks M1 and M2 from the mask generator 505. That is, the multipliers 530 and 532 output symbol streams each comprised of coded symbols all having a value '0' regardless of symbol values of the symbol stream from the mask generator 505. Therefore, the outputs of the multipliers 530 and 532 do not affect the output of the XOR operator 540. Initializing the input information bits a5 and a6 to 0 is equivalent to a switching operation for cutting off the outputs of the multipliers 530 and 532.

The XOR operator 540 then XORs the symbol streams of length 32 output from the multipliers 520, 522, 524, 526, 528, 530 and 532 in a symbol unit, and provides its output to the repeater 550.

The coded symbol stream Ws of length 32, output from the XOR operator 540, can be defined as $$Ws=(W1 \times a0)+(W2 \times a1)+(W4 \times a2)+(W8 \times a3)+(W16 \times a4)$$ Equation 10

At this moment, the controller 510 provides the repeater 550 with a control signal for controlling a repetition frequency over the output of the XOR operator 540. In the (24,5) encoder, as the symbol stream output from the XOR operator 540 has a length of 32, the repeater 550 has a repetition frequency of 1. Therefore, the controller 510 provides the repeater 550 with a control signal instructing it to repeat the input signal once (i.e., to output the intact input signal). In response to the control signal, the repeater 550 provides the puncturer 560 with the intact symbol stream of length 32 output from the XOR operator 540.

At this point, the controller 510 provides the puncturer 560 with a control signal instructing it to puncture symbols in the puncturing positions for the (24,5) code. The puncturer 560 then receives 8 puncturing positions read from the memory 570, and punctures coded symbols in the 8 puncturing positions from the coded symbols of length 32 provided from the repeater 550. That is, the puncturer 560 punctures 8 symbols in the puncturing positions read from the memory 570 among the coded symbols of length 32 provided from the repeater 550. For example, when the puncturing positions from the memory 570 are $0^{th}$, $4^{th}$, $8^{th}$, $12^{th}$, $16^{th}$, $20^{th}$, $24^{th}$ and $28^{th}$ symbol positions (as shown in Table 1), the puncturer 560 punctures $0^{th}$, $4^{th}$, $8^{th}$, $12^{th}$, $16^{th}$, $20^{th}$, $24^{th}$ and $28^{th}$ coded symbols from the coded symbols of length 32, and outputs 24 coded symbols.

Alternatively, however, the encoder may puncture the $0^{th}$, $1^{st}$, $2^{nd}$, $3^{rd}$, $4^{th}$, $5^{th}$, $6^{th}$ and $7^{th}$ coded symbols from the coded symbol stream of length 32 in order to reduce hardware complexity.

Fourth, a description will be made of another case where the encoder serves as the (24,4) encoder. A 4-bit rate indicator of a0, a1, a2 and a3 is applied to the encoder, and the remaining input information bits a4, a5 and a6 are initialized to '0'. At the same time, bit information indicating that the 4-bit rate indicator is applied to the encoder is provided to the controller 510. The controller 510 then provides the Walsh code generator 500 with a control signal instructing it to generate Walsh codes of length 16. Upon receiving the control signal, the Walsh code generator 500 generates Walsh codes W1, W2, W4 and W8 of length 16, and provides the generated Walsh codes W1, W2, W4 and W8 to the associated multipliers, respectively. To be specific, the Walsh code W1 is provided to the multiplier 520, the Walsh code W2 to the multiplier 522, the Walsh code W4 to the multiplier 524, and the Walsh code W8 to the multiplier 526. Shown in Table 11 are the Walsh codes of length 16 generated by the Walsh code generator 500.

TABLE 11

| Walsh Number | Walsh Code |
| --- | --- |
| W1 | 0101 0101 0101 0101 |
| W2 | 0011 0011 0011 0011 |
| W4 | 0000 1111 0000 1111 |
| W8 | 0000 0000 1111 1111 |

Meanwhile, the 4 input information bits of the rate indicator are provided to the associated multipliers, respectively. Shown in Table 12 are the relations between the 4 input information bits and the associated multipliers.

TABLE 12

| Input Information Bit | Multiplier |
| --- | --- |
| a0 | Multiplier 520 |
| a1 | Multiplier 522 |
| a2 | Multiplier 524 |
| a3 | Multiplier 526 |

Therefore, shown in Table 13 are the input information bits and the Walsh codes provided to the respective multipliers.

TABLE 13

| Multiplier | Walsh Code | Input Information Bit |
| --- | --- | --- |
| Multiplier 520 | W1 = 0101 0101 0101 0101 | a0 |
| Multiplier 522 | W2 = 0011 0011 0011 0011 | a1 |
| Multiplier 524 | W4 = 0000 1111 0000 1111 | a2 |
| Multiplier 526 | W8 = 0000 0000 1111 1111 | a3 |

The multipliers multiply the input information bits by the Walsh codes, provided thereto as shown in Table 13, and provide their outputs to the XOR operator 540. Specifically, the multiplier 520 multiplies the input information bit a0 by the Walsh code W1 every symbol, and provides its output to the XOR operator 540. The multiplier 522 multiplies the input information bit a1 by the Walsh code W2 every symbol, and provides its output to the XOR operator 540. The multiplier 524 multiplies the input information bit a2 by the Walsh code W4 every symbol, and provides its output to the XOR operator 540. The multiplier 526 multiplies the input information bit a3 by the Walsh code W8 every symbol, and provides its output to the XOR operator 540.

Meanwhile, since the multipliers 528, 530 and 532 receive the input information bits a4, a5 and a6 initialized to '0', the outputs of the multipliers 528, 530 and 532 do not affect the output of the XOR operator 540 regardless of the Walsh code W16 from the Walsh code generator 500 and the masks M1 and M2 from the mask generator 505. To be specific, the multiplier 528 outputs a symbol stream having coded symbols all having a value '0' regardless of a value of the Walsh code W16 from the Walsh code generator 500. Similarly, the multipliers 530 and 532 output symbol streams each having coded symbols all having a value '0' regardless of values of the masks M1 and M2 from the mask generator 505. As a result, the outputs of the multipliers 528, 530 and 532 do not affect the output of the XOR operator 540, though they are provided to the XOR operator 540. Initializing the input information bits a4, a5 and a6 to '0' is equivalent to a switching operation for cutting off the outputs of the multipliers 528, 530 and 532.

The XOR operator 540 then XORs the symbol streams of length 16 output from the multipliers 520, 522, 524, 526, 528, 530 and 532 in a symbol unit, and provides its output to the repeater 550.

The coded symbol stream Ws of length 16, output from the XOR operator 540, is then defined as $$Ws=(W1 \times a0)+(W2 \times a1)+(W4 \times a2)+(W8 \times a3) \quad \text{Equation 11}$$

At this moment, the controller 510 provides the repeater 550 with a control signal for controlling a repetition frequency over the output of the XOR operator 540. In the (24,4) encoder, as the symbol stream output from the XOR operator 540 has a length of 16, a repetition frequency of the repeater 550 will be 2. Therefore, the controller 510 provides the repeater 550 with a control signal instructing it to repeat the input signal two times. In response to the control signal, the repeater 550 repeats the symbol stream of length 16 output from the XOR operator 540 two times, and provides the puncturer 560 with a symbol stream of length 32.

At this point, the controller 510 provides the puncturer 560 with a control signal instructing it to puncture symbols in the puncturing positions for the (24,4) code. The puncturer 560 then receives 8 puncturing positions read from the memory 570, and punctures coded symbols in the 8 puncturing positions from the coded symbols of length 32 provided from the repeater 550. That is, the puncturer 560 punctures 8 symbols in the puncturing positions read from the memory 570 among the coded symbols of length 32 provided from the repeater 550. For example, when the puncturing positions from the memory 570 are $0^{th}$, $1^{st}$, $2^{nd}$, $3^{rd}$, $4^{th}$, $5^{th}$, $6^{th}$ and $16^{th}$ symbol positions (as shown in Table 1), the puncturer 560 punctures $0^{th}$, $1^{st}$, $2^{nd}$, $3^{rd}$, $4^{th}$, $5^{th}$, $6^{th}$ and $16^{th}$ coded symbols from the coded symbols of length 32, and outputs 24 coded symbols.

Fifth, a description will be made of another case where the encoder serves as the (24,3) encoder. A 3-bit rate indicator of a0, a1 and a2 is applied to the encoder, and the remaining input information bits a3, a4, a5 and a6 applied to the encoder are initialized to '0'. At the same time, bit information indicating that the 3-bit rate indicator is applied to the encoder is provided to the controller 510. The controller 510 then provides the Walsh code generator 500 with a control signal instructing it to generate Walsh codes of length 8. Upon receiving the control signal, the Walsh code generator 500 generates Walsh codes W1, W2 and W4 of length 8, and provides the generated Walsh codes W1, W2 and W4 to the associated multipliers, respectively. To be specific, the Walsh code W1 is provided to the multiplier 520, the Walsh code W2 to the multiplier 522, and the Walsh code W4 to the multiplier 524. Shown in Table 14 are the Walsh codes of length 8 generated by the Walsh code generator 500.

TABLE 14

| Walsh Number | Walsh Code |
|---|---|
| W1 | 0101 0101 |
| W2 | 0011 0011 |
| W4 | 0000 1111 |

Meanwhile, the 3 input information bits of the rate indicator are provided to the associated multipliers, respectively. Shown in Table 15 are the relations between the 3 input information bits and the associated multipliers.

TABLE 15

| Input Information Bit | Multiplier |
|---|---|
| a0 | Multiplier 520 |
| a1 | Multiplier 522 |
| a2 | Multiplier 524 |

Therefore, shown in Table 16 are the input information bits and the Walsh codes provided to the respective multipliers.

TABLE 16

| Multiplier | Walsh Code | Input Information Bit |
|---|---|---|
| Multiplier 520 | W1 = 0101 0101 | a0 |
| Multiplier 522 | W2 = 0011 0011 | a1 |
| Multiplier 524 | W4 = 0000 1111 | a2 |

The multipliers multiply the input information bits by the Walsh codes, provided thereto as shown in Table 16, and provide their outputs to the XOR operator 540. Specifically, the multiplier 520 multiplies the input information bit a0 by the Walsh code W1 every symbol, and provides its output to the XOR operator 540. The multiplier 522 multiplies the input information bit a1 by the Walsh code W2 every symbol, and provides its output to the XOR operator 540. The multiplier 524 multiplies the input information bit a2 by the Walsh code W4 every symbol, and provides its output to the XOR operator 540.

Meanwhile, since the multipliers 526, 528, 530 and 532 receive the input information bits a3, a4, a5 and a6 initialized to 0, the outputs of the multipliers 526, 528, 530 and 532 do not affect the output of the XOR operator 540 regardless of the Walsh codes W8 and W16 from the Walsh code generator 500 and the masks M1 and M2 from the mask generator 505. To be specific, the multipliers 526 and 528 output symbol streams each comprised of coded symbols all having a value '0' regardless of symbol values of the Walsh codes W8 and W16 from the Walsh code generator 500. Similarly, the multipliers 530 and 532 output symbol streams each comprised of coded symbols all having a value '0' regardless of symbol values of the masks M1 and M2 from the mask generator 505. As a result, the outputs of the multipliers 526, 528, 530 and 532 do not affect the output of the XOR operator 540, though they are provided to the XOR operator 540. Initializing the input information bits a3, a4, a5 and a6 to '0' is equivalent to a switching operation for cutting off the outputs of the multipliers 526, 528, 530 and 532.

The XOR operator 540 then XORs the symbol streams of length 8 output from the multipliers 520, 522, 524, 526, 528, 530 and 532 in a symbol unit, and provides its output to the repeater 550.

The coded symbol stream Ws of length 8, output from the XOR operator 540, is then defined as $$Ws=(W1 \times a0)+(W2 \times a1)+(W4 \times a2) \quad \text{Equation 12}$$

At this moment, the controller 510 provides the repeater 550 with a control signal for controlling a repetition frequency over the output of the XOR operator 540. In the (24,3) encoder, as the symbol stream output from the XOR operator 540 has a length of 8, a repetition frequency of the repeater 550 will be 4. Therefore, the controller 510 provides the repeater 550 with a control signal instructing it to repeat the input signal four times. In response to the control signal, the repeater 550 repeats the symbol stream of length 8 output from the XOR operator 540 four times, and provides the puncturer 560 with a symbol stream of length 32.

At this point, the controller 510 provides the puncturer 560 with a control signal instructing it to puncture symbols in the puncturing positions for the (24,3) code. The controller 510 may provide the puncturer 560 with length information (3 bits) of the rate indicator as the control signal. The puncturer 560 then receives 8 puncturing positions corresponding to the 3 input information bits of the rate indicator from the memory 570, and punctures coded symbols in the 8 puncturing positions from the coded symbols of length 32 provided from the repeater 550. That is, the puncturer 560 punctures 8 symbols in the puncturing positions read from the memory 570 among the coded symbols of length 32 provided from the repeater 550. For example, when the puncturing positions from the memory 570 are $0^{th}$, $3^{rd}$, $5^{th}$, $6^{th}$, $7^{th}$, $8^{th}$, $16^{th}$ and $24^{th}$ symbol positions (as shown in Table 1), the puncturer 560 punctures $0^{th}$, $3^{rd}$, $5^{th}$, $6^{th}$, $7^{th}$, $8^{th}$, $16^{th}$ and $24^{th}$ coded symbols from the coded symbols of length 32, and outputs 24 coded symbols.

Sixth, a description will be made of another case where the encoder serves as the (24,2) encoder. A 2-bit rate indicator of a0 and a1 is applied to the encoder, and the remaining input information bits a2, a3, a4, a5 and a6 applied to the encoder are initialized to '0'. At the same time, bit information indicating that the 2-bit rate indicator is applied to the encoder is provided to the controller 510. The controller 510 then provides the Walsh code generator 500 with a control signal instructing it to generate Walsh codes of length 4. Upon receiving the control signal, the Walsh code generator 500 generates Walsh codes W1 and W2 of length 4, and provides the generated Walsh codes W1 and W2 to the associated multipliers, respectively. To be specific, the Walsh code W1 is provided to the multiplier 520 and the Walsh code W2 to the multiplier 522. Shown in Table 17 are the Walsh codes of length 4 generated by the Walsh code generator 500.

TABLE 17

| Walsh Number | Walsh Code |
| --- | --- |
| W1 | 0101 |
| W2 | 0011 |

Meanwhile, the 2 input information bits of the rate indicator are provided to the associated multipliers, respectively. Shown in Table 18 are the relations between the 2 input information bits and the associated multipliers.

TABLE 18

| Input Information Bit | Multiplier |
| --- | --- |
| a0 | Multiplier 520 |
| a1 | Multiplier 522 |

Therefore, shown in Table 19 are the input information bits and the Walsh codes provided to the respective multipliers.

TABLE 19

| Multiplier | Walsh Code | Input Information Bit |
| --- | --- | --- |
| Multiplier 520 | W1 = 0101 | a0 |
| Multiplier 522 | W2 = 0011 | a1 |

The multipliers multiply the input information bits by the Walsh codes, provided thereto as shown in Table 19, and provide their outputs to the XOR operator 540. Specifically, the multiplier 520 multiplies the input information bit a0 by the Walsh code W1 every symbol, and provides its output to the XOR operator 540. The multiplier 522 multiplies the input information bit a1 by the Walsh code W2 every symbol, and provides its output to the XOR operator 540.

Meanwhile, since the multipliers 524, 526, 528, 530 and 532 receive the input information bits a2, a3, a4, a5 and a6 initialized to 0, the outputs of the multipliers 524, 526, 528, 530 and 532 do not affect the output of the XOR operator 540 regardless of the Walsh codes W4, W8 and W16 from the Walsh code generator 500 and the masks M1 and M2 from the mask generator 505. To be specific, the multipliers 524, 526 and 528 output symbol streams each comprised of coded symbols all having a value '0' regardless of symbol values of the Walsh codes W4, W8 and W16 from the Walsh code generator 500. Similarly, the multipliers 530 and 532 output symbol streams each comprised of coded symbols all having a value '0' regardless of symbol values of the masks M1 and M2 from the mask generator 505. As a result, the outputs of the multipliers 524, 526, 528, 530 and 532 do not affect the output of the XOR operator 540, though they are provided to the XOR operator 540. Initializing the input information bits a2, a3, a4, a5 and a6 to '0' is equivalent to a switching operation for cutting off the outputs of the multipliers 524, 526, 528, 530 and 532.

The XOR operator 540 then XORs the symbol streams of length 4 output from the multipliers 520, 522, 524, 526, 528, 530 and 532 in a symbol unit, and provides its output to the repeater 550.

The coded symbol stream Ws of length 4, output from the XOR operator 540, is then defined as $$Ws = (W1 \times a0) + (W2 \times a1) \qquad \text{Equation 13}$$

At this moment, the controller 510 provides the repeater 550 with a control signal for controlling a repetition frequency over the output of the XOR operator 540. In the (24,2) encoder, as the symbol stream output from the XOR operator 540 has a length of 4, a repetition frequency of the repeater 550 will be 8. Therefore, the controller 510 provides the repeater 550 with a control signal instructing it to repeat the input signal eighth times. In response to the control signal, the repeater 550 repeats the symbol stream of length 4 output from the XOR operator 540 eighth times, and provides the puncturer 560 with a symbol stream of length 32.

At this point, the controller 510 provides the puncturer 560 with a control signal instructing it to puncture symbols in the puncturing positions for the (24,2) code. The puncturer 560 then receives 8 puncturing positions read from the memory 570, and punctures coded symbols in the 8 puncturing positions from the coded symbols of length 32 provided from the repeater 550. That is, the puncturer 560 punctures 8 symbols in the puncturing positions read from the memory 570 among the coded symbols of length 32 provided from the repeater 550. For example, when the puncturing positions from the memory 570 are $0^{th}$, $4^{th}$, $8^{th}$, $12^{th}$, $16^{th}$, $20^{th}$, $24^{th}$ and $28^{th}$ symbol positions (as shown in Table 1), the puncturer 560 punctures $0^{th}$, $4^{th}$, $8^{th}$, $12^{th}$, $16^{th}$, $20^{th}$, $24^{th}$ and $28^{th}$ coded symbols from the coded symbols of length 32, and outputs 24 coded symbols.

Seventh, a description will be made of another case where the encoder serves as the (24,1) encoder. A 1-bit rate indicator of input information bit a0 is applied to the encoder, and the remaining input information bits a1, a2, a3, a4, a5 and a6 applied to the encoder are initialized to '0'. At the same time, bit information indicating that the 1-bit rate indicator is applied to the encoder is provided to the controller 510. The controller 510 then provides the Walsh code generator 500 with a control signal instructing it to generate a Walsh code of length 2. Upon receiving the control signal, the Walsh code generator 500 generates a Walsh code W1 of length 2, and provides the generated Walsh code W1 to the associated multiplier. To be specific, the Walsh code W1 is provided to the multiplier 520. Shown in Table 20 is the Walsh code of length 2 generated by the Walsh code generator 500.

TABLE 20

| Walsh Number | Walsh Code |
| --- | --- |
| W1 | 01 |

Meanwhile, the 1 input information bit of the rate indicator is provided to the associated multiplier. Shown in Table 21 are the relations between the 1 input information bit and the associated multiplier.

TABLE 21

| Input Information Bit | Multiplier |
| --- | --- |
| a0 | Multiplier 520 |

Therefore, shown in Table 22 are the input information bit and the Walsh code provided to the respective multiplier.

TABLE 22

| Multiplier | Walsh Code | Input Information Bit |
| --- | --- | --- |
| Multiplier 520 | W1 = 01 | a0 |

The multiplier multiplies the input information bit by the Walsh code, provided thereto as shown in Table 22, and provides its output to the XOR operator 540. Specifically, the multiplier 520 multiplies the input information bit a0 by the Walsh code W1 every symbol, and provides its output to the XOR operator 540.

Meanwhile, since the multipliers 522, 524, 526, 528, 530 and 532 receive the input information bits a1, a2, a3, a4, a5 and a6 initialized to 0, the outputs of the multipliers 522, 524, 526, 528, 530 and 532 do not affect the output of the XOR operator 540 regardless of the Walsh codes W2, W4, W8 and W16 from the Walsh code generator 500 and the masks M1 and M2 from the mask generator 505. To be specific, the multipliers 522, 524, 526 and 528 output symbol streams each comprised of coded symbols all having a value '0' regardless of symbol values of the Walsh codes W2, W4, W8 and W16 from the Walsh code generator 500. Similarly, the multipliers 530 and 532 output symbol streams each comprised of coded symbols all having a value '0' regardless of symbol values of the masks M1 and M2 from the mask generator 505. As a result, the outputs of the multipliers 522, 524, 526, 528, 530 and 532 do not affect the output of the XOR operator 540, though they are provided to the XOR operator 540. Initializing the input information bits a1, a2, a3, a4, a5 and a6 to '0' is equivalent to a switching operation for cutting off the outputs of the multipliers 522, 524, 526, 528, 530 and 532.

The XOR operator 540 then XORs the symbol streams of length 2 output from the multipliers 520, 522, 524, 526, 528, 530 and 532 in a symbol unit, and provides its output to the repeater 550.

The coded symbol stream Ws of length 2, output from the XOR operator 540, is then defined as $$Ws=(W1 \times a0) \qquad \text{Equation 14}$$

At this moment, the controller 510 provides the repeater 550 with a control signal for controlling a repetition frequency over the output of the XOR operator 540. In the (24,1) encoder, as the symbol stream output from the XOR operator 540 has a length of 2, a repetition frequency of the repeater 550 will be 32. Therefore, the controller 510 provides the repeater 550 with a control signal instructing it to repeat the input signal 32 times. In response to the control signal, the repeater 550 repeats the symbol stream of length 2 output from the XOR operator 540 32 times, and provides the puncturer 560 with a symbol stream of length 64.

At this point, the controller 510 provides the puncturer 560 with a control signal instructing it to puncture symbols in the puncturing positions for the (24,1) code. The puncturer 560 then receives 40 puncturing positions read from the memory 570, and punctures coded symbols in the 40 puncturing positions from the coded symbols of length 64 provided from the repeater 550. That is, the puncturer 560 punctures 40 symbols in the puncturing positions read from the memory 570 among the coded symbols of length 64 provided from the repeater 550. For example, when the puncturing positions from the memory 570 are all the even-numbered symbol positions and the $1^{st}$, $3^{rd}$, $5^{th}$, $7^{th}$, $9^{th}$, $11^{th}$, $13^{th}$ and $15^{th}$ symbol positions (as shown in Table 1), the puncturer 560 punctures the even-numbered coded symbols plus the $1^{st}$, $3^{rd}$, $5^{th}$, $7^{th}$, $9^{th}$, $11^{th}$, $13^{th}$ and $15^{th}$ coded symbols from the coded symbols of length 64, and outputs 24 coded symbols.

First Embodiment (Decoder)

Figure 6:
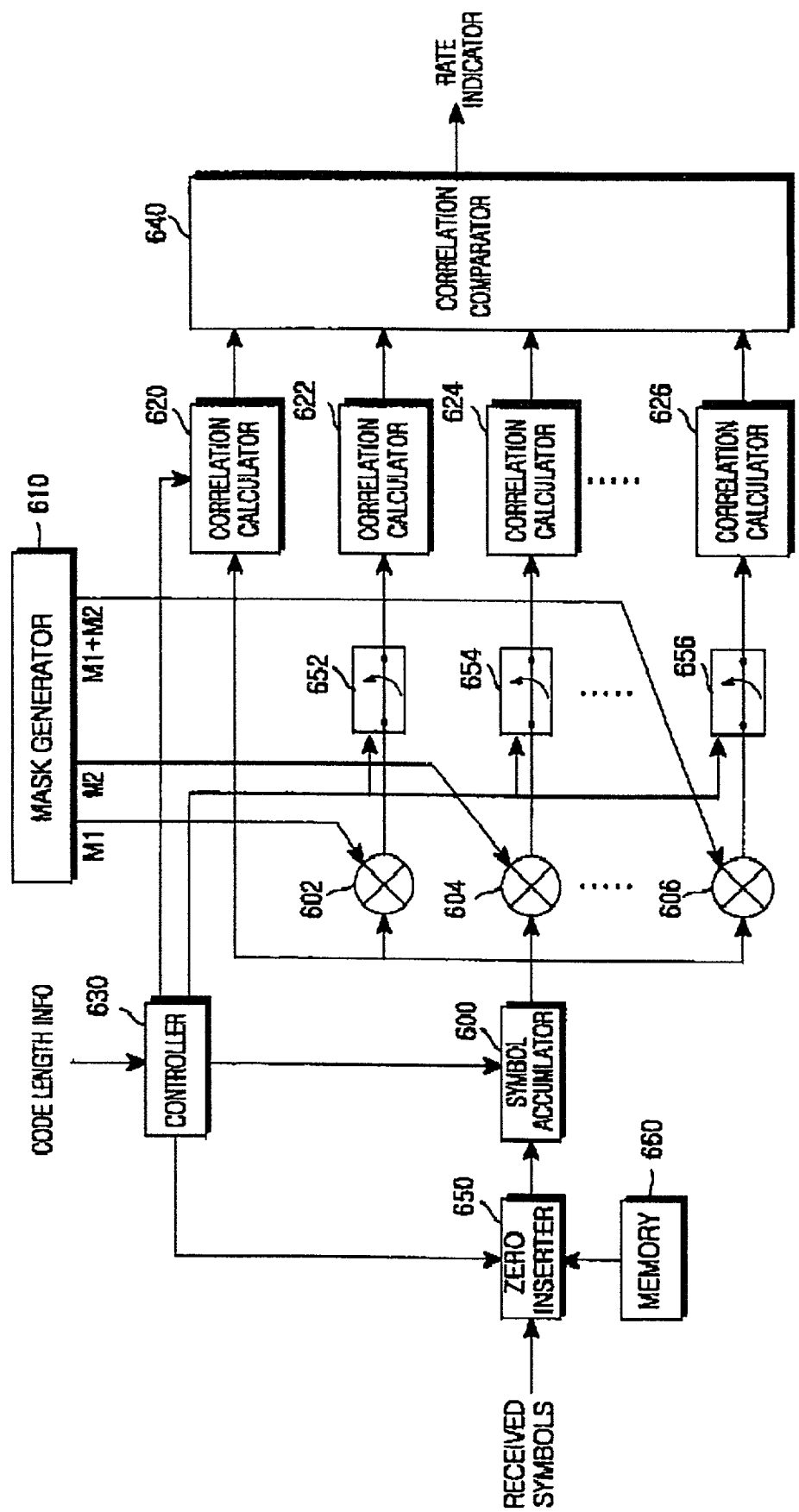
FIG. 6 illustrates a structure of a decoder in a CDMA mobile communication system according to an embodiment of the present invention.

FIG. 6 illustrates a structure of a decoder corresponding to the encoder of FIG. 5. A description of the decoder will be made separately for the respective cases where the encoder serves as a (24,1) decoder to a (24,7) decoder.

First, a description will be made of a case where the decoder serves as the (24,7) decoder corresponding to the (24,7) encoder described in conjunction with FIG. 5. The (24,7) decoder receives a coded symbol stream comprised of 24 coded symbols having a value of '+1' or '−1', encoded by the (24,7) encoder. The received code symbol stream is applied to a zero (0) inserter 650.

Meanwhile, upon receiving predetermined code length information, a controller 630 provides the (24,7) decoder with a control signal instructing it to insert '0', an intermediate value between '+1' and '−1', in the puncturing positions for the (24,7) encoder. The zero inserter 650, under the control of the controller 630, receives information on the 8 puncturing positions corresponding to the 7 input information bits from a memory 660. For example, the puncturing positions corresponding to the 7 input information bits are $0^{th}$, $4^{th}$, $8^{th}$, $12^{th}$, $16^{th}$, $20^{th}$, $24^{th}$ and $28^{th}$ symbol positions or $0^{th}$, $1^{st}$, $2^{nd}$, $3^{rd}$, $4^{th}$, $5^{th}$, $6^{th}$ and $7^{th}$ symbol positions.

Therefore, the zero inserter 650 inserts '0' in the puncturing positions provided from the memory 660 among the 24 coded symbols constituting the received coded symbol stream, and provides the zero-inserted symbol stream having 32 coded symbols to a symbol accumulator 600. The controller 630 then provides the symbol accumulator 600 with a control signal instructing it to accumulate the symbols repeated as many times as a repetition frequency of the (24,7) encoder. Since the (24,7) encoder has not performed symbol repetition, the symbol accumulator 600 outputs the 32 intact received symbols. The 32 received symbols are provided to a correlation calculator 620, and also provided to multipliers 602, 604 and 606. A mask generator 610 then generates mask function M1, M2 and M1+M2, all having a length of 32, and provides the mask function M1 to the multiplier 602, the mask function M2 to the multiplier 604 and the mask function M1+M2 to the multiplier 606. The mask functions are varied according to the puncturing positions (or the puncturing pattern). When the puncturing positions are used, the mask functions used in the encoder are used. Then, the multiplier 602 multiplies the received symbols by the mask function M1 in a symbol unit, and the multiplier 604 multiplies the received symbols by the mask function M2 in a symbol unit. Also, the multiplier 606 multiplies the received symbols by the mask function M1+M2 in a symbol unit. A switch 652, under the control of the controller 630, provides the symbol stream output from the multiplier 602 to a correlation calculator 622. A switch 654, under the control of the controller 630, provides the symbol stream output from the multiplier 604 to a correlation calculator 624. A switch 656, under the control of the controller 630, provides the symbol stream output from the multiplier 606 to a correlation calculator 626. Then, the correlation calculator 620 calculates all correlations between the received symbol stream of length 32 and 32 Walsh codes of length 32, and provides a correlation comparator 640 with a Walsh code number having the highest correlation, a correlation value and a mask number '0' indicating that no mask function was used in the preceding stage. The correlation calculator 622 calculates all correlations between a symbol stream determined by multiplying the received symbol stream of length 32 by the mask function M1 and the 32 Walsh codes of length 32, and provides the correlation comparator 640 with a Walsh code number having the highest correlation, a correlation value and a mask number '1' indicating the mask number is used in the preceding stage. The correlation calculator 624 calculates all correlations between a symbol stream determined by multiplying the received symbol stream of length 32 by the mask function M2 and the 32 Walsh codes of length 32, and provides the correlation comparator 640 with a Walsh code number having the highest correlation, a correlation value and a mask number '2' indicating the mask number is used in the preceding stage. The correlation calculator 626 calculates all correlations between a symbol stream determined by multiplying the received symbol stream of length 32 by the mask function M1+M2 and the 32 Walsh codes of length 32, and provides the correlation comparator 640 with a Walsh code number having the highest correlation, a correlation value and a mask number '3' indicating the mask number is used in the preceding stage. The correlation comparator 640 then selects a largest value among the values received from the correlation calculators 620, 622, 624 and 626, connects the corresponding Walsh code number and mask number, and outputs the connected value as decoded bits.

Second, a description will be made of a case where the decoder serves as the (24,6) decoder corresponding to the (24,6) encoder described in conjunction with FIG. 5. The (24,6) decoder receives a coded symbol stream comprised of 24 coded symbols having a value of '+1' or '−1', encoded by the (24,6) encoder. The received code symbol stream is applied to the zero (0) inserter 650.

Meanwhile, upon receiving predetermined code length information, the controller 630 provides the (24,6) decoder with a control signal instructing it to insert '0', an intermediate value between '+1' and '−1', in the puncturing positions for the (24,6) encoder. The zero inserter 650, under the control of the controller 630, receives information on the 8 puncturing positions corresponding to the 6 input information bits from a memory 660. For example, the puncturing positions corresponding to the 6 input information bits are $0^{th}$, $1^{st}$, $2^{nd}$, $3^{rd}$, $4^{th}$, $5^{th}$, $6^{th}$ and $7^{th}$ symbol positions.

Therefore, the zero inserter 650 inserts '0' in the puncturing positions provided from the memory 660 among the 24 coded symbols constituting the received coded symbol stream, and provides the zero-inserted symbol stream having 32 coded symbols to the symbol accumulator 600. The controller 630 then provides the symbol accumulator 600 with a control signal instructing it to accumulate the symbols repeated as many times as a repetition frequency of the (24,6) encoder. Since the (24,6) encoder has performed symbol repetition one time, the symbol accumulator 600 outputs the 32 intact received symbols. The 32 received symbols are provided to the correlation calculator 620, and also provided to the multipliers 602, 604 and 606. The mask generator 610 then generates mask function M1 and M2, all having a length of 32, and provides the mask function M1 to the multiplier 602 and the mask function M2 to the multiplier 604. The mask functions are varied according to the puncturing positions (or the puncturing pattern). When the puncturing positions are used, the mask functions used in the encoder are used. Then, the multiplier 602 multiplies the received symbols by the mask function M1 in a symbol unit, and the multiplier 604 multiplies the received symbols by the mask function M2 in a symbol unit. The switch 652, under the control of the controller 630, provides the symbol stream output from the multiplier 602 to the correlation calculator 622. The switches 654 and 656, under the control of the controller 630, cut off the symbol streams output from the multipliers 604 and 606, so the outputs of the multipliers 604 and 606 are not used. Then, the correlation calculator 620 calculates all correlations between the received symbol stream of length 32 and 32 Walsh codes of length 32, and provides the correlation comparator 640 with a Walsh code number having the highest correlation, a correlation value and a mask number '0' indicating that no mask function was used in the preceding stage. The correlation calculator 622 calculates all correlations between a symbol stream determined by multiplying the received symbol stream of length 32 by the mask function M1 and the 32 Walsh codes of length 32, and provides the correlation comparator 640 with a Walsh code number having the highest correlation, a correlation value and a mask number '1' indicating the mask number is used in the preceding stage. The correlation comparator 640 then connects the Walsh code number and mask number received from the correlation calculator 620, and outputs the connected value as decoded bits.

Third, a description will be made of a case where the decoder serves as the (24,5) decoder corresponding to the (24,5) encoder described in conjunction with FIG. 5. The (24,5) decoder receives a coded symbol stream comprised of 24 coded symbols having a value of '+1' or '−1', encoded by the (24,5) encoder. The received code symbol stream is applied to the zero (0) inserter 650.

Meanwhile, upon receiving predetermined code length information, the controller 630 provides the (24,5) decoder with a control signal instructing it to insert '0', an intermediate value between '+1' and '−1', in the puncturing positions for the (24,5) encoder. The zero inserter 650, under the control of the controller 630, receives information on the 8 puncturing positions corresponding to the 5 input information bits from a memory 660. For example, the puncturing positions corresponding to the 5 input information bits are $0^{th}$, $1^{st}$, $2^{nd}$, $3^{rd}$, $4^{th}$, $5^{th}$, $6^{th}$ and $7^{th}$ symbol positions. Therefore, the zero inserter 650 inserts '0' in the puncturing positions provided from the memory 660 among the 24 coded symbols constituting the received coded symbol stream, and provides the zero-inserted symbol stream having 32 coded symbols to the symbol accumulator 600. The controller 630 then provides the symbol accumulator 600 with a control signal instructing it to accumulate the symbols repeated as many times as a repetition frequency of the (24,5) encoder.

Since the (24,5) encoder has performed symbol repetition one time, the symbol accumulator 600 outputs the 32 intact received symbols. The 32 received symbols are provided to the correlation calculator 620, and also provided to the multipliers 602, 604 and 606. Since the switches 652, 654 and 656 at the output nodes of the multipliers 602, 604 and 606 are turned off under the control of the controller 630, the outputs of the multipliers 602, 604 and 606 are cut off, making operations of the multipliers 602, 604 and 606 ineffective. The controller 630 then provides the correlation calculator 620 with a control signal instructing it to calculate correlations between the received symbol stream of length 32 and Walsh codes having the same code length (i.e., Walsh codes of length 32). Then, the correlation calculator 620 calculates all correlations between the received symbol stream of length 32 and 32 Walsh codes of length 32, and provides the correlation comparator 640 with a Walsh code number having the highest correlation, a correlation value and a mask number value of "0". The correlation comparator 640 then connects the Walsh code number and mask number received from the correlation calculator 620, and outputs the connected value as decoded bits.

Fourth, a description will be made of another case where the decoder serves as the (24,4) decoder corresponding to the (24,4) encoder described in conjunction with FIG. 5. The (24,4) decoder receives a coded symbol stream comprised of 24 coded symbols having a value of '+1' or '−1', encoded by the (24,4) encoder. The received code symbol stream is applied to the zero inserter 650.

Meanwhile, upon receiving predetermined code length information, the controller 630 provides the zero inserter 650 with a control signal instructing it to insert '0', an intermediate value between '+1' and '−1', in the puncturing positions for the (24,4) encoder. The zero inserter 650, under the control of the controller 630, receives information on the puncturing positions corresponding to the 4 input information bits from the memory 660. For example, the 8 puncturing positions corresponding to the 4 input information bits are $0^{th}$, $1^{st}$, $2^{nd}$, $3^{rd}$, $4^{th}$, $5^{th}$, $6^{th}$ and $16^{th}$ symbol positions. Therefore, the zero inserter 650 inserts '0' in the puncturing positions provided from the memory 660 among the 24 coded symbols constituting the received coded symbol stream, and provides the zero-inserted symbol stream comprised of 32 coded symbols to the symbol accumulator 600. The controller 630 then provides the symbol accumulator 600 with a control signal instructing it to accumulate the symbols repeated as many times as a repetition frequency of the (24,4) encoder.

Since the (24,4) encoder has performed symbol repetition two times, the symbol accumulator 600 accumulates the two symbols in the repeated positions among the 32 received symbols, and outputs a symbol stream of length 16. The 16 received symbols output from the accumulator 600 are provided to the correlation calculator 620, and also provided to the multipliers 602, 604 and 606. The switches 652, 654 and 656 connected to output nodes of the multipliers 602, 604 and 606 are turned OFF under the control of the controller 630, so that the outputs of the multipliers 602, 604 and 606 are not used. The controller 630 then provides the correlation calculator 620 with a control signal instructing it to calculate correlations between the received symbol stream and the Walsh codes having the same length (i.e., Walsh codes of length 16). The correlation calculator 620 then calculates all correlations between the received symbol stream of length 16 and the Walsh codes of length 16, and provides the correlation comparator 640 with a Walsh code number having the highest correlation, a correlation value, and a value of "0" indicating the mask number. The correlation comparator 640 then connects the Walsh code number and the mask number received from the correlation calculator 620, and outputs the connected value as decoded bits.

Fifth, a description will be made of another case where the decoder serves as the (24,3) decoder corresponding to the (24,3) encoder described in conjunction with FIG. 5. The (24,3) decoder receives a coded symbol stream comprised of 24 coded symbols having a value of '+1' or '−1', encoded by the (24,3) encoder. The received code symbol stream is applied to the zero inserter 650.

Meanwhile, upon receiving predetermined code length information, the controller 630 provides the zero inserter 650 with a control signal instructing it to insert '0', an intermediate value between '+1' and '−1', in the puncturing positions for the (24,3) encoder. The zero inserter 650, under the control of the controller 630, receives information on the puncturing positions corresponding to the 3 input information bits from the memory 660. For example, the 8 puncturing positions corresponding to the 3 input information bits are $0^{th}$, $3^{rd}$, $5^{th}$, $6^{th}$, $7^{th}$, $8^{th}$, $16^{th}$ and $24^{th}$ symbol positions. Therefore, the zero inserter 650 inserts '0' in the puncturing positions provided from the memory 660 among the 24 coded symbols constituting the received coded symbol stream, and provides the zero-inserted symbol stream comprised of 32 coded symbols to the symbol accumulator 600. The controller 630 then provides the symbol accumulator 600 with a control signal instructing it to accumulate the symbols repeated as many times as a repetition frequency of the (24,3) encoder.

Since the (24,3) encoder has performed symbol repetition four times, the symbol accumulator 600 accumulates the four symbols in the repeated positions among the 32 received symbols, and outputs a symbol stream of length 8. The received symbols of length 8 output from the accumulator 600 are provided to the correlation calculator 620, and also provided to the multipliers 602, 604 and 606. The switches 652, 654 and 656 connected to output nodes of the multipliers 602, 604 and 606 are turned OFF under the control of the controller 630, so that the outputs of the multipliers 602, 604 and 606 are not used. The controller 630 then provides the correlation calculator 620 with a control signal instructing it to calculate correlations between the received symbol stream and the Walsh codes having the same length (i.e., Walsh codes of length 8). The correlation calculator 620 then calculates all correlations between the received symbol stream of length 8 and the 8 Walsh codes of length 8, and provides the correlation comparator 640 with a Walsh code number having the highest correlation, a correlation value, and a value of "0" indicating the mask number. The correlation comparator 640 then connects the Walsh code number and the mask number received from the correlation calculator 620, and outputs the connected value as decoded bits.

Sixth, a description will be made of another case where the decoder serves as the (24,2) decoder corresponding to the (24,2) encoder described in conjunction with FIG. 5. The (24,2) decoder receives a coded symbol stream comprised of 24 coded symbols having a value of '+1' or '−1', encoded by the (24,2) encoder. The received code symbol stream is applied to the zero inserter 650.

Meanwhile, upon receiving predetermined code length information, the controller 630 provides the zero inserter 650 with a control signal instructing it to insert '0', an intermediate value between '+1' and '−1', in the puncturing positions for the (24,2) encoder. The zero inserter 650, under the control of the controller 630, receives information on the puncturing positions corresponding to the 2 input information bits from the memory 660. For example, the 8 puncturing positions corresponding to the 2 input information bits are $0^{th}$, $4^{th}$, $8^{th}$, $12^{th}$, $16^{th}$, $20^{th}$, $24^{th}$ and $28^{th}$ symbol positions. Therefore, the zero inserter 650 inserts '0' in the puncturing positions provided from the memory 660 among the 24 coded symbols constituting the received coded symbol stream, and provides the zero-inserted symbol stream comprised of 32 coded symbols to the symbol accumulator 600. The controller 630 then provides the symbol accumulator 600 with a control signal instructing it to accumulate the symbols repeated as many times as a repetition frequency of the (24,2) encoder.

Since the (24,2) encoder has performed symbol repetition eight times, the symbol accumulator 600 accumulates the eight symbols in the repeated positions among the 32 received symbols, and outputs a symbol stream of length 4. The received symbols of length 4 output from the accumulator 600 are provided to the correlation calculator 620, and also provided to the multipliers 602, 604 and 606. The switches 652, 654 and 656 connected to output nodes of the multipliers 602, 604 and 606 are turned OFF under the control of the controller 630, so that the outputs of the multipliers 602, 604 and 606 are not used. The controller 630 then provides the correlation calculator 620 with a control signal instructing it to calculate correlations between the received symbol stream and the Walsh codes having the same length (i.e., Walsh codes of length 4). The correlation calculator 620 then calculates all correlations between the received symbol stream of length 4 and the 4 Walsh codes of length 4, and provides the correlation comparator 640 with a Walsh code number having the highest correlation, a correlation value, and a value of "0" indicating the mask number. The correlation comparator 640 then connects the Walsh code number and the mask number received from the correlation calculator 620, and outputs the connected value as decoded bits.

Seventh, a description will be made of another case where the decoder serves as the (24,1) decoder corresponding to the (24,1) encoder described in conjunction with FIG. 5. The (24,1) decoder receives a coded symbol stream comprised of 24 coded symbols having a value of '+1' or '−1', encoded by the (24,1) encoder. The received code symbol stream is applied to the zero inserter 650.

Meanwhile, upon receiving predetermined code length information, the controller 630 provides the zero inserter 650 with a control signal instructing it to insert '0', an intermediate value between '+1' and '−1', in the puncturing positions for the (24,1) encoder. The zero inserter 650, under the control of the controller 630, receives information on the puncturing positions corresponding to the 1 input information bit from the memory 660. For example, the puncturing positions corresponding to the 1 input information bit are all the even-numbered symbol positions and $1^{st}$, $3^{rd}$, $5^{th}$, $7^{th}$, $9^{th}$, $11^{th}$, $13^{th}$ and $15^{th}$ symbol positions. Therefore, the zero inserter 650 inserts '0' in the puncturing positions provided from the memory 660 among the 24 coded symbols constituting the received coded symbol stream, and provides the zero-inserted symbol stream comprised of 64 coded symbols to the symbol accumulator 600. The controller 630 then provides the symbol accumulator 600 with a control signal instructing it to accumulate the symbols repeated as many times as a repetition frequency of the (24,1) encoder.

Since the (24,1) encoder has performed symbol repetition 32 times, the symbol accumulator 600 accumulates the 32 symbols in the repeated positions among the 64 received symbols, and outputs a symbol stream of length 2. The received symbols of length 2 output from the accumulator 600 are provided to the correlation calculator 620, and also provided to the multipliers 602, 604 and 606. The switches 652, 654 and 656 connected to output nodes of the multipliers 602, 604 and 606 are turned OFF under the control of the controller 630, so that the outputs of the multipliers 602, 604 and 606 are not used. The controller 630 then provides the correlation calculator 620 with a control signal instructing it to calculate correlations between the received symbol stream and the Walsh codes having the same length (i.e., Walsh codes of length 2). The correlation calculator 620 then calculates all correlations between the received symbol stream of length 2 and the 2 Walsh codes of length 2, and provides the correlation comparator 640 with a Walsh code number having the highest correlation, a correlation value, and a value of "0" indicating the mask number. The correlation comparator 640 then connects the Walsh code number and the mask number received from the correlation calculator 620, and outputs the connected value as decoded bits.

Second Embodiment (Encoder)

Figure 9:
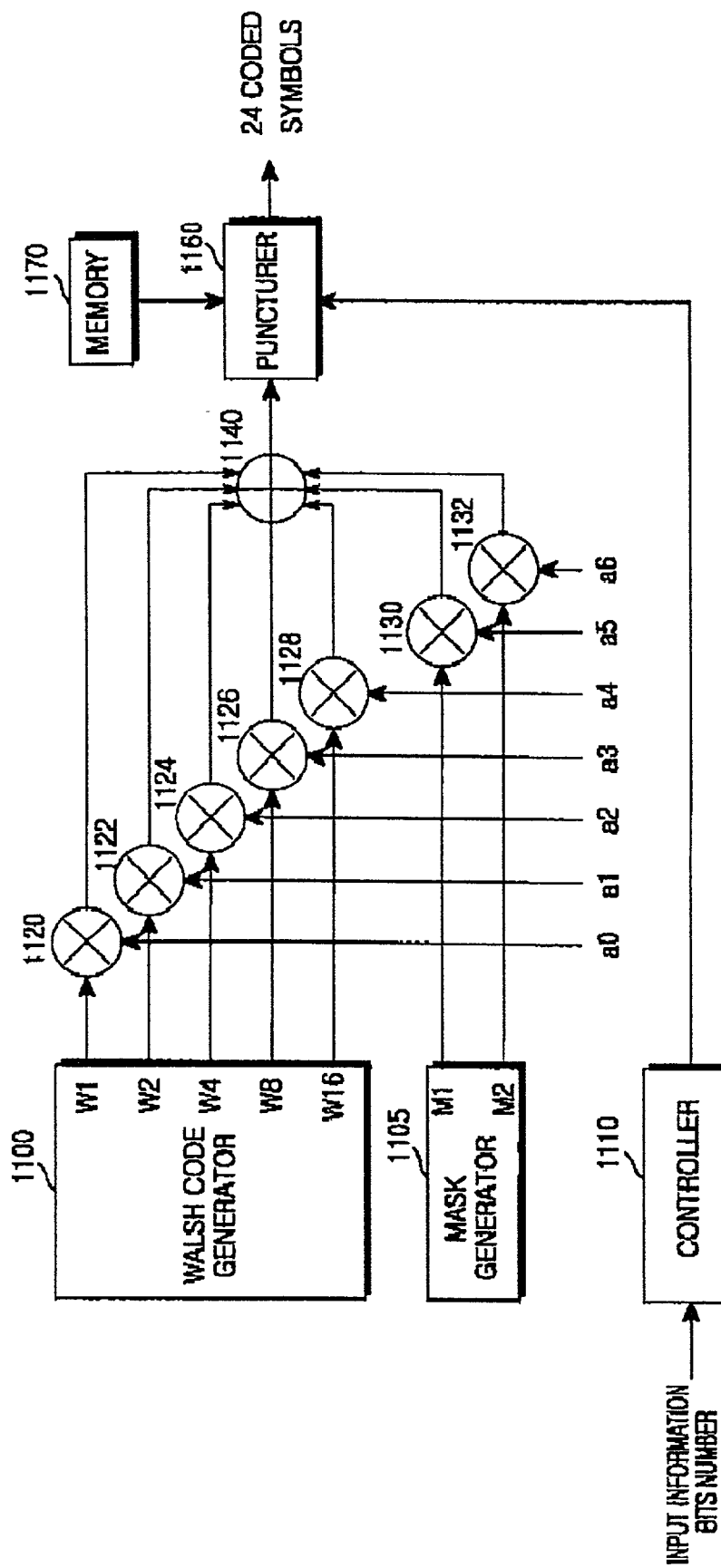
FIG. 9 illustrates a modified structure of an encoder serving as all of an optimal (24,1) encoder to an optimal (24,7) encoder in a CDMA mobile communication system according to an embodiment of the present invention.

FIG. 9 illustrates a structure of an encoder serving as all of the (24,1) encoder to the (24,7) encoder having different lengths according to a second embodiment of the present invention. That is, the encoder of FIG. 9 encodes 1 to 7 input information bits with different Walsh codes or masks having a length of 32, and outputs a coded symbol stream having 24 coded symbols. Unlike the encoder according to the first embodiment, the encoder according to the second embodiment does not include the symbol repeater.

Referring to FIG. 9, a controller 1110 controls an encoding operation by determining the number of the input information bits. That is, the controller 1110 provides a puncturer 1160 with a control signal instructing it to puncture symbols in 8 puncturing positions corresponding to the input information bits. A Walsh code generator 1100 generates Walsh codes of length 32. For example, upon receiving the input information bits, the Walsh code generator 1100 generates 5 different Walsh codes of length 32. A mask generator 1105 generates masks of length 32. For example, upon receiving the input information bits, the mask generator 1105 generates 2 different masks of length 32.

Multipliers 1120–1132 multiply the 1 to 7 input information bits by the Walsh codes and the masks from the Walsh code generator 1100 and the mask generator 1105 on a one-to-one basis, and output coded symbol streams each having 32 coded symbols. An XOR operator 1140 XORs the coded symbol streams from the multipliers 1120–1132, and outputs one coded symbol stream having 32 coded symbols. The coded symbol stream of length 32 output from the XOR operator 1140 is provided to the puncturer 1160. A memory 1170 stores 8 puncturing positions corresponding to each of the 1 to 7 input information bits.

Shown in Table 23 are puncturing positions associated with the number of the input information bits, stored in a memory table of the memory 1170.

TABLE 23

| No of Input Info Bits | Puncturing Positions |
|---|---|
| 1 | $1^{st}$, $3^{rd}$, $5^{th}$, $7^{th}$, $9^{th}$, $11^{th}$, $13^{th}$ and $15^{th}$ symbol positions |
| 2 | $0^{th}$, $4^{th}$, $8^{th}$, $12^{th}$, $16^{th}$, $20^{th}$, $24^{th}$ and $28^{th}$ symbol positions |
| 3 | $0^{th}$, $3^{rd}$, $5^{th}$, $6^{th}$, $7^{th}$, $8^{th}$, $16^{th}$ and $24^{th}$ symbol positions |
| 4 | $0^{th}$, $1^{st}$, $2^{nd}$, $3^{rd}$, $4^{th}$, $5^{th}$, $6^{th}$ and $16^{th}$ symbol positions |
| 5 | $0^{th}$, $1^{st}$, $2^{nd}$, $3^{rd}$, $4^{th}$, $5^{th}$, $6^{th}$ and $7^{th}$ symbol positions |
| 6 | $0^{th}$, $1^{st}$, $2^{nd}$, $3^{rd}$, $4^{th}$, $5^{th}$, $6^{th}$ and $7^{th}$ symbol positions |
| 7 | $0^{th}$, $1^{st}$, $2^{nd}$, $3^{rd}$, $4^{th}$, $5^{th}$, $6^{th}$ and $7^{th}$ symbol positions |

The puncturer 1160 receives the coded symbol stream having 32 coded symbols from the XOR operator 1140, punctures coded symbols in the 8 puncturing positions read from the memory 1170 from the 32 coded symbols under the control of the controller 1110, and outputs a coded symbol stream having 24 coded symbols. That is, if the number of the input information bits is 1, the puncturer 1160 punctures the $1^{st}$, $3^{rd}$, $5^{th}$, $7^{th}$, $9^{th}$, $11^{th}$, $13^{th}$ and $15^{th}$ symbols from the 32 coded symbols output from the XOR operator 1140 under the control of the controller 1110, and outputs a coded symbol stream having 24 coded symbols. If the number of the input information bits is 2, the puncturer 1160 punctures the $0^{th}$, $4^{th}$, $8^{th}$, $12^{th}$, $16^{th}$, $20^{th}$, $24^{th}$ and $28^{th}$ symbols from the 32 coded symbols output from the XOR operator 1140 under the control of the controller 1110, and outputs a coded symbol stream having 24 coded symbols. If the number of the input information bits is 2, the puncturer 1160 punctures the $0^{th}$, $4^{th}$, $8^{th}$, $12^{th}$, $16^{th}$, $20^{th}$, $24^{th}$ and $28^{th}$ symbols from the 32 coded symbols output from the XOR operator 1140 under the control of the controller 1110, and outputs a coded symbol stream having 24 coded symbols. If the number of the input information bits is 3, the puncturer 1160 punctures the $0^{th}$, $3^{rd}$, $5^{th}$, $6^{th}$, $7^{th}$, $8^{th}$, $16^{th}$ and $24^{th}$ symbols from the 32 coded symbols output from the XOR operator 1140 under the control of the controller 1110, and outputs a coded symbol stream having 24 coded symbols. If the number of the input information bits is 4, the puncturer 1160 punctures the $0^{th}$, $1^{st}$, $2^{nd}$, $3^{rd}$, $4^{th}$, $5^{th}$, $6^{th}$ and $16^{th}$ symbols from the 32 coded symbols output from the XOR operator 1140 under the control of the controller 1110, and outputs a coded symbol stream having 24 coded symbols. If the number of the input information bits is 5, the puncturer 1160 punctures the $0^{th}$, $1^{st}$, $2^{nd}$, $3^{rd}$, $4^{th}$, $5^{th}$, $6^{th}$ and $7^{th}$ symbols from the 32 coded symbols output from the XOR operator 1140 under the control of the controller 1110, and outputs a coded symbol stream having 24 coded symbols. If the number of the input information bits is 6, the puncturer 1160 punctures the $0^{th}$, $1^{st}$, $2^{nd}$, $3^{rd}$, $4^{th}$, $5^{th}$, $6^{th}$ and $7^{th}$ symbols from the 32 coded symbols output from the XOR operator 1140 under the control of the controller 1110, and outputs a coded symbol stream having 24 coded symbols. If the number of the input information bits is 7, the puncturer 1160 punctures the $0^{th}$, $1^{st}$, $2^{nd}$, $3^{rd}$, $4^{th}$, $5^{th}$, $6^{th}$ and $7^{th}$ symbols from the 32 coded symbols output from the XOR operator 1140 under the control of the controller 1110, and outputs a coded symbol stream having 24 coded symbols.

With reference to FIG. 9, a description of the encoder will be made separately for the respective cases where the encoder serves as a (24,1) encoder to a (24,7) encoder. It will be assumed herein that the input information bits applied to the encoder constitute a rate indicator.

First, a description will be made of a case where the encoder serves as the (24,7) encoder. A 7-bit rate indicator of a0, a1, a2, a3, a4, a5 and a6 is applied to the encoder. The Walsh code generator 1100 then generates Walsh codes W1, W2, W4, W8 and W16 of length 32. The Walsh code generator 1100 may operate either under the control of the controller 1110 or without separate control. FIG. 9 illustrates an example where the Walsh code generator 1100 operates without separate control. The Walsh codes W1, W2, W4, W8 and W16 generated by the Walsh code generator 1100 are provided to the associated multipliers, respectively. To be specific, the Walsh code W1 is provided to the multiplier 1120, the Walsh code W2 to the multiplier 1122, the Walsh code W4 to the multiplier 1124, the Walsh code W8 to the multiplier 1126, and the Walsh code W16 to the multiplier 1128. Shown in Table 24 are the Walsh codes of length 32 generated by the Walsh code generator 1100.

TABLE 24

| Walsh Number | Walsh Code |
|---|---|
| W1 | 0101 0101 0101 0101 0101 0101 0101 0101 |
| W2 | 0011 0011 0011 0011 0011 0011 0011 0011 |
| W4 | 0000 1111 0000 1111 0000 1111 0000 1111 |
| W8 | 0000 0000 1111 1111 0000 0000 1111 1111 |
| W16 | 0000 0000 0000 0000 1111 1111 1111 1111 |

At the same time, the mask generator 1105 generates a mask M1=0111 0111 0010 0100 0110 0000 0000 0000 and a mask M2=0010 0110 0101 0100 0101 0100 0100 0000, and provides the generated masks M1 and M2 to the multipliers 1130 and 1132, respectively.

Meanwhile, the 7 input information bits of the rate indicator are provided to the associated multipliers, respectively. Shown in Table 25 are the relations between the 7 input information bits and the associated multipliers.

TABLE 25

| Input Information Bit | Multiplier |
|---|---|
| a0 | Multiplier 1120 |
| a1 | Multiplier 1122 |
| a2 | Multiplier 1124 |
| a3 | Multiplier 1126 |
| a4 | Multiplier 1128 |
| a5 | Multiplier 1130 |
| a6 | Multiplier 1132 |

Therefore, shown in Table 26 are the input information bits and the Walsh codes or masks provided to the respective multipliers.

TABLE 26

| Multiplier | Walsh Code/Mask | Input Information Bit |
|---|---|---|
| Multiplier 1120 | W1 = 0101 0101 0101 0101 0101 0101 0101 0101 | a0 |
| Multiplier 1122 | W2 = 0011 0011 0011 0011 0011 0011 0011 0011 | a1 |
| Multiplier 1124 | W4 = 0000 1111 0000 1111 0000 1111 0000 1111 | a2 |
| Multiplier 1126 | W8 = 0000 0000 1111 1111 0000 0000 1111 1111 | a3 |
| Multiplier 1128 | W16 = 0000 0000 0000 0000 1111 1111 1111 1111 | a4 |
| Multiplier 1130 | M1 = 0111 0111 0010 0100 0110 0000 0000 0000 | a5 |
| Multiplier 1132 | M2 = 0010 0110 0101 0100 0101 0100 0100 0000 | a6 |

The multipliers multiply the input information bits by the Walsh codes or masks, provided thereto as shown in Table 26, and provide their outputs to the XOR operator 1140. Specifically, the multiplier 1120 multiplies the input information bit a0 by the Walsh code W1 every symbol, and provides its output to the XOR operator 1140. The multiplier 1122 multiplies the input information bit a1 by the Walsh code W2 every symbol, and provides its output to the XOR operator 1140. The multiplier 1124 multiplies the input information bit a2 by the Walsh code W4 every symbol, and provides its output to the XOR operator 1140. The multiplier 1126 multiplies the input information bit a3 by the Walsh code W8 every symbol, and provides its output to the XOR operator 1140. The multiplier 1128 multiplies the input information bit a4 by the Walsh code W16 every symbol, and provides its output to the XOR operator 1140. The multiplier 1130 multiplies the input information bit a5 by the mask M1 every symbol, and provides its output to the XOR operator 1140. The multiplier 1132 multiplies the input information bit a6 by the mask M2 every symbol, and provides its output to the XOR operator 1140.

The XOR operator 1140 then XORs the symbol streams of length 32 output from the multipliers 1120, 1122, 1124, 1126, 1128, 1130 and 1132 in a symbol unit, and provides its output to the puncturer 1160.

The coded symbol stream Ws of length 32, output from the XOR operator 1140, is then defined as $$Ws=(W1 \times a0)+(W2 \times a1)+(W4 \times a2)+(W8 \times a3)+(W16 \times a4)+(M1 \times a5)+(M2 \times a6)$$ Equation 15

At this moment, the controller 1110 provides the puncturer 1160 with a control signal instructing it to puncture symbols in the puncturing positions for the (24,7) code. The puncturer 1160 then receives 8 puncturing positions from the memory 1170, and punctures coded symbols in the 8 puncturing positions from the coded symbols of length 32 provided from the XOR operator 1140. That is, the puncturer 1160 punctures 8 symbols in the puncturing positions read from the memory 1170 among the coded symbols of length 32 provided from the XOR operator 1140. For example, when the puncturing positions from the memory 1170 are $1^{st}$, $2^{nd}$, $3^{rd}$, $4^{th}$, $5^{th}$, $6^{th}$ and $7^{th}$ symbol positions, the puncturer 1160 punctures $1^{st}$, $2^{nd}$, $3^{rd}$, $4^{th}$, $5^{th}$, $6^{th}$ and $7^{th}$ coded symbols from the coded symbols of length 32, and outputs 24 coded symbols.

Second, a description will be made of a case where the encoder serves as the (24,6) encoder. A 6-bit rate indicator of a0, a1, a2, a3, a4 and a5 is applied to the encoder, and the remaining rate indicator bit a6 applied to the encoder is initialized to 0. The Walsh code generator 1100 then generates Walsh codes W1, W2, W4, W8 and W16 of length 32. The Walsh codes W1, W2, W4, W8 and W16 generated by the Walsh code generator 1100 are provided to the associated multipliers, respectively. To be specific, the Walsh code W1 is provided to the multiplier 1120, the Walsh code W2 to the multiplier 1122, the Walsh code W4 to the multiplier 1124, the Walsh code W8 to the multiplier 1126, and the Walsh code W16 to the multiplier 1128. Shown in Table 27 are the Walsh codes of length 32 generated by the Walsh code generator 1100.

TABLE 27

| Walsh Number | Walsh Code |
|---|---|
| W1 | 0101 0101 0101 0101 0101 0101 0101 0101 |
| W2 | 0011 0011 0011 0011 0011 0011 0011 0011 |
| W4 | 0000 1111 0000 1111 0000 1111 0000 1111 |
| W8 | 0000 0000 1111 1111 0000 0000 1111 1111 |
| W16 | 0000 0000 0000 0000 1111 1111 1111 1111 |

At the same time, the mask generator 1105 generates a mask M1=0111 0111 0010 0100 0110 0000 0000 0000, and provides the generated mask M1 to the multiplier 1130.

Meanwhile, the 6 input information bits of the rate indicator are provided to the associated multipliers, respectively. Shown in Table 28 are the relations between the 6 input information bits and the associated multipliers.

TABLE 28

| Input Information Bit | Multiplier |
|---|---|
| a0 | Multiplier 1120 |
| a1 | Multiplier 1122 |
| a2 | Multiplier 1124 |
| a3 | Multiplier 1126 |
| a4 | Multiplier 1128 |
| a5 | Multiplier 1130 |

Therefore, shown in Table 29 are the input information bits and the Walsh codes or mask provided to the respective multipliers.

TABLE 29

| Multiplier | Walsh Code/Mask | Input Information Bit |
|---|---|---|
| Multiplier 1120 | W1 = 0101 0101 0101 0101 0101 0101 0101 0101 | a0 |
| Multiplier 1122 | W2 = 0011 0011 0011 0011 0011 0011 0011 0011 | a1 |
| Multiplier 1124 | W4 = 0000 1111 0000 1111 0000 1111 0000 1111 | a2 |
| Multiplier 1126 | W8 = 0000 0000 1111 1111 0000 0000 1111 1111 | a3 |
| Multiplier 1128 | W16 = 0000 0000 0000 0000 1111 1111 1111 1111 | a4 |
| Multiplier 1130 | M1 = 0111 0111 0010 0100 0110 0000 0000 0000 | a5 |

The multipliers multiply the input information bits by the Walsh codes or mask, provided thereto as shown in Table 29, and provide their outputs to the XOR operator 1140. Specifically, the multiplier 1120 multiplies the input information bit a0 by the Walsh code W1 every symbol, and provides its output to the XOR operator 1140. The multiplier 1122 multiplies the input information bit a1 by the Walsh code W2 every symbol, and provides its output to the XOR operator

1140. The multiplier 1124 multiplies the input information bit a2 by the Walsh code W4 every symbol, and provides its output to the XOR operator 1140. The multiplier 1126 multiplies the input information bit a3 by the Walsh code W8 every symbol, and provides its output to the XOR operator 1140. The multiplier 1128 multiplies the input information bit a4 by the Walsh code W16 every symbol, and provides its output to the XOR operator 1140. The multiplier 1130 multiplies the input information bit a5 by the mask M1 every symbol, and provides its output to the XOR operator 1140.

Meanwhile, since the input information bit a6 applied to the multiplier 1132 is initialized to 0, an output of the multiplier 1132 does not affect the output of the XOR operator 1140 regardless of the mask M2 from the mask generator 1105. That is, the multiplier 1132 outputs a symbol stream comprised of coded symbols all having a value '0' regardless of symbol values of the symbol stream from the mask generator 1105. Therefore, the output of the multiplier 1132 does not affect the output of the XOR operator 1140. Initializing the input information bit a6 to 0 is equivalent to a switching operation for cutting off the output of the multiplier 1132.

The XOR operator 1140 then XORs the symbol streams of length 32 output from the multipliers 1120, 1122, 1124, 1126, 1128, 1130 and 1132 in a symbol unit, and provides its output to the puncturer 1160.

The coded symbol stream Ws of length 32, output from the XOR operator 1140, is then defined as $$Ws = (W1 \times a0) + (W2 \times a1) + (W4 \times a2) + (W8 \times a3) + (W16 \times a4) + (M1 \times a5) + \quad \text{Equation 16}$$

At this moment, the controller 1110 provides the puncturer 1160 with a control signal instructing it to puncture symbols in the puncturing positions for the (24,6) code. The puncturer 1160 then receives 8 puncturing positions from the memory 1170, and punctures coded symbols in the 8 puncturing positions from the coded symbols of length 32 provided from the XOR operator 1140. That is, the puncturer 1160 punctures 8 symbols in the puncturing positions read from the memory 1170 among the coded symbols of length 32 provided from the XOR operator 1140. For example, when the puncturing positions from the memory 1170 are $0^{th}$, $4^{th}$, $8^{th}$, $12^{th}$, $16^{th}$, $20^{th}$, $24^{th}$ and $28^{th}$ symbol positions, the puncturer 1160 punctures $0^{th}$, $4^{th}$, $8^{th}$, $12^{th}$, $16^{th}$, $20^{th}$, $24^{th}$ and $28^{th}$ coded symbols from the coded symbols of length 32, and outputs 24 coded symbols.

Alternatively, however, the (24,6) encoder may puncture the $0^{th}$, $1^{st}$, $2^{nd}$, $3^{rd}$, $4^{th}$, $5^{th}$, $6^{th}$ and $7^{th}$ coded symbols from the coded symbol stream of length 32 in order to reduce hardware complexity. In this case, the mask generator 1105 generates a mask M1=0000 0000 1110 1000 1101 1000 1100 0000. For example, when the puncturing positions from the memory 1170 are $0^{th}$, $1^{st}$, $2^{nd}$, $3^{rd}$, $4^{th}$, $5^{th}$, $6^{th}$ and $7^{th}$ symbol positions, the puncturer 1160 punctures $0^{th}$, $1^{st}$, $2^{nd}$, $3^{rd}$, $4^{th}$, $5^{th}$, $6^{th}$ and $7^{th}$ coded symbols from the coded symbols of length 32, and outputs 24 coded symbols.

Third, a description will be made of a case where the encoder serves as the (24,5) encoder. A 5-bit rate indicator of a0, a1, a2, a3 and a4 is applied to the encoder, and the remaining rate indicator bits a5 and a6 applied to the encoder are initialized to 0. The Walsh code generator 1100 then generates Walsh codes W1, W2, W4, W8 and W16 of length 32. The Walsh codes W1, W2, W4, W8 and W16 generated by the Walsh code generator 1100 are provided to the associated multipliers, respectively. To be specific, the Walsh code W1 is provided to the multiplier 1120, the Walsh code W2 to the multiplier 1122, the Walsh code W4 to the multiplier 1124, the Walsh code W8 to the multiplier 1126, and the Walsh code W16 to the multiplier 1128. Shown in Table 30 are the Walsh codes of length 32 generated by the Walsh code generator 1100.

TABLE 30

| Walsh Number | Walsh Code |
| --- | --- |
| W1 | 0101 0101 0101 0101 0101 0101 0101 0101 |
| W2 | 0011 0011 0011 0011 0011 0011 0011 0011 |
| W4 | 0000 1111 0000 1111 0000 1111 0000 1111 |
| W8 | 0000 0000 1111 1111 0000 0000 1111 1111 |
| W16 | 0000 0000 0000 0000 1111 1111 1111 1111 |

Meanwhile, the 5 input information bits of the rate indicator are provided to the associated multipliers, respectively. Shown in Table 31 are the relations between the 5 input information bits and the associated multipliers.

TABLE 31

| Input Information Bit | Multiplier |
| --- | --- |
| a0 | Multiplier 1120 |
| a1 | Multiplier 1122 |
| a2 | Multiplier 1124 |
| a3 | Multiplier 1126 |
| a4 | Multiplier 1128 |

Therefore, shown in Table 32 are the input information bits and the Walsh codes provided to the respective multipliers.

TABLE 32

| Multiplier | Walsh Code/Mask | Input Information Bit |
| --- | --- | --- |
| Multiplier 1120 | W1 = 0101 0101 0101 0101 0101 0101 0101 0101 | a0 |
| Multiplier 1122 | W2 = 0011 0011 0011 0011 0011 0011 0011 0011 | a1 |
| Multiplier 1124 | W4 = 0000 1111 0000 1111 0000 1111 0000 1111 | a2 |
| Multiplier 1126 | W8 = 0000 0000 1111 1111 0000 0000 1111 1111 | a3 |
| Multiplier 1128 | W16 = 0000 0000 0000 0000 1111 1111 1111 1111 | a4 |

The multipliers multiply the input information bits by the Walsh codes, provided thereto as shown in Table 32, and provide their outputs to the XOR operator 1140. Specifically, the multiplier 1120 multiplies the input information bit a0 by the Walsh code W1 every symbol, and provides its output to the XOR operator 1140. The multiplier 1122 multiplies the input information bit a1 by the Walsh code W2 every symbol, and provides its output to the XOR operator 1140. The multiplier 1124 multiplies the input information bit a2 by the Walsh code W4 every symbol, and provides its output to the XOR operator 1140. The multiplier 1126 multiplies the input information bit a3 by the Walsh code W8 every symbol, and provides its output to the XOR operator 1140.

The multiplier 1128 multiplies the input information bit a4 by the Walsh code W16 every symbol, and provides its output to the XOR operator 1140.

Meanwhile, since the input information bits a5 and a6 applied to the multipliers 1130 and 1132 are initialized to 0, outputs of the multipliers 1130 and 1132 do not affect the output of the XOR operator 1140 regardless of the masks M1 and M2 from the mask generator 1105. That is, the multipliers 1130 and 1132 output symbol streams each comprised of coded symbols all having a value '0' regardless of symbol values of the symbol streams from the mask generator 1105. Therefore, the outputs of the multipliers 1130 and 1132 do not affect the output of the XOR operator 1140. Initializing the input information bits a5 and a6 to 0 is equivalent to a switching operation for cutting off the output of the multipliers 1130 and 1132.

The XOR operator 1140 then XORs the symbol streams of length 32 output from the multipliers 1120, 1122, 1124, 1126, 1128, 1130 and 1132 in a symbol unit, and provides its output to the puncturer 1160.

The coded symbol stream Ws of length 32, output from the XOR operator 1140, is then defined as $$Ws = (W1 \times a0) + (W2 \times a1) + (W4 \times a2) + (W8 \times a3) + (W16 \times a4)$$ Equation 17

At this moment, the controller 1110 provides the puncturer 1160 with a control signal instructing it to puncture symbols in the puncturing positions for the (24,5) code. The puncturer 1160 then receives 8 puncturing positions from the memory 1170, and punctures coded symbols in the 8 puncturing positions from the coded symbols of length 32 provided from the XOR operator 1140. That is, the puncturer 1160 punctures 8 symbols in the puncturing positions read from the memory 1170 among the coded symbols of length 32 provided from the XOR operator 1140. For example, when the puncturing positions from the memory 1170 are $0^{th}$, $4^{th}$, $8^{th}$, $12^{th}$, $16^{th}$, $20^{th}$, $24^{th}$ and $28^{th}$ symbol positions, the puncturer 1160 punctures $0^{th}$, $4^{th}$, $8^{th}$, $12^{th}$, $16^{th}$, $20^{th}$, $24^{th}$ and $28^{th}$ coded symbols from the coded symbols of length 32, and outputs 24 coded symbols.

Alternatively, however, the (24,5) encoder may puncture the $0^{th}$, $1^{st}$, $2^{nd}$, $3^{rd}$, $4^{th}$, $5^{th}$, $6^{th}$ and $7^{th}$ coded symbols from the coded symbol stream of length 32 in order to reduce hardware complexity. For example, when the puncturing positions from the memory 1170 are $0^{th}$, $1^{st}$, $2^{nd}$, $3^{rd}$, $4^{th}$, $5^{th}$, $6^{th}$ and $7^{th}$ symbol positions, the puncturer 1160 punctures $0^{th}$, $1^{st}$, $2^{nd}$, $3^{rd}$, $4^{th}$, $5^{th}$, $6^{th}$ and $7^{th}$ coded symbols from the coded symbols of length 32, and outputs 24 coded symbols.

Fourth, a description will be made of a case where the encoder serves as the (24,4) encoder. A 4-bit rate indicator of a0, a1, a2 and a3 is applied to the encoder, and the remaining rate indicator bits a4, a5 and a6 applied to the encoder are initialized to 0. The Walsh code generator 1100 then generates Walsh codes W1, W2, W4 and W8 of length 32. The Walsh codes W1, W2, W4 and W16 generated by the Walsh code generator 1100 are provided to the associated multipliers, respectively. To be specific, the Walsh code W1 is provided to the multiplier 1120, the Walsh code W2 to the multiplier 1122, the Walsh code W4 to the multiplier 1124, and the Walsh code W8 to the multiplier 1126. Shown in Table 33 are the Walsh codes of length 32 generated by the Walsh code generator 1100.

TABLE 33

| Walsh Number | Walsh Code |
|---|---|
| W1 | 0101 0101 0101 0101 0101 0101 0101 0101 |
| W2 | 0011 0011 0011 0011 0011 0011 0011 0011 |
| W4 | 0000 1111 0000 1111 0000 1111 0000 1111 |
| W8 | 0000 0000 1111 1111 0000 0000 1111 1111 |

Meanwhile, the 4 input information bits of the rate indicator are provided to the associated multipliers, respectively. Shown in Table 34 are the relations between the 4 input information bits and the associated multipliers.

TABLE 34

| Input Information Bit | Multiplier |
|---|---|
| a0 | Multiplier 1120 |
| a1 | Multiplier 1122 |
| a2 | Multiplier 1124 |
| a3 | Multiplier 1126 |

Therefore, shown in Table 35 are the input information bits and the Walsh codes provided to the respective multipliers.

TABLE 35

| Multiplier | Walsh Code/Mask | Input Information Bit |
|---|---|---|
| Multiplier 1120 | W1 = 0101 0101 0101 0101 0101 0101 0101 0101 | a0 |
| Multiplier 1122 | W2 = 0011 0011 0011 0011 0011 0011 0011 0011 | a1 |
| Multiplier 1124 | W4 = 0000 1111 0000 1111 0000 1111 0000 1111 | a2 |
| Multiplier 1126 | W8 = 0000 0000 1111 1111 0000 0000 1111 1111 | a3 |

The multipliers multiply the input information bits by the Walsh codes, provided thereto as-shown in Table 35, and provide their outputs to the XOR operator 1140. Specifically, the multiplier 1120 multiplies the input information bit a0 by the Walsh code W1 every symbol, and provides its output to the XOR operator 1140. The multiplier 1122 multiplies the input information bit a1 by the Walsh code W2 every symbol, and provides its output to the XOR operator 1140. The multiplier 1124 multiplies the input information bit a2 by the Walsh code W4 every symbol, and provides its output to the XOR operator 1140. The multiplier 1126 multiplies the input information bit a3 by the Walsh code W8 every symbol, and provides its output to the XOR operator 1140.

Meanwhile, since the input information bits a4, a5 and a6 applied to the multiplier 1128, 1130 and 1132 are initialized to 0, outputs of the multipliers 1128, 1130 and 1132 do not affect the output of the XOR operator 1140 regardless of the Walsh code W16 from the Walsh code generator 1100 and the masks M1 and M2 from the mask generator 1105. That is, the multipliers 1128, 1130 and 1132 output symbol streams each comprised of coded symbols all having a value '0' regardless of symbol values of the symbol streams from the Walsh code generator 1100 and the mask generator 1105. Therefore, the outputs of the multipliers 1128, 1130 and 1132 do not affect the output of the XOR operator 1140. Initializing the input information bits a4, a5 and a6 to 0 is equivalent to a switching operation for cutting off the output of the multipliers 1128, 1130 and 1132.

The XOR operator 1140 then XORs the symbol streams of length 32 output from the multipliers 1120, 1122, 1124, 1126, 1128, 1130 and 1132 in a symbol unit, and provides its output to the puncturer 1160.

The coded symbol stream Ws of length 32, output from the XOR operator 1140, is then defined as

TABLE 37

| Input Information Bit | Multiplier |
|---|---|
| a0 | Multiplier 1120 |
| a1 | Multiplier 1122 |
| a2 | Multiplier 1124 |

Therefore, shown in Table 38 are the input information bits and the Walsh codes provided to the respective multipliers.

TABLE 38

| Multiplier | Walsh Code/Mask | Input Information Bit |
|---|---|---|
| Multiplier 1120 | W1 = 0101 0101 0101 0101 0101 0101 0101 0101 | a0 |
| Multiplier 1122 | W2 = 0011 0011 0011 0011 0011 0011 0011 0011 | a1 |
| Multiplier 1124 | W4 = 0000 1111 0000 1111 0000 1111 0000 1111 | a2 |

$$Ws=(W1 \times a0)+(W2 \times a1)+(W4 \times a2)+(W8 \times a3) \quad \text{Equation 18}$$

At this moment, the controller 1110 provides the puncturer 1160 with a control signal instructing it to puncture symbols in the puncturing positions for the (24,4) code. The puncturer 1160 then receives 8 puncturing positions corresponding to the 4 input information bits from the memory 1170, and punctures coded symbols in the 8 puncturing positions from the coded symbols of length 32 provided from the XOR operator 1140. That is, the puncturer 1160 punctures 8 symbols in the puncturing positions read from the memory 1170 among the coded symbols of length 32 provided from the XOR operator 1140. For example, when the puncturing positions from the memory 1170 are $0^{th}$, $1^{st}$, $2^{nd}$, $3^{rd}$, $4^{th}$, $5^{th}$, $6^{th}$ and $16^{th}$ symbol positions, the puncturer 1160 punctures $0^{th}$, $1^{st}$, $2^{nd}$, $3^{rd}$, $4^{th}$, $5^{th}$, $6^{th}$ and $16^{th}$ coded symbols from the coded symbols of length 32, and outputs 24 coded symbols.

Fifth, a description will be made of a case where the encoder serves as the (24,3) encoder. A 3-bit rate indicator of a0, a1 and a2 is applied to the encoder, and the remaining rate indicator bits a3, a4, a5 and a6 applied to the encoder are initialized to 0. The Walsh code generator 1100 then generates Walsh codes W1, W2 and W4 of length 32. The Walsh codes W1, W2 and W4 generated by the Walsh code generator 1100 are provided to the associated multipliers, respectively. To be specific, the Walsh code W1 is provided to the multiplier 1120, the Walsh code W2 to the multiplier 1122, and the Walsh code W4 to the multiplier 1124. Shown in Table 36 are the Walsh codes of length 32 generated by the Walsh code generator 1100.

TABLE 36

| Walsh Number | Walsh Code |
|---|---|
| W1 | 0101 0101 0101 0101 0101 0101 0101 0101 |
| W2 | 0011 0011 0011 0011 0011 0011 0011 0011 |
| W4 | 0000 1111 0000 1111 0000 1111 0000 1111 |

Meanwhile, the 3 input information bits of the rate indicator are provided to the associated multipliers, respectively. Shown in Table 37 are the relations between the 3 input information bits and the associated multipliers.

The multipliers multiply the input information bits by the Walsh codes, provided thereto as shown in Table 38, and provide their outputs to the XOR operator 1140. Specifically, the multiplier 1120 multiplies the input information bit a0 by the Walsh code W1 every symbol, and provides its output to the XOR operator 1140. The multiplier 1122 multiplies the input information bit a1 by the Walsh code W2 every symbol, and provides its output to the XOR operator 1140. The multiplier 1124 multiplies the input information bit a2 by the Walsh code W4 every symbol, and provides its output to the XOR operator 1140.

Meanwhile, since the input information bits a3, a4, a5 and a6 applied to the multiplier 1126, 1128, 1130 and 1132 are initialized to 0, outputs of the multipliers 1126, 1128, 1130 and 1132 do not affect the output of the XOR operator 1140 regardless of the Walsh codes W8 and W16 from the Walsh code generator 1100 and the masks M1 and M2 from the mask generator 1105. That is, the multipliers 1126, 1128, 1130 and 1132 output symbol streams each comprised of coded symbols all having a value '0' regardless of symbol values of the symbol streams from the Walsh code generator 1100 and the mask generator 1105. Therefore, the outputs of the multipliers 1126, 1128, 1130 and 1132 do not affect the output of the XOR operator 1140. Initializing the input information bits a3, a4, a5 and a6 to 0 is equivalent to a switching operation for cutting off the output of the multipliers 1126, 1128, 1130 and 1132.

The XOR operator 1140 then XORs the symbol streams of length 32 output from the multipliers 1120, 1122, 1124, 1126, 1128, 1130 and 1132 in a symbol unit, and provides its output to the puncturer 1160.

The coded symbol stream Ws of length 32, output from the XOR operator 1140, is then defined as $$Ws=(W1 \times a0)+(W2 \times a1)+(W4 \times a2) \quad \text{Equation 19}$$

At this moment, the controller 1110 provides the puncturer 1160 with a control signal instructing it to puncture symbols in the puncturing positions for the (24,3) code. The puncturer 1160 then receives 8 puncturing positions from the memory 1170, and punctures coded symbols in the 8 puncturing positions from the coded symbols of length 32 provided from the XOR operator 1140. That is, the puncturer 1160 punctures 8 symbols in the puncturing positions read from the memory 1170 among the coded symbols of length 32 provided from the XOR operator 1140. For example, when the puncturing positions from the memory 1170 are $0^{th}$, $3^{rd}$, $5^{th}$, $6^{th}$, $7^{th}$, $8^{th}$, $16^{th}$ and $24^{th}$ symbol positions, the puncturer 1160 punctures $0^{th}$, $3^{rd}$, $5^{th}$, $6^{th}$, $7^{th}$, $8^{th}$, $16^{th}$ and $24^{th}$ coded symbols from the coded symbols of length 32, and outputs 24 coded symbols.

Sixth, a description will be made of a case where the encoder serves as the (24,2) encoder. A 2-bit rate indicator of a0 and a1 is applied to the encoder, and the remaining rate indicator bits a2, a3, a4, a5 and a6 applied to the encoder are initialized to 0. The Walsh code generator 1100 then generates Walsh codes W1 and W2 of length 32. The Walsh codes W1 and W2 generated by the Walsh code generator 1100 are provided to the associated multipliers, respectively. To be specific, the Walsh code W1 is provided to the multiplier 1120, and the Walsh code W2 to the multiplier 1122. Shown in Table 39 are the Walsh codes of length 32 generated by the Walsh code generator 1100.

TABLE 39

| Walsh Number | Walsh Code |
| --- | --- |
| W1 | 0101 0101 0101 0101 0101 0101 0101 0101 |
| W2 | 0011 0011 0011 0011 0011 0011 0011 0011 |

Meanwhile, the 2 input information bits of the rate indicator are provided to the associated multipliers, respectively. Shown in Table 40 are the relations between the 2 input information bits and the associated multipliers.

TABLE 40

| Input Information Bit | Multiplier |
| --- | --- |
| a0 | Multiplier 1120 |
| a1 | Multiplier 1122 |

Therefore, shown in Table 41 are the input information bits and the Walsh codes provided to the respective multipliers.

TABLE 41

| Multiplier | Walsh Code/Mask | Input Information Bit |
| --- | --- | --- |
| Multiplier 1120 | W1 = 0101 0101 0101 0101 0101 0101 0101 0101 | a0 |
| Multiplier 1122 | W2 = 0011 0011 0011 0011 0011 0011 0011 0011 | a1 |

The multipliers multiply the input information bits by the Walsh codes, provided thereto as shown in Table 41, and provide their outputs to the XOR operator 1140. Specifically, the multiplier 1120 multiplies the input information bit a0 by the Walsh code W1 every symbol, and provides its output to the XOR operator 1140. The multiplier 1122 multiplies the input information bit a1 by the Walsh code W2 every symbol, and provides its output to the XOR operator 1140.

Meanwhile, since the input information bits a2, a3, a4, a5 and a6 applied to the multiplier 1124, 1126, 1128, 1130 and 1132 are initialized to 0, outputs of the multipliers 1124, 1126, 1128, 1130 and 1132 do not affect the output of the XOR operator 1140 regardless of the Walsh codes W4, W8 and W16 from the Walsh code generator 1100 and the masks M1 and M2 from the mask generator 1105. That is, the multipliers 1124, 1126, 1128, 1130 and 1132 output symbol streams each comprised of coded symbols all having a value '0' regardless of symbol values of the symbol streams from the Walsh code generator 1100 and the mask generator 1105. Therefore, the outputs of the multipliers 1124, 1126, 1128, 1130 and 1132 do not affect the output of the XOR operator 1140. Initializing the input information bits a2, a3, a4, a5 and a6 to 0 is equivalent to a switching operation for cutting off the output of the multipliers 1124, 1126, 1128, 1130 and 1132.

The XOR operator 1140 then XORs the symbol streams of length 32 output from the multipliers 1120, 1122, 1124, 1126, 1128, 1130 and 1132 in a symbol unit, and provides its output to the puncturer 1160.

The coded symbol stream Ws of length 32, output from the XOR operator 1140, is then defined as $$Ws=(W1 \times a0)+(W2 \times a1) \qquad \text{Equation 20}$$

At this moment, the controller 1110 provides the puncturer 1160 with a control signal instructing it to puncture symbols in the puncturing positions for the (24,2) code. The puncturer 1160 then receives 8 puncturing positions from the memory 1170, and punctures coded symbols in the 8 puncturing positions from the coded symbols of length 32 provided from the XOR operator 1140. That is, the puncturer 1160 punctures 8 symbols in the puncturing positions read from the memory 1170 among the coded symbols of length 32 provided from the XOR operator 1140. For example, when the puncturing positions from the memory 1170 are $0^{th}$, $4^{th}$, $8^{th}$, $12^{th}$, $16^{th}$, $20^{th}$, $24^{th}$ and $28^{th}$ symbol positions, the puncturer 1160 punctures $0^{th}$, $4^{th}$, $8^{th}$, $12^{th}$, $16^{th}$, $20^{th}$, $24^{th}$ and $28^{th}$ coded symbols from the coded symbols of length 32, and outputs 24 coded symbols.

Seventh, a description will be made of a case where the encoder serves as the (24,1) encoder. A 1-bit rate indicator of a0 is applied to the encoder, and the remaining rate indicator bits a1, a2, a3, a4, a5 and a6 applied to the encoder are initialized to 0. The Walsh code generator 1100 then generates a Walsh code W1 of length 32. The Walsh code W1 generated by the Walsh code generator 1100 is provided to the associated multiplier. To be specific, the Walsh code W1 is provided to the multiplier 1120. Shown in Table 42 is the Walsh code of length 32 generated by the Walsh code generator 1100.

TABLE 42

| Walsh Number | Walsh Code |
| --- | --- |
| W1 | 0101 0101 0101 0101 0101 0101 0101 0101 |

Meanwhile, the 1 input information bit of the rate indicator is provided to the associated multiplier. Shown in Table 43 is the relation between the 1 input information bit and the associated multiplier.

TABLE 43

| Input Information Bit | Multiplier |
| --- | --- |
| a0 | Multiplier 1120 |

Therefore, shown in Table 44 are the input information bit and the Walsh code provided to the multiplier.

TABLE 44

| Multiplier | Walsh Code/Mask | Input Information Bit |
|---|---|---|
| Multiplier 1120 | W1 = 0101 0101 0101 0101 0101 0101 0101 0101 | a0 |

The multiplier multiplies the input information bit by the Walsh code, provided thereto as shown in Table 44, and provides its output to the XOR operator 1140. Specifically, the multiplier 1120 multiplies the input information bit a0 by the Walsh code W1 every symbol, and provides its output to the XOR operator 1140.

Meanwhile, since the input information bits a1, a2, a3, a4, a5 and a6 applied to the multiplier 1122, 1124, 1126, 1128, 1130 and 1132 are initialized to 0, outputs of the multipliers 1122, 1124, 1126, 1128, 1130 and 1132 do not affect the output of the XOR operator 1140 regardless of the Walsh codes W2, W4, W8 and W16 from the Walsh code generator 1100 and the masks M1 and M2 from the mask generator 1105. That is, the multipliers 1122, 1124, 1126, 1128, 1130 and 1132 output symbol streams each comprised of coded symbols all having a value '0' regardless of symbol values of the symbol streams from the Walsh code generator 1100 and the mask generator 1105. Therefore, the outputs of the multipliers 1122, 1124, 1126, 1128, 1130 and 1132 do not affect the output of the XOR operator 1140. Initializing the input information bits a1, a2, a3, a4, a5 and a6 to 0 is equivalent to a switching operation for cutting off the output of the multipliers 1122, 1124, 1126, 1128, 1130 and 1132.

The XOR operator 1140 then XORs the symbol streams of length 32 output from the multipliers 1120, 1122, 1124, 1126, 1128, 1130 and 1132 in a symbol unit, and provides its output to the puncturer 1160.

The coded symbol stream Ws of length 32, output from the XOR operator 1140, is then defined as $$Ws = (W1 \times a0)$$ Equation 21

At this moment, the controller 1110 provides the puncturer 1160 with a control signal instructing it to puncture symbols in the puncturing positions for the (24,1) code. The puncturer 1160 then receives 8 puncturing positions from the memory 1170, and punctures coded symbols in the 8 puncturing positions from the coded symbols of length 32 provided from the XOR operator 1140. That is, the puncturer 1160 punctures 8 symbols in the puncturing positions read from the memory 1170 among the coded symbols of length 32 provided from the XOR operator 1140. For example, when the puncturing positions from the memory 1170 are $1^{st}$, $3^{rd}$, $5^{th}$, $7^{th}$, $9^{th}$, $11^{th}$, $13^{th}$ and $15^{th}$ symbol positions, the puncturer 1160 punctures $1^{th}$, $3^{rd}$, $5^{th}$, $7^{th}$, $9^{th}$, $11^{th}$, $13^{th}$ and $15^{th}$ coded symbols from the coded symbols of length 32, and outputs 24 coded symbols.

As described above, the present invention not only implements a rate indicator encoding apparatus and method having optimal performance with minimized complexity, but also uses an optimal codeword by utilizing an apparatus and method of puncturing an extended first order Reed-Muller code. Further, the present invention utilizes an apparatus and method of puncturing an extended first order Reed-Muller code, so that an inverse fast Hadamard transform is used in a decoding process, thereby making it possible to minimize hardware complexity and generate an optimal code in terms of error correcting performance.

Finally, the present invention supports all of the (24,1) encoder to the (24,7) encoder, thus securing efficient encoding.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An encoding method in a mobile communications system, for receiving 1 to 7 input information bits and outputting a coded symbol stream having 24 coded symbols depending on the input information bits, comprising the steps of:
    (a) encoding each of the input information bits with Walsh codes W1, W2, W4, W8 and W16 and masks M1 and M2 all having a predetermined length, and outputting a coded symbol stream having a predetermined number of coded symbols;
    (b) predetermining a plurality of sets of puncturing positions, each set corresponding to one of the each of possible number of the input information bits, and determining puncturing positions corresponding to the input information bits from the previously determined set of the puncturing positions; and
    (c) puncturing coded symbols in the determined puncturing positions from the coded symbol stream having the predetermined number of coded symbols, and outputting the coded symbol stream having 24 coded symbols.

2. The encoding method as claimed in claim 1, wherein the step (a) comprises the steps of:
    determining a length of the Walsh codes W1, W2, W4, W8 and W16 and the masks M1 and M2 depending on the input information bits, and outputting Walsh codes and masks corresponding to the input information bits selected in order among the Walsh codes W1, W2, W4, W8 and W16 and the masks M1 and M2;
    encoding the input information bits with the corresponding Walsh codes and masks, and outputting as many coded symbol streams as the input information bits;
    XORing the coded symbol streams to obtain one coded symbol stream; and
    repeating the one coded symbol stream a predetermined number of times, and outputting the coded symbol stream having the predetermined number of coded symbols.

3. The encoding method as claimed in claim 2, wherein when the number of the input information bits is 1, one Walsh code W1 of length 2 corresponding to the 1 input information bit is output.

4. The encoding method as claimed in claim 3, wherein when the number of the input information bits is 1, the input information bit is encoded with the Walsh code W1 of length 2 to output a coded symbol stream, and the coded symbol stream is repeated 32 times thus to output a coded symbol stream having 64 coded symbols.

5. The encoding method as claimed in claim 4, wherein when the number of the input information bits is 1, all of even-numbered symbol positions and $1^{st}$, $3^{rd}$, $5^{th}$, $7^{th}$, $9^{th}$, $11^{th}$, $13^{th}$ and $15^{th}$ symbol positions are determined as puncturing positions.

6. The encoding method as claimed in claim 2, wherein when the number of the input information bits is 2, two Walsh codes W1 and W2 of length 4 corresponding to the 2 input information bits are output.

7. The encoding method as claimed in claim 6, wherein when the number of the input information bits is 2, the input information bits are encoded with the 2 Walsh codes W1 and W2 of length 4 to output 2 coded symbol streams, and one coded symbol stream obtained by XORing the 2 coded symbol streams output is repeated 8 times to output a coded symbol stream having 32 coded symbols.

8. The encoding method as claimed in claim 7, wherein when the number of the input information bits is 2, then $0^{th}$, $4^{th}$, $8^{th}$, $12^{th}$, $16^{th}$, $20^{th}$, $24^{th}$ and $28^{th}$ symbol positions are determined as puncturing positions.

9. The encoding method as claimed in claim 2, wherein when the number of the input information bits is 3, three Walsh codes W1, W2 and W4 of length 8 corresponding to the 3 input information bits are output.

10. The encoding method as claimed in claim 9, wherein when the number of the input information bits is 3, the input information bits are encoded with the 3 Walsh codes W1, W2 and W4 of length 8 to output 3 coded symbol streams, and one coded symbol stream obtained by XORing the 3 coded symbol streams is repeated 4 times to output a coded symbol stream having 32 coded symbols.

11. The encoding method as claimed in claim 10, wherein when the number of the input information bits is 3, then $0^{th}$, $3^{rd}$, $5^{th}$, $6^{th}$, $7^{th}$, $8^{th}$, $16^{th}$ and $24^{th}$ symbol positions are determined as puncturing positions.

12. The encoding method as claimed in claim 2, wherein when the number of the input information bits is 4, four Walsh codes W1, W2, W4 and W8 of length 16 corresponding to the 4 input information bits are output.

13. The encoding method as claimed in claim 12, wherein when the number of the input information bits is 4, the input information bits are encoded with the 4 Walsh codes W1, W2, W4 and W8 of length 16 to output 4 coded symbol streams, and one coded symbol stream obtained by XORing the 4 coded symbol streams is repeated 2 times to output a coded symbol stream having 32 coded symbols.

14. The encoding method as claimed in claim 13, wherein when the number of the input information bits is 4, then $0^{th}$, $1^{st}$, $2^{nd}$, $3^{rd}$, $4^{th}$, $5^{th}$, $6^{th}$ and $16^{th}$ symbol positions are determined as puncturing positions.

15. The encoding method as claimed in claim 2, wherein when the number of the input information bits is 5, all of the Walsh codes W1, W2, W4, W8 and W16 of length 32 are output.

16. The encoding method as claimed in claim 15, wherein when the number of the input information bits is 5, the input information bits are encoded with the 5 Walsh codes W1, W2, W4, W8 and W16 of length 32 to output 5 coded symbol streams, and the 5 coded symbol streams are XORed to output one coded symbol stream.

17. The encoding method as claimed in claim 16, wherein when the number of the input information bits is 5, then $0^{th}$, $4^{th}$, $8^{th}$, $12^{th}$, $16^{th}$, $20^{th}$, $24^{th}$ and $28^{th}$ symbol positions are determined as puncturing positions.

18. The encoding method as claimed in claim 16, wherein when the number of the input information bits is 5, then $0^{th}$, $1^{st}$, $2^{nd}$, $3^{rd}$, $4^{th}$, $5^{th}$, $6^{th}$ and $7^{th}$ symbol positions are determined as puncturing positions.

19. The encoding method as claimed in claim 2, wherein when the number of the input information bits is 6, all of the Walsh codes W1, W2, W4, W8 and W16 of length 32 and one mask M1 of length 32 are output.

20. The encoding method as claimed in claim 19, wherein when the number of the input information bits is 6, the input information bits are encoded with the 5 Walsh codes W1, W2, W4, W8 and W16 of length 32 and the mask M1 of length 32 to output 6 coded symbol streams, and the 6 coded symbol streams are XORed to output one coded symbol stream.

21. The encoding method as claimed in claim 20, wherein when the number of the input information bits is 6, then the mask M1 is 0000 0000 1110 1000 1101 1000 1100 0000 and $0^{th}$, $4^{th}$, $8^{th}$, $12^{th}$, $16^{th}$, $20^{th}$, $24^{th}$ and $28^{th}$ symbol positions are determined as puncturing positions.

22. The encoding method as claimed in claim 20, wherein when the number of the input information bits is 6, then the mask M1 is 0000 0000 1110 1000 1101 1000 1100 0000 and $0^{th}$, $1^{st}$, $2^{nd}$, $3^{rd}$, $4^{th}$, $5^{th}$, $6^{th}$ and $7^{th}$ symbol positions are determined as puncturing positions.

23. The encoding method as claimed in claim 2, wherein when the number of the input information bits is 7, all of the Walsh codes W1, W2, W4, W8 and W16 of length 32 and two masks M1 and M2 of length 32 are output.

24. The encoding method as claimed in claim 23, wherein when the number of the input information bits is 7, the input information bits are encoded with the 5 Walsh codes W1, W2, W4, W8 and W16 of length 32 and the 2 masks M1 and M2 of length 32 to output 7 coded symbol streams, and the 7 coded symbol streams are XORed to output one coded symbol stream.

25. The encoding method as claimed in claim 24, wherein when the number of the input information bits is 7, then the mask M1 is 0111 0111 0010 0100 0110 0000 0000 0000, the mask M2 is 0010 0110 0101 0100 0101 0100 0100 0000, and $0^{th}$, $4^{th}$, $8^{th}$, $12^{th}$, $16^{th}$, $20^{th}$, $24^{th}$ and $28^{th}$ symbol positions are determined as puncturing positions.

26. The encoding method as claimed in claim 24, wherein when the number of the input information bits is 7, then the mask M1 is 0111 0111 0010 0100 0110 0000 0000 0000, the mask M2 is 0010 0110 0101 0100 0101 0100 0100 0000, and $0^{th}$, $1^{st}$, $2^{nd}$, $3^{rd}$, $4^{th}$, $5^{th}$, $6^{th}$ and $7^{th}$ symbol positions are determined as puncturing positions.

27. The encoding method as claimed in claim 1, wherein the Walsh codes W1, W2, W4, W8 and W16 and the masks M1 and M2 all have a predetermined length of 32.

28. The encoding method as claimed in claim 27, wherein coded symbol streams determined by encoding the input information bits with the corresponding Walsh codes W1, W2, W4, W8 and W16 or the masks M1 and M2 are XORed to output one coded symbol stream, and the puncturing positions depending on the number of the input information bits are as follows.

| No of Input Info Bits | Puncturing Positions |
|---|---|
| 1 | $1^{st}$, $3^{rd}$, $5^{th}$, $7^{th}$, $9^{th}$, $11^{th}$, $13^{th}$ and $15^{th}$ symbol positions |
| 2 | $0^{th}$, $4^{th}$, $8^{th}$, $12^{th}$, $16^{th}$, $20^{th}$, $24^{th}$ and $28^{th}$ symbol positions |
| 3 | $0^{th}$, $3^{rd}$, $5^{th}$, $6^{th}$, $7^{th}$, $8^{th}$, $16^{th}$ and $24^{th}$ symbol positions |
| 4 | $0^{th}$, $1^{st}$, $2^{nd}$, $3^{rd}$, $4^{th}$, $5^{th}$, $6^{th}$ and $16^{th}$ symbol positions |
| 5 | $0^{th}$, $1^{st}$, $2^{nd}$, $3^{rd}$, $4^{th}$, $5^{th}$, $6^{th}$ and $7^{th}$ symbol positions |
| 6 | $0^{th}$, $1^{st}$, $2^{nd}$, $3^{rd}$, $4^{th}$, $5^{th}$, $6^{th}$ and $7^{th}$ symbol positions |
| 7 | $0^{th}$, $1^{st}$, $2^{nd}$, $3^{rd}$, $4^{th}$, $5^{th}$, $6^{th}$ and $7^{th}$ symbol positions |

29. The encoding method as claimed in claim 27, wherein coded symbol streams determined by encoding the input information bits with the corresponding Walsh codes W1, W2, W4, W8 and W16 or the masks M1 and M2 are XORed to output one coded symbol stream, and the puncturing positions depending on the number of the input information bits are as follows.

| No of Input Info Bits | Puncturing Positions |
|---|---|
| 1 | $1^{st}$, $3^{rd}$, $5^{th}$, $7^{th}$, $9^{th}$, $11^{th}$, $13^{th}$ and $15^{th}$ symbol positions |
| 2 | $0^{th}$, $4^{th}$, $8^{th}$, $12^{th}$, $16^{th}$, $20^{th}$, $24^{th}$ and $28^{th}$ symbol positions |
| 3 | $0^{th}$, $3^{rd}$, $5^{th}$, $6^{th}$, $7^{th}$, $8^{th}$, $16^{th}$ and $24^{th}$ symbol positions |
| 4 | $0^{th}$, $1^{st}$, $2^{nd}$, $3^{rd}$, $4^{th}$, $5^{th}$, $6^{th}$ and $16^{th}$ symbol positions |
| 5 | $0^{th}$, $4^{th}$, $8^{th}$, $12^{th}$, $16^{th}$, $20^{th}$, $24^{th}$ and $28^{th}$ symbol positions |
| 6 | $0^{th}$, $4^{th}$, $8^{th}$, $12^{th}$, $16^{th}$, $20^{th}$, $24^{th}$ and $28^{th}$ symbol positions |
| 7 | $0^{th}$, $4^{th}$, $8^{th}$, $12^{th}$, $16^{th}$, $20^{th}$, $24^{th}$ and $28^{th}$ symbol positions |

30. The encoding method as claimed in claim 27, wherein the masks M1 and M2 generated for 7 input information bits are 0111 0111 0010 0100 0110 0000 0000 0000 and 0010 0110 0101 0100 0101 0100 0100 0000, respectively.

31. The encoding method as claimed in claim 27, wherein the mask M1 generated for 6 input information bits is 0111 0111 0010 0100 0110 0000 0000 0000.

32. An encoding apparatus in a mobile communication system, for receiving 1 to 7 input information bits and outputting a coded symbol stream having 24 coded symbols depending on the input information bits, comprising:
  a Walsh code generator for generating 5 different Walsh codes W1, W2, W4, W8 and W16 having a predetermined length;
  a mask generator for generating 2 different masks M1 and M2;
  a plurality of multipliers for multiplying the input information bits by a corresponding one selected from the Walsh codes W1, W2, W4, W8 and W16 and the masks M1 and M2 on a one-to-one basis and outputting a predetermined number of coded symbol streams;
  an XOR operator for XORing the coded symbol streams output from the multipliers and outputting one coded symbol stream; and
  a puncturer for determining puncturing positions corresponding to the input information bits, the puncturing positions selected for the input information bits from a plurality of sets of puncturing positions corresponding to each of the possible number of the input information bits, puncturing coded symbols in the determined puncturing positions from the coded symbol stream from the XOR operator, and outputting the coded symbol stream having 24 coded symbols.

33. The encoding apparatus as claimed in claim 32, further comprising a repeater for repeating the coded symbol stream from the XOR operator a predetermined number of times so that the coded symbol stream from the XOR operator has a desired number of coded symbols.

34. The encoding apparatus as claimed in claim 33, further comprising a controller for determining a length of the Walsh codes W1, W2, W4, W8 and W16 and the masks M1 and M2 depending on the number of the input information bits, controlling the Walsh code generator and the mask generator to output the Walsh codes and the masks corresponding to each of the numbers of the input information bits, and determining a repetition frequency of the repeater and the puncturing positions.

35. The encoding apparatus as claimed in claim 34, wherein when the number of the input information bits is 1, the controller controls the Walsh code generator to generate a Walsh code W1 of length 2 corresponding to the 1 input information bit, and controls the repeater to repeat the coded symbol stream from the XOR operator 32 times.

36. The encoding apparatus as claimed in claim 35, wherein the puncturer punctures all of even-numbered coded symbols and $1^{st}$, $3^{rd}$, $5^{th}$, $7^{th}$, $9^{th}$, $11^{th}$, $13^{th}$ and $15^{th}$ coded symbols among 64 coded symbols from the repeater under the control of the controller, and outputs the coded symbol stream of 24 coded symbols.

37. The encoding apparatus as claimed in claim 34, wherein when the number of the input information bits is 2, the controller controls the Walsh code generator to generate two Walsh codes W1 and W2 of length 4 corresponding to the 2 input information bits, and controls the repeater to repeat the coded symbol stream from the XOR operator 8 times.

38. The encoding apparatus as claimed in claim 37, wherein the puncturer punctures $0^{th}$, $4^{th}$, $8^{th}$, $12^{th}$, $16^{th}$, $20^{th}$, $24^{th}$ and $28^{th}$ coded symbols among 32 coded symbols from the repeater under the control of the controller, and outputs the coded symbol stream of 24 coded symbols.

39. The encoding apparatus as claimed in claim 34, wherein when the number of the input information bits is 3, the controller controls the Walsh code generator to generate 3 Walsh codes W1, W2 and W4 of length 8 corresponding to the 3 input information bits, and controls the repeater to repeat the coded symbol stream from the XOR operator 4 times.

40. The encoding apparatus as claimed in claim 39, wherein the puncturer punctures $0^{th}$, $3^{rd}$, $5^{th}$, $6^{th}$, $7^{th}$, $8^{th}$, $16^{th}$ and $24^{th}$ coded symbols among 32 coded symbols from the repeater under the control of the controller, and outputs the coded symbol stream of 24 coded symbols.

41. The encoding apparatus as claimed in claim 34, wherein when the number of the input information bits is 4, the controller controls the Walsh code generator to generate 4 Walsh codes W1, W2, W4 and W8 of length 16 corresponding to the 4 input information bits, and controls the repeater to repeat the coded symbol stream from the XOR operator 2 times.

42. The encoding apparatus as claimed in claim 41, wherein the puncturer punctures $0^{th}$, $1^{st}$, $2^{nd}$, $3^{rd}$, $4^{th}$, $5^{th}$, $6^{th}$ and $16^{th}$ coded symbols among 32 coded symbols from the repeater under the control of the controller, and outputs the coded symbol stream of 24 coded symbols.

43. The encoding apparatus as claimed in claim 34, wherein when the number of the input information bits is 5, the controller controls the Walsh code generator to generate all of the Walsh codes W1, W2, W4, W8 and W16 of length 32, and controls the repeater not to repeat the coded symbol stream from the XOR operator.

44. The encoding apparatus as claimed in claim 43, wherein the puncturer punctures $0^{th}$, $4^{th}$, $8^{th}$, $12^{th}$, $16^{th}$, $20^{th}$, $24^{th}$ and $28^{th}$ coded symbols among 32 coded symbols from the repeater under the control of the controller, and outputs the coded symbol stream of 24 coded symbols.

45. The encoding apparatus as claimed in claim 43, wherein the puncturer punctures $0^{th}$, $1^{st}$, $2^{nd}$, $3^{rd}$, $4^{th}$, $5^{th}$, $6^{th}$ and $7^{th}$ coded symbols among 32 coded symbols from the repeater under the control of the controller, and outputs the coded symbol stream of 24 coded symbols.

46. The encoding apparatus as claimed in claim 34, wherein when the number of the input information bits is 6, the controller controls the Walsh code generator to generate all of the Walsh codes W1, W2, W4, W8 and W16 of length 32, controls the mask generator to generate one mask M1 of length 32, and controls the repeater not to repeat the coded symbol stream from the XOR operator.

47. The encoding apparatus as claimed in claim 46, wherein the mask M1 generated by the mask generator is 0000 0000 1110 1000 1101 1000 1100 0000.

48. The encoding apparatus as claimed in claim 47, wherein the puncturer punctures $0^{th}$, $4^{th}$, $8^{th}$, $12^{th}$, $16^{th}$, $20^{th}$, $24^{th}$ and $28^{th}$ coded symbols among 32 coded symbols from the repeater under the control of the controller, and outputs the coded symbol stream of 24 coded symbols.

49. The encoding apparatus as claimed in claim 47, wherein the puncturer punctures $0^{th}$, $1^{st}$, $2^{nd}$, $3^{rd}$, $4^{th}$, $5^{th}$, $6^{th}$ and $7^{th}$ coded symbols among 32 coded symbols from the repeater under the control of the controller, and outputs the coded symbol stream of 24 coded symbols.

50. The encoding apparatus as claimed in claim 34, wherein when the number of the input information bits is 7, the controller controls the Walsh code generator to generate all of the Walsh codes W1, W2, W4, W8 and W16 of length 32, controls the mask generator to generate 2 masks M1 and M2 of length 32, and controls the repeater not to repeat the coded symbol stream from the XOR operator.

51. The encoding apparatus as claimed in claim 50, wherein the mask M1 generated by the mask generator is 0111 0111 0010 0100 0110 0000 0000 0000.

52. The encoding apparatus as claimed in claim 51, wherein the puncturer punctures $0^{th}$, $4^{th}$, $8^{th}$, $12^{th}$, $16^{th}$, $20^{th}$, $24^{th}$ and $28^{th}$ coded symbols among 32 coded symbols from the repeater under the control of the controller, and outputs the coded symbol stream of 24 coded symbols.

53. The encoding apparatus as claimed in claim 51, wherein the puncturer punctures $0^{th}$, $1^{st}$, $2^{nd}$, $3^{rd}$, $4^{th}$, $5^{th}$, $6^{th}$ and $7^{th}$ coded symbols among 32 coded symbols from the repeater under the control of the controller, and outputs the coded symbol stream of 24 coded symbols.

54. The encoding apparatus as claimed in claim 32, wherein the Walsh codes W1, W2, W4, W8 and W16 and the masks M1 and M2 all have a length of 32.

55. The encoding apparatus as claimed in claim 54, wherein puncturing positions corresponding to the number of the input information bits are as follows.

| No of Input Info Bits | Puncturing Positions |
|---|---|
| 1 | $1^{st}$, $3^{rd}$, $5^{th}$, $7^{th}$, $9^{th}$, $11^{th}$, $13^{th}$ and $15^{th}$ symbol positions |
| 2 | $0^{th}$, $4^{th}$, $8^{th}$, $12^{th}$, $16^{th}$, $20^{th}$, $24^{th}$ and $28^{th}$ symbol positions |
| 3 | $0^{th}$, $3^{rd}$, $5^{th}$, $6^{th}$, $7^{th}$, $8^{th}$, $16^{th}$ and $24^{th}$ symbol positions |
| 4 | $0^{th}$, $1^{st}$, $2^{nd}$, $3^{rd}$, $4^{th}$, $5^{th}$, $6^{th}$ and $16^{th}$ symbol positions |
| 5 | $0^{th}$, $1^{st}$, $2^{nd}$, $3^{rd}$, $4^{th}$, $5^{th}$, $6^{th}$ and $7^{th}$ symbol positions |
| 6 | $0^{th}$, $1^{st}$, $2^{nd}$, $3^{rd}$, $4^{th}$, $5^{th}$, $6^{th}$ and $7^{th}$ symbol positions |
| 7 | $0^{th}$, $1^{st}$, $2^{nd}$, $3^{rd}$, $4^{th}$, $5^{th}$, $6^{th}$ and $7^{th}$ symbol positions |

56. The encoding apparatus as claimed in claim 54, wherein puncturing positions corresponding to the number of the input information bits are as follows.

| No of Input Info Bits | Puncturing Positions |
|---|---|
| 1 | $1^{st}$, $3^{rd}$, $5^{th}$, $7^{th}$, $9^{th}$, $11^{th}$, $13^{th}$ and $15^{th}$ symbol positions |
| 2 | $0^{th}$, $4^{th}$, $8^{th}$, $12^{th}$, $16^{th}$, $20^{th}$, $24^{th}$ and $28^{th}$ symbol positions |
| 3 | $0^{th}$, $3^{rd}$, $5^{th}$, $6^{th}$, $7^{th}$, $8^{th}$, $16^{th}$ and $24^{th}$ symbol positions |
| 4 | $0^{th}$, $1^{st}$, $2^{nd}$, $3^{rd}$, $4^{th}$, $5^{th}$, $6^{th}$ and $16^{th}$ symbol positions |
| 5 | $0^{th}$, $4^{th}$, $8^{th}$, $12^{th}$, $16^{th}$, $20^{th}$, $24^{th}$ and $28^{th}$ symbol positions |
| 6 | $0^{th}$, $4^{th}$, $8^{th}$, $12^{th}$, $16^{th}$, $20^{th}$, $24^{th}$ and $28^{th}$ symbol positions |
| 7 | $0^{th}$, $4^{th}$, $8^{th}$, $12^{th}$, $16^{th}$, $20^{th}$, $24^{th}$ and $28^{th}$ symbol positions |

57. The encoding apparatus as claimed in claim 54, wherein if the number of the input information bits is 7, the masks M1 and M2 generated by the mask generator are 0111 0111 0010 0100 0110 0000 0000 0000 and 0010 0110 0101 0100 0101 0100 0100 0000, respectively.

58. The encoding apparatus as claimed in claim 54, wherein if the number of the input information bits is 6, the mask M1 generated by the mask generator is 0111 0111 0010 0100 0110 0000 0000 0000.

* * * * *